(12) United States Patent
Yoon et al.

(10) Patent No.: US 11,706,742 B2
(45) Date of Patent: Jul. 18, 2023

(54) METHOD FOR TRANSMITTING AND RECEIVING SIGNAL IN WIRELESS COMMUNICATION SYSTEM, AND APPARATUS SUPPORTING SAME

(71) Applicant: LG Electronics Inc., Seoul (KR)

(72) Inventors: Sukhyon Yoon, Seoul (KR); Hyunsoo Ko, Seoul (KR); Byounghoon Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/957,531

(22) Filed: Sep. 30, 2022

(65) Prior Publication Data

US 2023/0126381 A1  Apr. 27, 2023

Related U.S. Application Data

(63) Continuation of application No. 17/687,205, filed on Mar. 4, 2022, now Pat. No. 11,523,386, which is a
(Continued)

(30) Foreign Application Priority Data

Oct. 4, 2019 (KR) .................. 10-2019-0123248
Oct. 14, 2019 (KR) .................. 10-2019-0126605
(Continued)

(51) Int. Cl.
*H04W 72/04* (2023.01)
*H04L 5/00* (2006.01)
*H04W 72/044* (2023.01)

(52) U.S. Cl.
CPC .......... *H04W 72/044* (2013.01); *H04L 5/0048* (2013.01)

(58) Field of Classification Search
CPC ............ H04W 72/044; H04W 56/0015; H04L 5/0048; H04L 27/26025; H04L 5/0092
See application file for complete search history.

(56) References Cited

U.S. PATENT DOCUMENTS 11,523,386 B2 * 12/2022 Yoon ............... H04L 5/0092
2016/0192304 A1    6/2016 Yi et al.
(Continued)

FOREIGN PATENT DOCUMENTS

KR    20180126862    11/2018
WO    WO2018233522   12/2018
(Continued)

OTHER PUBLICATIONS

Clarivate Analytics, "English Translation WO2021/054802 A1" (Year: 2023).*
(Continued)

*Primary Examiner* — Maharishi V Khirodhar
*Assistant Examiner* — Kenneth P Hunt
(74) *Attorney, Agent, or Firm* — Fish & Richardson P.C.

(57) ABSTRACT

Various embodiments relate to a next generation wireless communication system for supporting a higher data transfer rate and the like beyond 4th generation (4G) wireless communication systems. Provided according to various embodiments are a method for transmitting/receiving a signal in a wireless communication system and a device supporting same, and various other embodiments may also be provided.

9 Claims, 33 Drawing Sheets

Related U.S. Application Data continuation of application No. PCT/KR2020/012711, filed on Sep. 21, 2020.

(60) Provisional application No. 62/938,668, filed on Nov. 21, 2019, provisional application No. 62/902,416, filed on Sep. 19, 2019.

(30) Foreign Application Priority Data

| Oct. 18, 2019 | (KR) | ......................... 10-2019-0129503 |
| Oct. 23, 2019 | (KR) | ......................... 10-2019-0131810 |
| Nov. 8, 2019  | (KR) | ......................... 10-2019-0142884 |
| Nov. 15, 2019 | (KR) | ......................... 10-2019-0147105 |
| Nov. 18, 2019 | (KR) | ......................... 10-2019-0147400 |

(56) References Cited

U.S. PATENT DOCUMENTS

| 2021/0120554 A1 | 4/2021 | Gaal et al. | |
| 2022/0217032 A1* | 7/2022 | Ko | ......................... H04B 7/2656 |
| 2022/0272650 A1* | 8/2022 | Ko | ......................... H04L 5/0078 |

FOREIGN PATENT DOCUMENTS

| WO | WO2019170390 | 9/2019 | |
| WO | WO2021054801 | 3/2021 | |
| WO | WO2021054802 | 3/2021 | |
| WO | WO-2021054802 A1 * | 3/2021 | ........... H04L 5/0048 |
| WO | WO 2021/066483 | 4/2021 | |
| WO | WO 2021/076974 | 4/2021 | |
| WO | WO2021087877 | 5/2021 | |

OTHER PUBLICATIONS

Nokia, "Corrections to 38.214 including alignment of terminology across specifications in RAN1#98," R1-1909884, Presented at 3GPP TSG RAN WG1 #98, Prague, CZ, Aug. 26-30, 2019, 20 pages.

Notice of Allowance in Korean Appln. No. 10-2022-7007551, dated Jun. 27, 2022, 4 pages (with English translation).

NTT Docomo, Inc., "Summary on UE feature related discussion," R1-1909480, Presented at 3GPP TSG RAN WG1 #98, Prague, CZ, Aug. 26-30, 2019, 54 pages.

ZTE Corporation, "Discussion on frame boundary alignment of NR CA," RP-191839, Presented at 3GPP TSG RAN Meeting #85, Newport Beach, USA, Sep. 16-20, 2019, 5 pages.

CMCC, "Discussion on necessity of frame boundary alignment of NR CA," R1-1908877, Presented at 3GPP TSG RAN WG1 #98, Prague, CZ, Aug. 26-30, 2019, 3 pages.

Extended Search Report in European Appln. No. 20866310.4, dated Oct. 17, 2022, 13 pages.

* cited by examiner

FIG. 19A  Example of 1st Solution (in 120KHZ SCS case)

FIG. 19B  Example of 2nd Solution (in 120KHZ SCS case)

METHOD FOR TRANSMITTING AND RECEIVING SIGNAL IN WIRELESS COMMUNICATION SYSTEM, AND APPARATUS SUPPORTING SAME

CROSS-REFERENCE TO RELATED APPLICATIONS

This application is a continuation of U.S. application Ser. No. 17/687,205, filed on Mar. 4, 2022, which is a continuation of International Application No. PCT/KR2020/012711, filed on Sep. 21, 2020, which claims the benefit of earlier filing date and right of priority to U.S. Provisional Application No. 62/902,416, filed on Sep. 19, 2019, U.S. Provisional Application No. 62/938,668, filed on Nov. 21, 2019, Korean Application No. 10-2019-0123248, filed on Oct. 4, 2019, Korean Application No. 10-2019-0126605, filed on Oct. 14, 2019, Korean Application No. 10-2019-0129503, filed on Oct. 18, 2019, Korean Application No. 10-2019-0131810, filed on Oct. 23, 2019, Korean Application No. 10-2019-0142884, filed on Nov. 8, 2019, Korean Application No. 10-2019-0147105, filed on Nov. 15, 2019, and Korean Application No. 10-2019-0147400, filed on Nov. 18, 2019, the contents of which are all hereby incorporated by reference herein in their entirety.

TECHNICAL FIELD

Various embodiments relate to a wireless communication system.

BACKGROUND

Wireless communication systems are being widely deployed to provide various types of communication services such as voice and data. In general, a wireless communication system is multiple access system that can support communication with multiple users by sharing available system resources (e.g., bandwidth, transmission power and the like). Examples of the multiple access system include CDMA (Code Division Multiple Access) system, FDMA (Frequency Division Multiple Access) system, TDMA (Time Division Multiple Access) system, OFDMA(Orthogonal Frequency Division Multiple Access) system, and SC-FDMA(Single Carrier Frequency Division Multiple Access) system and the like.

SUMMARY

Various embodiments may provide a method for transmitting and receiving a signal in a wireless communication system and an apparatus supporting the same.

Various embodiments may provide an unaligned and/or asynchronous carrier aggregation method and an apparatus supporting the same in a wireless communication system.

The technical problems to be achieved in various embodiments are not limited to the above-mentioned matters, and other technical problems not mentioned may be considered by those of ordinary skill in the art from various embodiments to be described below.

Various embodiments may provide a method of transmitting and receiving a signal and an apparatus supporting the same in a wireless communication system.

According to various embodiments, a method performed by a user equipment (UE) in a wireless communication system may be provided.

According to various embodiments, the method may include: receiving information related to a slot offset between a first cell and a second cell for carrier aggregation; and determining the slot offset between the first cell and the second cell, based on the information related to the slot offset.

According to various embodiments, the information related to the slot offset may be information based on a reference subcarrier spacing (SCS) that satisfies a preconfigured condition.

According to various embodiments, the information related to the slot offset may be received based on a higher layer parameter for configuring the second cell.

According to various embodiments, the information related to the slot offset may include information on an integer value related to the slot offset.

According to various embodiments, the integer value related to the slot offset may be selected from preconfigured $\{-A, \ldots, A\}$.

According to various embodiments, the A may be an integer determined based on the reference SCS.

According to various embodiments, based on the reference SCS being increased, A may be increased, and based on the reference SCS being decreased, A may be decreased.

According to various embodiments, the reference SCS may be an SCS that satisfies the preconfigured condition among at least one SCS configured in the first cell and at least one SCS configured in the second cell.

According to various embodiments, the preconfigured condition may include a condition related to a magnitude relationship between the at least one SCS configured in the first cell and the at least one SCS configured in the second cell.

According to various embodiments, based on (i) determining that the second cell is shifted to right in time domain with respect to the first cell, and (ii) a SCS used in the first cell and a SCS used in the second cell exceeding 30 kHz, respectively: based on the slot offset, a slot 0 of the second cell, after being shifted one time by a time length corresponding to 16 kappa+L to right in the time domain compared to before the slot offset is applied, may be identified as shifted based on being shifted M times by a time length corresponding to L to right in the time domain.

According to various embodiments, based on (i) determining that the second cell is shifted to left in time domain with respect to the first cell, and (ii) the SCS used in the first cell and the SCS used in the second cell exceeding 30 kHz, respectively: based on the slot offset, the slot 0 of the second cell, after being shifted M times by a time length corresponding to L to left in the time domain compared to before the slot offset is applied, may be identified as shifted based on being shifted one time by a time length corresponding to 16 kappa+L to left in the time domain.

According to various embodiments, the kappa may be 64, and the M may be an integer greater than or equal to 0 determined based on the slot offset, and the L may be related to the slot length of each of at least one slot excluding the slot 0 within a 0.5 ms time duration of the first cell or the second cell.

According to various embodiments, the first cell may be a primary cell (PCell) or a primary secondary cell (PSCell).

According to various embodiments, the second cell may be secondary cell (SCell).

According to various embodiments, a device operated in a wireless communication system may be provided.

According to various embodiments, the device may include a memory; and at least one processor connected to the memory.

According to various embodiments, the at least one processor may be configured to: receive information related to a slot offset between a first cell and a second cell for carrier aggregation; and determining the slot offset between the first cell and the second cell, based on the information related to the slot offset.

According to various embodiments, the information related to the slot offset may be information based on a reference subcarrier spacing (SCS) that satisfies a preconfigured condition.

According to various embodiments, the reference SCS may be an SCS that satisfies the preconfigured condition among at least one SCS configured in the first cell and at least one SCS configured in the second cell.

According to various embodiments, the device may be in communication with at least one of a mobile terminal, a network, and an autonomous vehicle other than a vehicle in which the device is included.

According to various embodiments, a method performed by a base station in a wireless communication system may be provided.

According to various embodiments, the method may include: obtaining information related to a slot offset between a first cell and a second cell for carrier aggregation; and transmitting the information related to the slot offset.

According to various embodiments, the information related to the slot offset may be information based on a reference subcarrier spacing (SCS) that satisfies a preconfigured condition.

According to various embodiments, a device operated in a wireless communication system may be provided.

According to various embodiments, the device may include a memory; and at least one processor connected to the memory.

According to various embodiments, the at least one processor may be configured to: obtain information related to a slot offset between a first cell and a second cell for carrier aggregation; and transmit the information related to the slot offset.

According to various embodiments, the information related to the slot offset may be information based on a reference subcarrier spacing (SCS) that satisfies a preconfigured condition.

According to various embodiments, a device operated in a wireless communication system may be provided.

According to various embodiments, the device may include at least one processor; and at least one memory storing at least one instruction to cause the at least one processors to perform a method.

According to various embodiments, the method may include: receiving information related to a slot offset between a first cell and a second cell for carrier aggregation; and determining the slot offset between the first cell and the second cell, based on the information related to the slot offset.

According to various embodiments, the information related to the slot offset may be information based on a reference subcarrier spacing (SCS) that satisfies a preconfigured condition.

According to various embodiments, a processor-readable medium storing at least one instruction for causing one or more processors to perform a method may be provided.

According to various embodiments, the method may include: receiving information related to a slot offset between a first cell and a second cell for carrier aggregation; and determining the slot offset between the first cell and the second cell, based on the information related to the slot offset.

According to various embodiments, the information related to the slot offset may be information based on a reference subcarrier spacing (SCS) that satisfies a preconfigured condition.

The various embodiments described above are only some of the various embodiments, and various embodiments in which the technical characteristics of various embodiments are reflected may be derived and understood by those of ordinary skill in the art based on the detailed description to be described below.

According to various embodiments, a method for transmitting and receiving a signal and an apparatus supporting the same in a wireless communication system may be provided.

According to various embodiments, an unaligned and/or asynchronous carrier aggregation method and an apparatus supporting the same in a wireless communication system may be provided.

According to various embodiments, a communication method using an effective multi-cell/multi-carrier in consideration of a frame structure in a wireless communication system and an apparatus supporting the same may be provided.

Effects obtainable from various embodiments are not limited to the effects mentioned above, and other effects not mentioned can be clearly derived and understood by those of ordinary skill in the art based on the following detailed description.

BRIEF DESCRIPTION OF THE DRAWINGS

The accompanying drawings are provided to help understanding of various embodiments, and provide various embodiments together with detailed description. However, technical features of various embodiments are not limited to specific drawings, and features disclosed in each drawing may be combined with each other to constitute a new embodiment. Reference numerals in each drawing refer to structural elements.

FIGS. 19A and 19B are diagrams illustrating an example of a slot shifting according to various embodiments.

DETAILED DESCRIPTION

The following techniques may be used in various radio access systems such as CDMA, FDMA, TDMA, OFDMA, SC-FDMA, and the like. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (Wi-Fi), IEEE 802.16 (WiMAX), IEEE 802-20, Evolved UTRA (E-UTRA), and the like. UTRA is part of the Universal Mobile Telecommunications System (UMTS). 3GPP (3rd Generation Partnership Project) Long Term Evolution (LTE) is a part of Evolved UMTS (E-UMTS) using E-UTRA and LTE-A (Advanced)/LTE-A pro is an evolved version of 3GPP LTE. 3GPP NR (New Radio or New Radio Access Technology) is an evolved version of 3GPP LTE/LTE-A/LTE-A pro.

For clarity of description, it is described based on a 3GPP communication system (e.g., LTE, NR, 6G, and next generation wireless communication system), but the technical idea of various embodiments is not limited thereto. For backgrounds, terms, abbreviations, etc. used in the description of various embodiments, reference may be made to matters described in standard documents published before the present disclosure. For example, documents such as 3GPP TS 37.213, 3GPP TS 38.211, 3GPP TS 38.212, 3GPP TS 38.213, 3GPP TS 38.214, 3GPP TS 38.215, 3GPP TS 38.300, 3GPP TS 38.321 and 3GPP TS 38.331 may be referred to.

1. 3GPP System 1.1. Physical Channels and Signal Transmission/Reception

A user equipment (UE) receives information from a base station through downlink (DL), and transmits information to the base station through uplink (UL). Information transmitted and received between the base station and the UE includes general data information and various control information, and various physical channels exist according to the type/use of the information they transmit and receive.

Figure 1:
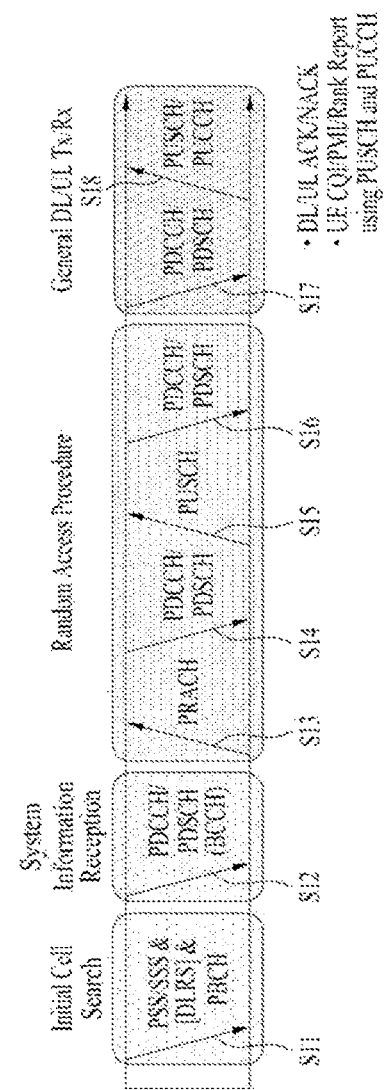
FIG. 1 is a diagram for describing physical channels and a signal transmission method using them, which may be used in various embodiments.

FIG. 1 is a diagram describing physical channels and a signal transmission method using them, which may be used in various embodiments.

When the power is turned on again from the power off state, or when a UE newly enters the cell, the UE performs an initial cell search operation such as synchronizing with the base station (S11). To this end, the UE receives a primary synchronization channel (P-SCH) and a secondary synchronization channel (S-SCH) from the base station to synchronize with the base station, and acquires information such as cell ID.

After that, the UE may receive a physical broadcast channel (PBCH) signal from the base station to obtain intra-cell broadcast information.

On the other hand, the UE may check the downlink channel state by receiving a downlink reference signal (DL RS) in the initial cell search step.

The UE that has completed the initial cell search may receive a physical downlink control channel (PDCCH) and a physical downlink shared channel (PDSCH) according to the physical downlink control channel information to obtain a little more Specific system information(S12).

After that, the UE may perform a random access procedure to complete access to the base station (S13-S16). To this end, the UE may transmit a preamble through a physical random access channel (PRACH) (S13) and may receive a random access response (RAR) for the preamble through a physical downlink control channel and a physical downlink shared channel corresponding to the physical downlink control channel (S14). The UE may transmit a physical uplink shared channel (PUSCH) using the scheduled information in the RAR (S15), and may perform contention resolution procedure such as receiving a physical downlink control channel signal and a physical downlink shared channel signal corresponding to the physical downlink control channel signal (S16).

On the other hand, when the random access procedure is performed in two steps, S13/S15 may be performed as one operation in which the UE performs transmission, and S14/S16 may be performed as one operation in which the base station performs transmission.

The UE performing the procedure as described above may receive a physical downlink control channel signal and/or a physical downlink shared channel signal as a general UL/DL signal transmission procedure(S17) and may perform transmission of a physical uplink shared channel (PUSCH) signal and/or a physical uplink control channel (PUCCH) signal (S18).

Control information transmitted from the UE to the base station is collectively referred to as uplink control information (UCI). UCI may include HARQ-ACK/NACK (hybrid automatic repeat and reQuest Acknowledgement/Negative-ACK), SR (Scheduling Request), CQI (Channel Quality Indication), PMI (Precoding Matrix Indication), and RI (Rank Indication) information etc.

UCI may be generally transmitted periodically through PUCCH, but may be transmitted through PUSCH when control information and data are to be transmitted at the same time. In addition, according to a request/instruction of a network, the UE may aperiodically transmit UCI through PUSCH.

1.2. Radio Frame Structure

Figure 2:
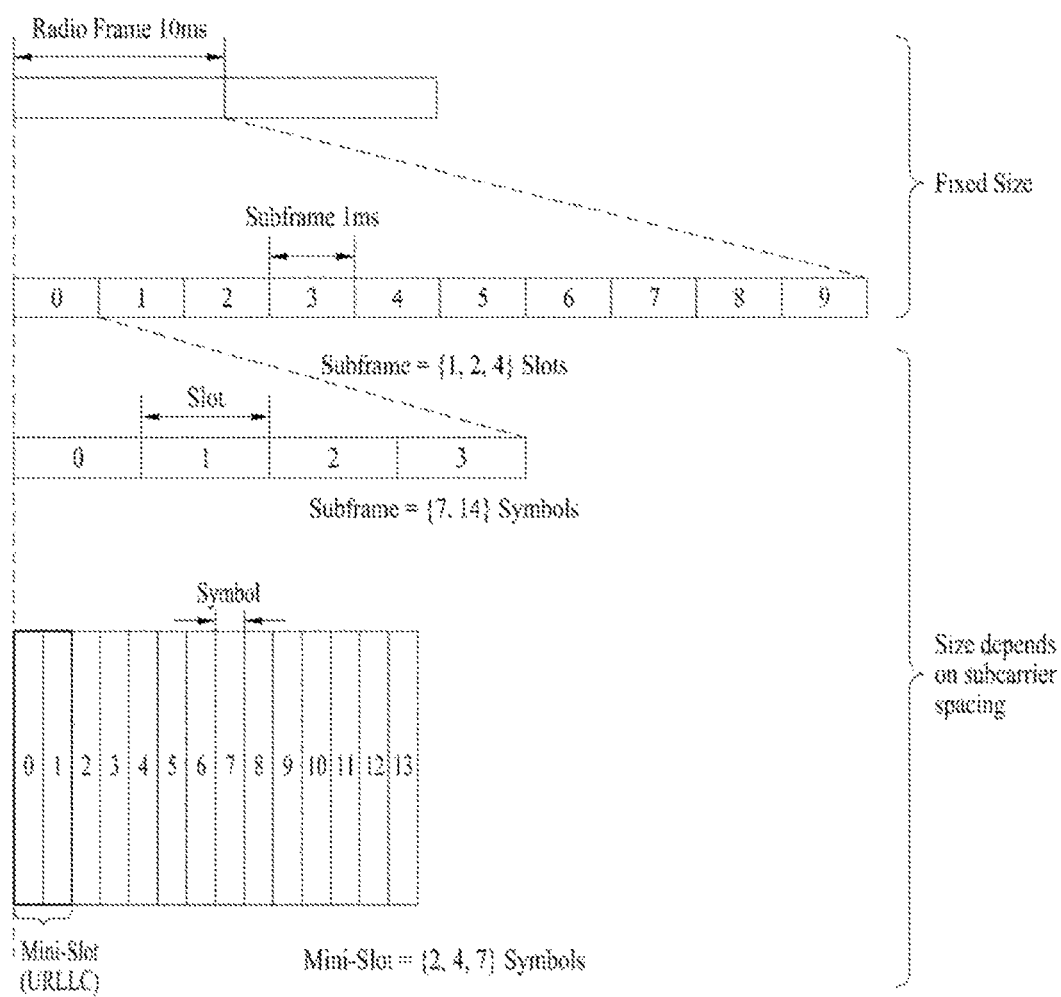
FIG. 2 is a diagram illustrating a radio frame structure based on NR system to which various embodiments are applicable.

FIG. 2 is a diagram illustrating a radio frame structure based on NR system to which various embodiments are applicable.

NR system may support multiple numerologies. Here, the numerology may be defined by a subcarrier spacing (SCS) and a cyclic prefix (CP) overhead. In this case, the plurality of subcarrier spacings may be derived by scaling the basic subcarrier spacing by an integer N (or µ). Also, assuming that very low subcarrier spacing is not used at very high carrier frequencies, the numerology used may be selected independently of the frequency band of the cell. In addition, in the NR system, various frame structures according to a number of numerologies may be supported.

Hereinafter, an orthogonal frequency division multiplexing (OFDM) numerology and a frame structure that may be considered in the NR system may be described. A number of OFDM numerologies supported in the NR system may be defined as shown in Table 1. The µ and cyclic prefix for the bandwidth part are obtained from the RRC parameters provided by the BS.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies(e.g., subcarrier spacing) to support various 5G services. For example, when the subcarrier spacing is 15 kHz, it supports a wide area in traditional cellular bands, and when the subcarrier spacing is 30 kHz/60 kHz, it supports dense-urban, lower latency, and wider carrier bandwidth, and when the subcarrier spacing is 60 kHz or higher, it supports bandwidth greater than 24.25 GHz to overcome phase noise.

NR frequency band is defined as two types of frequency ranges, FR1 and FR2. FR1 is a sub 6 GHz range, and FR2 is a millimeter wave (mmWave) in the above 6 GHz range.

Table 2 below illustrates the definition of the NR frequency band.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With respect to the frame structure in the NR system, the size of various fields in the time domain is expressed as a multiple of $T_c = 1/(\Delta f_{max} * N_f)$, which is a basic time unit for NR. Here, $\Delta f_{max} = 480*10^3$ Hz, and $N_f = 4096$, which is a value related to the size of a fast Fourier transform (FFT) or an inverse fast Fourier transform (IFFT). $T_c$ has the following relationship with $T_s = 1/((15 \text{ kHz})*2048)$, which is the base time unit for LTE and the sampling time: $T_s/T_c = 64$. Downlink and uplink transmissions are organized into (radio) frames of $T_f = (\Delta f_{max} * N_f/100) * T_c = 10$ ms duration. Here, each radio frame is composed of 10 subframes each having a duration of $T_{sf} = (\Delta f_{max} * N_f/1000) * T_c = 1$ ms. There may be one set of frames for uplink and one set of frames for downlink. For the numerology µ, the slots are numbered $n^\mu_s \in \{0, \ldots, N^{slot,\mu}_{subframe-1}\}$ in increasing order within the subframe, and are numbered $n^\mu_{s,f} \in \{0, \ldots, N^{slot,\mu}_{frame-1}\}$ in ascending order within the radio frame. One slot consists of $N^\mu_{symb}$ consecutive OFDM symbols, where $N^{\mu,symb}$ depends on a cyclic prefix (CP). The start of slot $n^\mu_{symb}$ in a subframe is temporally aligned with the start of OFDM symbol $n^\mu_s * N^\mu_{symb}$ in the same subframe.

Table 3 shows the number of symbols per slot according to SCS, the number of slots per frame, and the number of slots per subframe when a normal CP is used, and Table 4 shows the number of symbols per slot, the number of slots per frame, and the number of slots per subframe according to SCS when the extended CSP is used.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

In the above table, $N^{slot}_{symb}$ indicates the number of symbols in a slot, $N^{frame,\mu}_{slot}$ indicates the number of slots in a frame, and $N^{subframe,\mu}_{slot}$ indicates the number of slots in a subframe.

In the NR system to which various embodiments are applicable, OFDM(A) numerology (e.g., SCS, CP length, etc.) may be configured differently between a plurality of cells merged into one UE. Accordingly, an (absolute time) interval of a time resource (e.g., SF, slot, or TTI) (commonly referred to as TU (time unit) for convenience) composed of the same number of symbols may be configured differently between the merged cells.

FIG. 2 is an example of a case where μ=2 (i.e., a subcarrier spacing is 60 kHz), and referring to Table 3, one subframe may include four slots. One subframe={1,2,4} slots shown in FIG. 2 is an example, and the number of slot(s) that can be included in one subframe is defined as in Table 6 or Table 7.

In addition, mini-slot may contain 2, 4 or 7 symbols or may contain more or fewer symbols.

Figure 3:
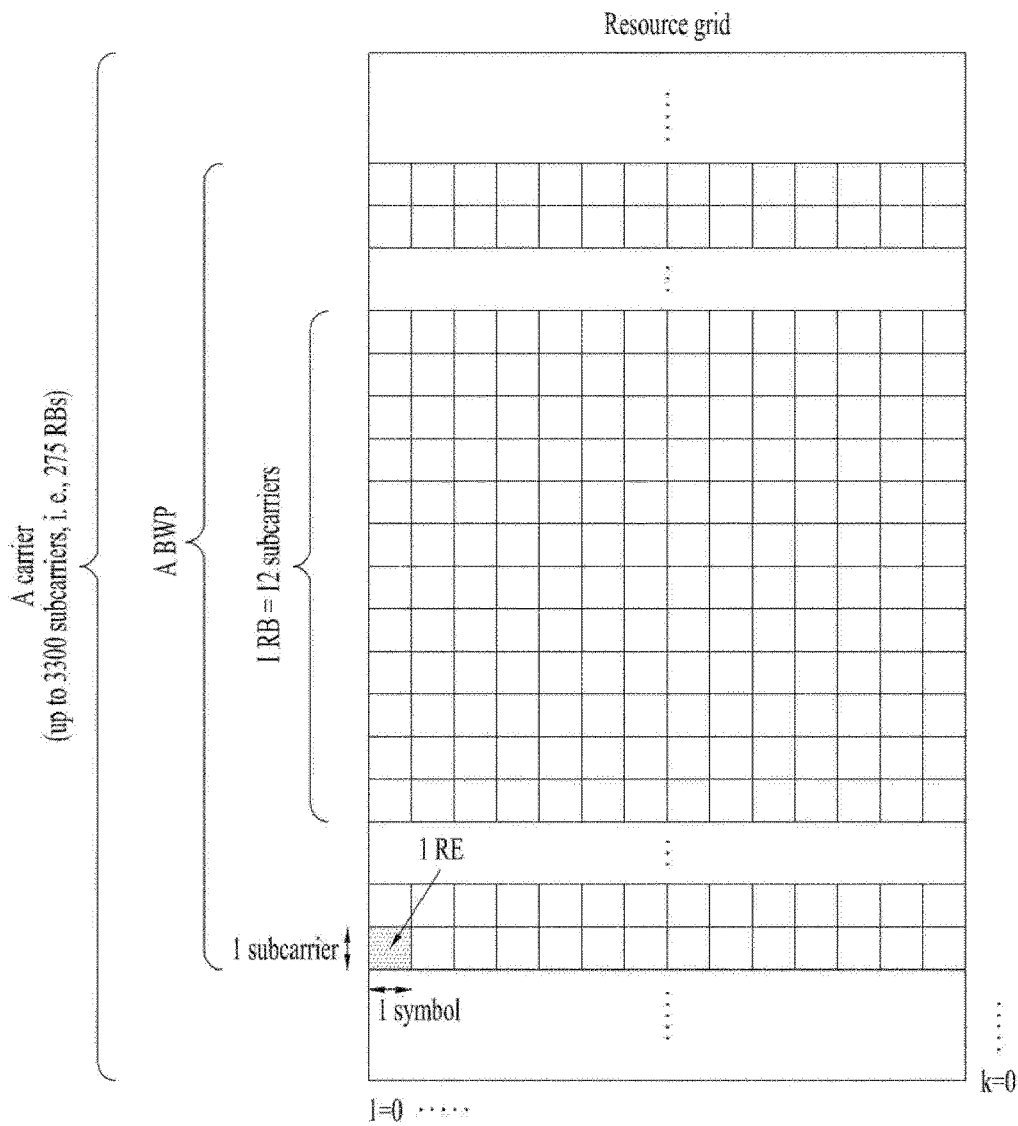
FIG. 3 is a diagram illustrating a slot structure based on NR system to which various embodiments are applicable.

FIG. 3 is a diagram illustrating a slot structure based on NR system to which various embodiments are applicable.

Referring to FIG. 3, one slot may include a plurality of symbols in the time domain. For example, in a case of normal CP, one slot may include 7 symbols, and in a case of an extended CP, one slot may include 6 symbols.

A carrier may include a plurality of subcarriers in the frequency domain. A resource block (RB) is defined as a plurality of (e.g., 12) consecutive subcarriers in the frequency domain.

BWP(bandwidth part) may be defined as a plurality of consecutive (P)RBs in the frequency domain, and correspond to one numerology(e.g., SCS, CP length etc.).

A carrier may include a maximum of N (e.g., 5) BWP. Data communication is performed through the activated BWP, and only one BWP may be activated for one UE. Each element in the resource grid is referred to as a resource element (RE), and one complex symbol may be mapped.

Figure 4:
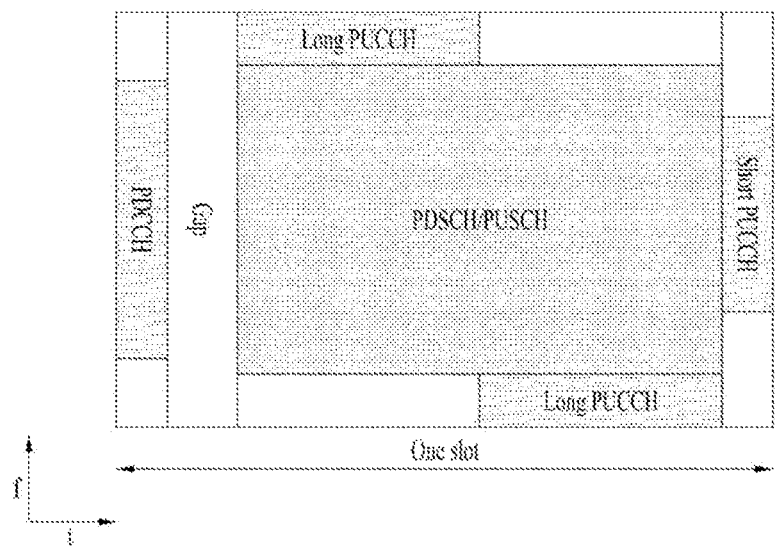
FIG. 4 is a diagram illustrating an example in which a physical channel is mapped in a slot to which various embodiments are applicable.

FIG. 4 is a diagram illustrating an example in which a physical channel is mapped in a slot to which various embodiments are applicable.

A DL control channel, DL or UL data, UL control channel, etc. may all be included in one slot. For example, the first N symbols in a slot may be used to transmit a DL control channel (hereinafter, DL control region), and the last M symbols in a slot may be used to transmit a UL control channel (hereinafter, UL control region). N and M are each an integer greater than or equal to 0. A resource region (hereinafter, referred to as a data region) between the DL control region and the UL control region may be used for DL data transmission or for UL data transmission. A time gap for DL-to-UL or UL-to-DL switching may exist between the control region and the data region. The PDCCH may be transmitted in the DL control region, and the PDSCH may be transmitted in the DL data region. Some symbols at the time of switching from DL to UL in a slot may be used as a time gap.

1.3. Channel Structure 1.3.1. Downlink Channel Structure

A base station transmits a related signal to the UE through a downlink channel to be described later, and the UE receives a related signal from the base station through a downlink channel to be described later.

1.3.1.1. Physical Downlink Shared Channel (PDSCH)

A PDSCH carries downlink data (e.g., DL-shared channel transport block, DL-SCH TB), and modulation methods such as QPSK(Quadrature Phase Shift Keying), 16 QAM (Quadrature Amplitude Modulation), 64 QAM, 256 QAM, etc. may be applied. A codeword is generated by encoding the TB. The PDSCH may carry up to two codewords. Scrambling and modulation mapping are performed for each codeword, and modulation symbols generated from each codeword are mapped to one or more layers (Layer mapping). Each layer is generated as an OFDM symbol signal by being mapped to a resource together with DMRS, and transmitted through a corresponding antenna port.

1.3.1.2. Physical Downlink Control Channel (PDCCH)

In the PDCCH, downlink control information (DCI), for example, DL data scheduling information, UL data scheduling information, etc. may be transmitted. In PUCCH, uplink control information (UCI), for example, ACK/NACK (positive acknowledgment/negative acknowledgment) information for DL data, CSI (channel state information) information, SR (scheduling request), etc. may be transmitted.

PDCCH carries downlink control information (DCI) and the QPSK modulation method is applied. One PDCCH is composed of 1, 2, 4, 8, or 16 CCEs (control channel elements) according to an aggregation level (AL). One CCE consists of six REGs (resource element groups). One REG is defined as one OFDM symbol and one (P)RB.

PDCCH is transmitted through a control resource set (CORESET). CORESET is defined as a REG set having a given numerology (e.g., SCS, CP length, etc.). A plurality of OCRESETs for one UE may overlap in the time/frequency domain. CORESET may be configured through system information (e.g., MIB) or UE-specific higher layer (e.g., radio resource control, RRC, layer) signaling. Specifically, the number of RBs and the number of symbols (up to 3) constituting CORESET may be configured by higher layer signaling.

The UE obtains DCI transmitted through the PDCCH by performing decoding (aka, blind decoding) for a set of PDCCH candidates. A set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

Table 5 exemplifies the characteristics of each search space type.

TABLE 5

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 5-continued

| Type | Search Space | RNTI | Use Case |
|---|---|---|---|
| | UE Specific | C-RNTI, or MCS-C-RNTI, or CS-RNTI(s) | User specific PDSCH decoding |

Table 6 exemplifies DCI formats transmitted through PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, DCI format 0_1 may be used to schedule TB-based (or TB-level) PUSCH or CBG (Code Block Group)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., dynamic SFI) to the UE, and DCI format 2_1 is used to deliver downlink pre-emption information to the UE. DCI format 2_0 and/or DCI format 2_1 may be delivered to UEs in a corresponding group through a group common PDCCH (Group common PDCCH), which is a PDCCH delivered to UEs defined as a group.

1.3.2. Uplink Channel Structure

The UE transmits a related signal to the base station through an uplink channel to be described later, and the base station receives a related signal from the UE through an uplink channel to be described later.

1.3.2.1. Physical Uplink Shared Channel (PUSCH)

PUSCH carries UL-shared channel transport block (UL-SCH TB) and/or uplink control information (UCI), and is transmitted based on CP-OFDM (cyclic prefix—orthogonal frequency division multiplexing) waveform or DFT-s-OFDM (discrete Fourier transform—spread—orthogonal frequency division multiplexing) wave. When the PUSCH is transmitted based on the DFT-s-OFDM waveform, the UE transmits the PUSCH by applying transform precoding. For example, when transform precoding is not possible (e.g., transform precoding is disabled), the UE transmits a PUSCH based on the CP-OFDM waveform, and when transform precoding is possible (e.g., transform precoding is enabled), the UE may transmit PUSCH based on CP-OFDM wave or DFT-s-OFDM wave. PUSCH transmission may be dynamically scheduled by a UL grant in DCI, or may be scheduled semi-statically based on a higher layer (e.g., RRC) signaling (and/or Layer 1 (L1) signaling (e.g., PDCCH)). PUSCH transmission may be performed on a codebook-based or non-codebook-based basis.

1.3.2.2. Physical Uplink Control Channel (PUCCH)

Figure 7:
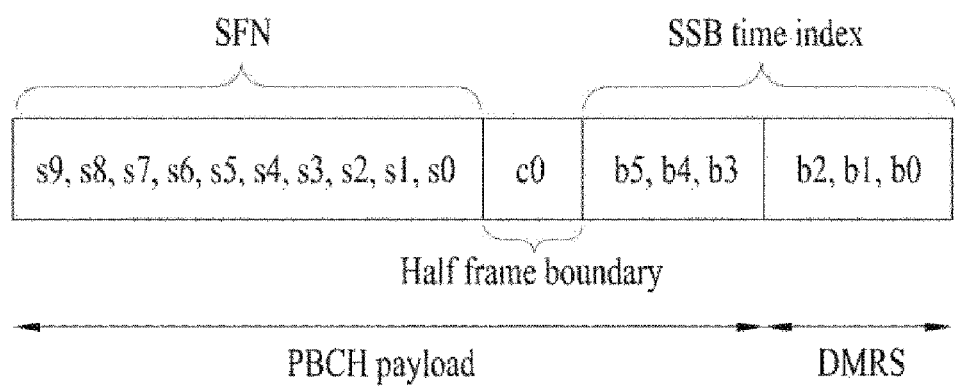
FIG. 7 is a diagram illustrating an example of a method for a UE to obtain information on DL time synchronization to which various embodiments are applicable.

PUCCH carries uplink control information, HARQ-ACK, and/or scheduling request (SR) and is divided into Short PUCCH and Long PUCCH according to the PUCCH transmission length. FIG. 7 illustrates PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI of a maximum size of 2 bits, and is mapped and transmitted based on a sequence. Specifically, the UE transmits a specific UCI to the base station by transmitting one of the plurality of sequences through the PUCCH of PUCCH format 0. The UE transmits a PUCCH of PUCCH format 0 in a PUCCH resource for configuring a corresponding SR only when transmitting a positive SR.

PUCCH format 1 carries UCI of a maximum size of 2 bits, and the modulation symbol is spread by an orthogonal cover code (OCC) in the time domain (configure differently depending on whether or not frequency hopping is performed). DMRS is transmitted in a symbol in which a modulation symbol is not transmitted (that is, time division multiplexing (TDM) is performed and transmitted).

PUCCH format 2 carries UCI of a bit size greater than 2 bits, and the modulation symbol is transmitted by DMRS and FDM (Frequency Division Multiplexing). DM-RS is located at symbol indexes #1, #4, #7, and #10 in a given resource block with a density of ⅓. A Pseudo Noise (PN) sequence is used for the DMRS sequence. For 2-symbol PUCCH format 2, frequency hopping may be activated.

PUCCH format 3 is not UE multiplexing in the same physical resource blocks, and carries UCI of a bit size greater than 2 bits. In other words, the PUCCH resource of PUCCH format 3 does not include an orthogonal cover code. The modulation symbol is transmitted through DMRS and time division multiplexing (TDM).

PUCCH format 4 supports multiplexing up to 4 UEs in the same physical resource blocks, and carries UCI of a bit size greater than 2 bits. In other words, the PUCCH resource of PUCCH format 3 includes an orthogonal cover code. The modulation symbol is transmitted through DMRS and time division multiplexing (TDM).

1.4. BWP (bandwidth part)

In the NR system, up to 400 MHz per one carrier may be supported. If the UE operating in such a wideband carrier always operates with a radio frequency (RF) module for the entire carrier turned on, the UE battery consumption may increase. Alternatively, in consideration of several use cases (e.g., eMBB (enhanced Mobile Broadband), URLLC (URLLC (Ultra-Reliable and Low Latency Communication), mMTC (massive Machine Type Communications), V2X, etc.) operating in one wideband carrier, different numerologies (e.g., subcarrier spacing) may be supported for each frequency band in the corresponding carrier. Alternatively, the capability for the maximum bandwidth may be different for each UE. In consideration of this, the BS may instruct the UE to operate only in a partial bandwidth rather than the entire bandwidth of the wideband carrier, and the partial bandwidth is referred to as a bandwidth part (BWP). In the frequency domain, BWP is a subset of contiguous common resource blocks defined for numerology $\mu i$ in bandwidth part i on the carrier, and one numerology (e.g., subcarrier spacing, CP length, slot/mini-slot duration period) may be configured.

On the other hand, the BS may configure one or more BWPs in one carrier configured to the UE. Alternatively, when UEs are concentrated in a specific BWP, some UEs may be moved to another BWP for load balancing. Alternatively, in consideration of frequency domain inter-cell interference cancellation between neighboring cells, a partial spectrum from the entire bandwidth may be excluded and both BWPs of the cell may be configured in the same slot. That is, the BS may configure at least one DL/UL BWP to the UE associated with the wideband carrier, may activate at least one DL/UL BWP among DL/UL BWP(s) configured at a specific time (by L1 signaling which is a physical layer control signal, a MAC control element (CE) which is a MAC layer control signal, or RRC signaling), may instruct to switch to another configured DL/UL BWP (by L1 signaling, MAC CE, or RRC signaling, etc.), or may configure a timer value so that when the timer expires, the UE switches to a predetermined DL/UL BWP. The activated DL/UL BWP is specifically referred to as an active (active) DL/UL BWP. In a situation such as when the UE is in the process of initial access or before the RRC connection of the UE is set up, the UE may not receive configuration for DL/UL BWP. In this situation, the DL/UL BWP assumed by the UE is referred to as an initial active DL/UL BWP.

1.5. SSB (Synchronization Signal Block) Transmission and Related Operations

Figure 5:
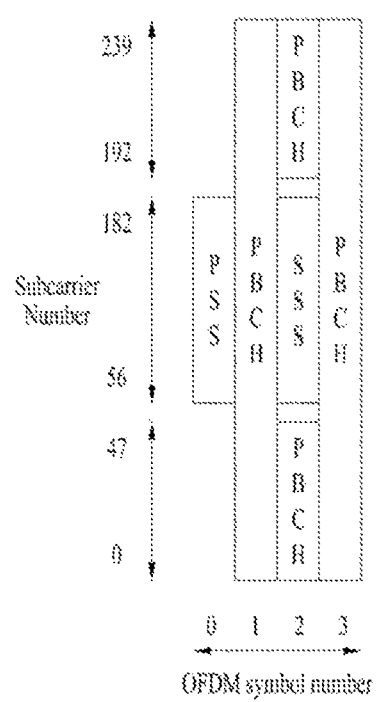
FIG. 5 is a diagram illustrating a structure of a SSB (synchronization signal block) to which various embodiments are applicable.

FIG. 5 is a diagram illustrating a structure of a SSB (synchronization signal block) to which various embodiments are applicable.

The UE may perform cell search, system information acquisition, beam alignment for initial access, DL measurement, etc. based on the SSB. The SSB is mixed with an SS/PBCH (Synchronization Signal/Physical Broadcast channel) block.

Referring to FIG. 5, the SSB to which various embodiments are applicable may be configured with 20 RBs in four consecutive OFDM symbols. In addition, the SSB is composed of PSS, SSS, and PBCH, and the UE may perform cell search, system information acquisition, beam alignment for initial access, DL measurement, etc. based on the SSB.

PSS and SSS are each composed of 1 OFDM symbol and 127 subcarriers, PBCH is composed of 3 OFDM symbols and 576 subcarriers. Polar coding and Quadrature Phase Shift Keying (QPSK) are applied to the PBCH. The PBCH consists of a data RE and a demodulation reference signal (DMRS) RE for each OFDM symbol. Three DMRS REs exist for each RB, and three data REs exist between DMRS REs.

Cell Search

Cell search means a process in which the UE acquires time/frequency synchronization of a cell, and detects a cell ID (Identifier) (e.g., Physical layer Cell ID, PCID) of the cell. PSS is used to detect a cell ID within a cell ID group, and SSS is used to detect a cell ID group. PBCH is used for SSB (time) index detection and half-frame detection.

The cell search process of a UE may be organized as shown in Table 8 below.

TABLE 8

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There are 336 cell ID groups, and there are 3 cell IDs for each cell ID group. There are a total of 1008 cell IDs. Information on the cell ID group to which the cell ID of the cell belongs is provided/obtained through the SSS of the cell, and information on the cell ID among 336 cells in the cell ID is provided/obtained through the PSS.

Figure 6:
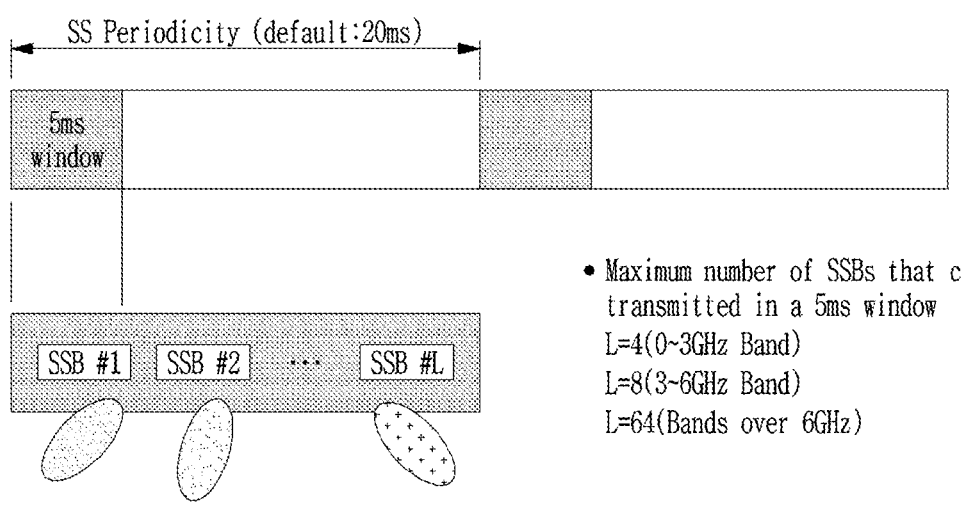
FIG. 6 is a diagram illustrating an example of a method for transmitting a SSB to which various embodiments are applicable.

FIG. 6 is a diagram illustrating an example of a method for transmitting a SSB to which various embodiments are applicable.

Referring to FIG. 6, the SSB is transmitted periodically according to SSB periodicity. The SSB basic period assumed by the UE during initial cell discovery is defined as 20 ms. After cell access, the SSB period may be configured to one of {5 ms, 10 ms, 20 ms, 40 ms, 80 ms, 160 ms} by a network (e.g., a base station). A set of SSB bursts is constructed at the beginning of the SSB period. The SSB burst set consists of a 5 ms time window (i.e., half-frame), and the SSB may be transmitted up to L times within the SS burst set. The maximum number of transmissions L of the SSB can be given as follows according to the frequency band of the carrier. One slot includes up to two SSBs.

For frequency range up to 3 GHz, L=4
For frequency range from 3 GHz to 6 GHz, L=8
For frequency range from 6 GHz to 52.6 GHz, L=64

The time position of the SSB candidates in the SS burst set may be defined as follows according to the SCS. The time positions of SSB candidates are indexed from 0 to L−1 (SSB index) in chronological order within the SSB burst set (i.e., half-frame). In the description of various embodiments, the candidate SSB and the SSB candidate may be used interchangeably.

Case A: 15 kHz SCS: The index of the start symbol of the candidate SSB is given as {2, 8}+14*n.
  When shared spectrum channel access operation is not performed/supported (for operation without shared spectrum channel access)(e.g., L-band, LCell): If the carrier frequency is 3 GHz or less, n is 0 or 1. If the carrier frequency is 3 GHz to 6 GHz, n is 0, 1, 2, or 3.
  When shared spectrum channel access operation is performed/supported(for operation with shared spectrum channel access)(e.g., U-band, UCell): n is 0, 1, 2, 3, or 4.
Case B: 30 kHz SCS: The index of the start symbol of the candidate SSB is given by {4, 8, 16, 20}+28*n. If the carrier frequency is 3 GHz or less, n is 0. When the carrier frequency is 3 GHz to 6 GHz, n is 0 or 1.
Case C: 30 kHz SCS: The index of start symbol of the candidate SSB is given by {2, 8}+14*n
  when shared spectrum channel access operation is not performed/supported: (1) For paired spectrum operation, n=0, 1 when the carrier frequency is 3 GHz or less. If the carrier frequency is within FR1 and greater than 3 GHz, n=0, 1, 2, 3. (2) For non-paired spectrum operation, n=0, 1 when the carrier frequency is 2.4 GHz or less. If the carrier frequency is within FR1 and greater than 2.4 GHz, n=0, 1, 2, 3.
  When the shared spectrum channel access operation is performed/supported: n=0, 1, 2, 3, 4, 6, 7, 8, 9.
Case D: 120 kHz SCS: The index of start symbol of the candidate SSB is given by {4, 8, 16, 20}+28*n. For carrier frequencies greater than 6 GHz, n=0, 1, 2, 3, 5, 6, 7, 8, 10, 11, 12, 13, 15, 16, 17, 18.
Case E: 240 kHz SCS: The index of start symbol of the candidate SSB is given by {8, 12, 16, 20, 32, 36, 40, 44}+56*n. For carrier frequencies greater than 6 GHz, n=0, 1, 2, 3, 5, 6, 7, 8.

Synchronization Procedure

FIG. 7 is a diagram illustrating an example of a method for a UE to obtain information on DL time synchronization to which various embodiments are applicable.

The UE may acquire DL synchronization by detecting the SSB. The UE may identify the structure of the SSB burst set based on the detected SSB index, and thus may detect a symbol/slot/half-frame boundary. The number of the frame/half-frame to which the detected SSB belongs may be identified using the SFN information and the half-frame indication information.

Specifically, the UE may obtain 10-bit SFN (system frame number) information from the PBCH (s0~s9). Among the 10-bit SFN information, 6 bits are obtained from a master information block (MIB), and the remaining 4 bits are obtained from a PBCH transport block (TB).

Next, the UE may obtain 1-bit half-frame indication information (c0). When the carrier frequency is 3 GHz or less, the half-frame indication information may be implicitly signaled using the PBCH DMRS. The PBCH DMRS indicates 3-bit information by using one of eight PBCH DMRS sequences. Therefore, in the case of L=4, one bit remaining after indicating the SSB index among 3 bits that may be indicated using 8 PBCH DMRS sequences may be used for half-frame indication.

Finally, the UE may obtain an SSB index based on the DMRS sequence and the PBCH payload. SSB candidates are indexed from 0 to L−1 in chronological order within the SSB burst set (i.e., half-frame). When L=8 or 64, LSB (least significant bit) 3 bits of the SSB index may be indicated using 8 different PBCH DMRS sequences (b0 to b2). When L=64, MSB (most significant bit) 3 bits of the SSB index are indicated through the PBCH (b3 to b5). When L=2, LSB 2 bits of the SSB index may be indicated using four different PBCH DMRS sequences (b0, b1). When L=4, one bit remaining after indicating the SSB index among 3 bits that may be indicated using 8 PBCH DMRS sequences may be used for half-frame indication (b2).

System Information Obtainment

Figure 8:
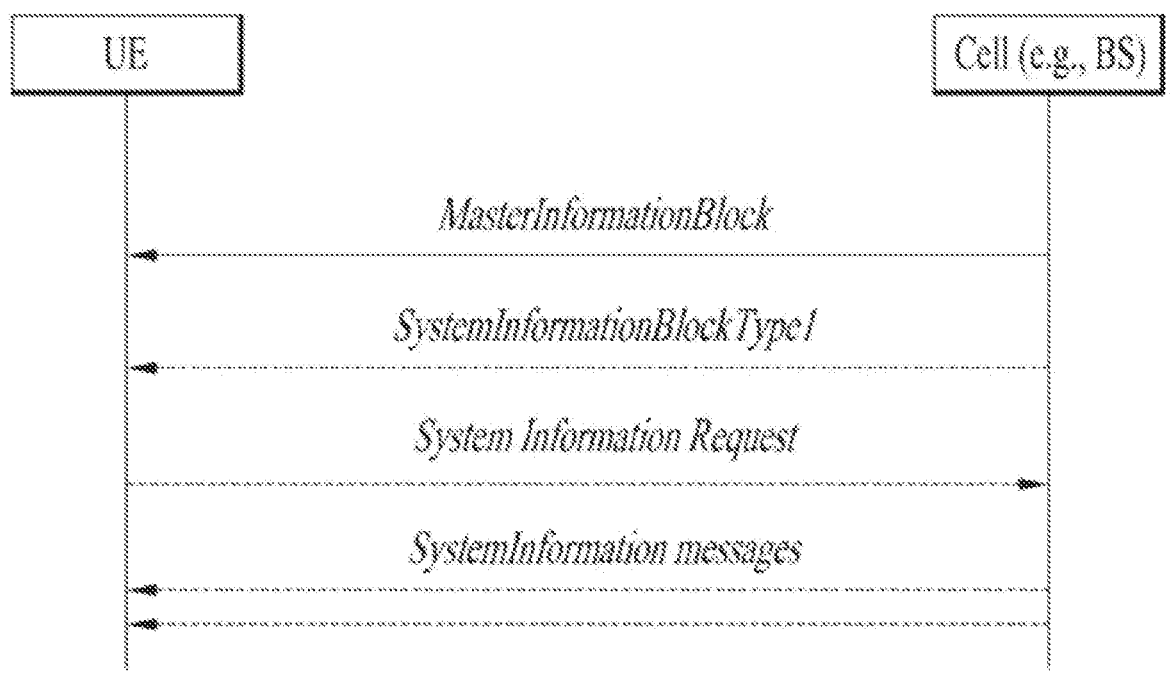
FIG. 8 is a diagram illustrating an example of a system information (SI) obtainment process to which various embodiments are applicable.

FIG. 8 is a diagram illustrating an example of a system information (SI) acquisition procedure to which various embodiments are applicable.

A UE may obtain AS(access stratum)-/NAS(non-access stratum)-information through SI acquisition procedure. SI acquisition procedure may be applied to UEs in RRC_IDLE state, RRC_INACTIVE state, and RRC_CONNECTED state.

SI is divided into master information block (MIB) and a plurality of system information blocks (SIBs). SI other than MIB may be referred to as Remaining Minimum System Information (RMSI). For more details, please refer to the following.

MIB includes information/parameters related to SIB1 (SystemInformationBlockType1) reception and is transmitted through the PBCH of the SSB.
  MIB includes information/parameters related to SIB1 (SystemInformationBlockType1) reception and is transmitted through the PBCH of the SSB. MIB information may refer to 3GPP TS 38.331, and may include the following fields.
  subCarrierSpacingCommon       ENUMERATED {scs15or60, scs30or120},
  ssb-SubcarrierOffset INTEGER (0 . . . 15),
  pdcch-ConfigSIB1 INTEGER (0 . . . 255),
  dmrs-TypeA-Position ENUMERATED {pos2, pos3},
  . . .
  spare BIT STRING (SIZE (1))
  For a description of each field, see Table 9.

TABLE 9 pdcch-ConfigSIB1
Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213, clause 13).
ssb-SubcarrierOffset
Corresponds to $k_{SSB}$ (see TS 38.213), which is the frequency domain offset between SSB and the overall resource block grid in number of subcarriers. (See TS 38.211, clause 7.4.3.1).
The value range of this field may be extended by an additional most significant bit encoded within PBCH as specified in TS 38.213.
This field may indicate that this cell does not provide SIB1 and that there is hence no CORESET#0 configured in MIB (see TS 38.213, clause 13). In this case, the field pdcch-ConfigSIB1 may indicate the frequency positions where the UE may (not) find a SS/PBCH with a control resource set and search space for SIB1 (see TS 38.213, clause 13).

TABLE 9-continued subCarrierSpacingCommon
Subcarrier spacing for SIB1, Msg.2/4 for initial access, paging and broadcast SI-messages. If the UE acquires
this MIB on an FR1 carrier frequency, the value scs15or60 corresponds to 15 kHz and the value scs30or120
corresponds to 30 kHz. If the UE acquires this MIB on an FR2 carrier frequency, the value scs15or60
corresponds to 60 kHz and the value scs30or120 corresponds to 120 kHz.
dmrs-TypeA-Position
Position of (first) DM-RS for downlink (e.g., PDSCH) and uplink (e.g,. PUSCH). pos2 represents the $2^{nd}$ symbol
in a slot and pos2 represents the $3^{rd}$ symbol in a slot.

At the time of initial cell selection, the UE assumes that the half-frame with the SSB is repeated at a 20 ms period. The UE may check whether CORESET(control resource set) for Type0-PDCCH common search space (e.g., CORESET #0) exists based on MIB. When $k_{SSB}<=23$ (for FR1) or $k_{SSB}<=11$ (for FR2), the UE may determine that CORESET for the Type0-PDCCH common search space exists. If $k_{SSB}>23$ (for FR1) or $k_{SSB}>11$ (for FR2), the UE may determine that there is no CORESET for the Type0-PDCCH common search space. The Type0-PDCCH common search space is a type of PDCCH search space and is used to transmit a PDCCH scheduling an SI message. When the Type0-PDCCH common search space exists, the UE, based on information in the MIB (e.g., pdcch-ConfigSIB1), may determine (i) a plurality of consecutive RBs constituting a CORESET (e.g., CORESET #0) and one or more consecutive symbols and (ii) a PDCCH occasion (i.e., a time domain location for PDCCH reception) (e.g., search space #0). When the Type0-PDCCH common search space does not exist, pdcch-ConfigSIB1 provides information about a frequency location in which SSB/SIB1 exists and a frequency range in which SSB/SIB1 does not exist.

SIB1 includes information related to availability and scheduling (e.g., transmission period, SI-window size) of the remaining SIBs (hereinafter, SIBx, x is an integer greater than or equal to 2). For example, SIB1 may inform whether SIBx is periodically broadcast or provided at the request of the UE through an on-demand method. When SIBx is provided by the on-demand method, SIB1 may include information necessary for the UE to perform an SI request. SIB1 is transmitted through the PDSCH, the PDCCH scheduling SIB1 is transmitted through the Type0-PDCCH common search space, and SIB1 is transmitted through the PDSCH indicated by the PDCCH.

SIBx is included in the SI message and is transmitted through the PDSCH. Each SI message is transmitted within a periodically occurring time window (i.e., an SI-window).

1.5. Carrier Aggregation (CA)

NR may support a wider uplink/downlink bandwidth part by merging a plurality of uplink/downlink carriers (i.e., carrier aggregation). It is possible to transmit/receive signals on a plurality of carriers through carrier aggregation. When carrier aggregation is applied, each carrier (see FIG. A2) may be referred to as a component carrier (CC). CCs may be adjacent to or non-adjacent to each other in the frequency domain. The bandwidth of each CC may be independently determined. Asymmetric carrier aggregation in which the number of UL CCs and the number of DL CCs are different is also possible. In NR, radio resources are divided/managed by cells, and a cell may consist of one DL CC and 0 to 2 UL CCs. For example, a cell consists of (i) only one DL CC, (ii) one DC CC and one UL CC, or (ii) one DL CC and two UL CCs (one supplementary UL including CC). Cells are divided as follows. In the description of various embodiments, a cell may be interpreted according to a context, and may mean, for example, a serving cell. In addition, unless otherwise described, operations according to various embodiments may be applied to each serving cell.

PCell(Primary Cell): In the case of a UE in which carrier aggregation is configured, a cell operating at a primary frequency(e.g., primary component carrier (PCC)) in which the UE performs an initial connection establishment procedure or initiates a connection re-establishment procedure. In the case of DC (Dual Connectivity), MCG (Master Cell Group) cell operating at the primary frequency in which the UE performs an initial connection establishment procedure or an connection re-establishment procedure.

SCell(Secondary Cell): In the case of a UE in which carrier aggregation is configured, a cell that provides additional radio resource in addition to a special cell.

PSCell(Primary SCG Cell/Primary Secondary Cell): In the case of DC, a Secondary Cell Group (SCG) cell in which the UE performs random access when performing RRC reconfiguration and synchronization process.

Special Cell (SpCell): In the case of DC, the special cell represents the PCell of MCG or PSCell of SCG. Otherwise (i.e., non-DC), the special cell represents the PCell.

Serving Cell (ServCell): Indicates a cell configured for a UE in RRC_CONNECTED state. When CA/DC is not configured, only one serving cell (i.e., PCell) exists. When CA/DC is configured, the serving cell indicates a special cell(s) and a cell set including all SCells.

On the other hand, the control information may be configured to be transmitted and received only through a specific cell. For example, UCI may be transmitted only through a special cell (e.g., PCell). When an SCell (hereinafter, PUCCH-SCell) in which PUCCH transmission is allowed is configured, UCI may also be transmitted through the PUCCH-SCell. As another example, the base station may allocate a scheduling cell (set) in order to reduce PDCCH blinding decoding (BD) complexity on the UE side. For PDSCH reception/PUSCH transmission, the UE may perform PDCCH detection/decoding only in a scheduling cell. In addition, the base station may transmit the PDCCH only through the scheduling cell (set). For example, a PDCCH for downlink assignment may be transmitted in cell #0 (i.e., a scheduling cell), and the corresponding PDSCH may be transmitted in cell #2 (i.e., a scheduled cell) (cross-carrier scheduling, CCS). The scheduling cell (set) may be configured in a UE-specific, UE-group-specific or cell-specific manner. The scheduling cell includes a special cell (e.g., PCell).

For CCS, CIF(carrier indicator field) is used. The CIF may be disabled/enabled by UE-specific (or UE group-specific) semi-statically by a higher layer (e.g., radio resource control, RRC) signaling. The CIF field is an x-bit field (e.g., x=3) in the PDCCH (i.e., DCI), and may be used to indicate a (serving) cell index of a scheduled cell.

CIF disabled: There is no CIF in the PDCCH. The PDCCH on the scheduling cell allocates PDSCH/

PUSCH resources on the same cell. That is, the scheduling cell is the same as the scheduled cell.

CIF enabled: There is a CIF in the PDCCH. The PDCCH on scheduling may allocate a PDSCH/PUSCH resource on one cell among a plurality of cells by using a CIF. The scheduling cell may be the same as or different from the scheduled cell. PDSCH/PUSCH means PDSCH or PUSCH.

Figure 9:
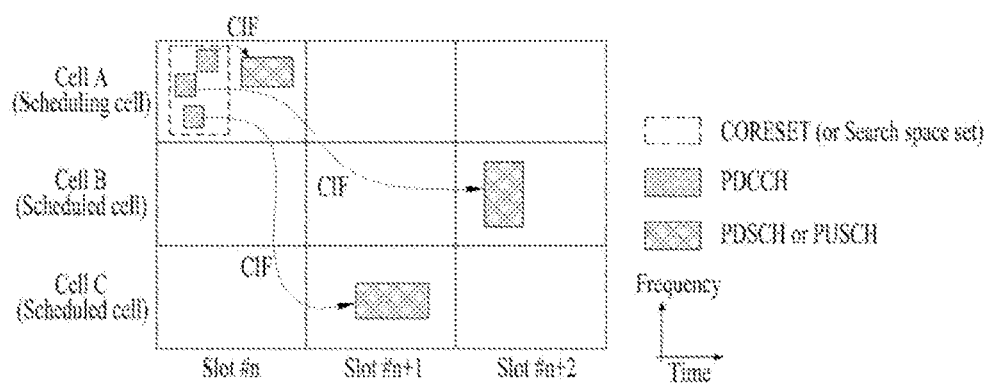
FIG. 9 is a diagram illustrating an example of a scheduling method in case of carrier aggregation to which various embodiments are applicable.

FIG. 9 is a diagram illustrating an example of a scheduling method in case of carrier aggregation to which various embodiments are applicable. FIG. 9 illustrates scheduling when multi-cells are merged.

Referring to FIG. 9, it is assumed that 3 cells are merged. When CIF is disabled, only PDCCH scheduling its own PDSCH/PUSCH may be transmitted in each cell (self-carrier scheduling, SCS). On the other hand, when CIF is enabled by UE-specific (or UE-group-specific or cell-specific) higher layer signaling and cell A is configured as a scheduling cell, in cell A, not only the PDCCH scheduling the PDSCH/PUSCH of the cell A but also the PDCCH scheduling the PDSCH/PUSCH of another cell (i.e., a scheduled cell) may be transmitted (cross-carrier scheduling, CCS). In this case, the PDCCH scheduling its own cell is not transmitted in cell B/C.

In order to configure MSG and/or SCG, an information element (IE) CellGroupConfig may be used. A cell group may include one medium access control (MAC) entity, a set of logical channels associated with a radio link control (RLC) entity, a PCell (SpCell), and/or one or more SCells. CellGroupConfig may include at least the fields of Table 10.

TABLE 10

```
CellGroupConfig ::=                      SEQUENCE {
    cellGroupId                          CellGroupId,
    rlc-BearerToAddModList                           SEQUENCE (SIZE(1..maxLC-ID)) OF RLC-BearerConfig         OPTIONAL,   -- Need N
    rlc-BearerToReleaseList                          SEQUENCE (SIZE(1..maxLC-ID)) OF LogicalChannelIdentity   OPTIONAL,   -- Need N
    mac-CellGroupConfig                              MAC-CellGroupConfig                              OPTIONAL,   -- Need M
    physicalCellGroupConfig                          PhysicalCellGroupConfig                          OPTIONAL,   -- Need M
    spCellConfig                                     SpCellConfig                                     OPTIONAL,   -- Need M
    sCellToAddModList                                SEQUENCE (SIZE (1..maxNrofSCells)) OF SCellConfig  OPTIONAL,   -- Need N
    sCellToReleaseList                               SEQUENCE (SIZE (1..maxNrofSCells)) OF SCellIndex   OPTIONAL,   -- Need N
    ...,
    [[
    reportUplinkTxDirectCurrent                      ENUMERATED   {true}
    OPTIONAL   -- Cond BWP-Reconfig
    ]],
SCellConfig ::=                          SEQUENCE {
    sCellIndex                           SCellIndex,
    sCellConfigCommon                                ServingCellConfigCommon
    OPTIONAL,   -- Cond SCellAdd
    sCellConfigDedicated                             ServingCellConfig
    OPTIONAL,   -- Cond SCellAddMod
    ...,
    [[
    smtc                                             SSB-MTC
    OPTIONAL   -- Need S
    ]],
    [[
    sCellState-r16                                   ENUMERATED   (activated)
    OPTIONAL,   -- Cond SCellAddSync
    secondaryDRX-GroupConfig-r16                     ENUMERATED   {true}
    OPTIONAL   -- Cond DRX-Config2
    ]] }
```

For a description of each field of Table 10, refer to Tables 11 to 14.

TABLE 11

CellGroupConfig field descriptions mac-CellGroupConfig
MAC parameters applicable for the entire cell group.
rlc-BearerToAddModList
Configuration of the MAC Logical Channel, the corresponding RLC entities and association with radio bearers.
reportUplinkTxDirectCurrent
Enables reporting of uplink and supplementary uplink Direct Current location information upon BWP configuration and reconfiguration. This field is only present when the BWP configuration is modified or any serving cell is added or removed. This field is absent in the IE CellGoupConfig when provided as part of RRCSetup message. If UE is configured with SUL carrier, UE reports both UL and SUL Direct Current locations.

TABLE 11-continued

CellGroupConfig field descriptions sCellToAddModList
List of secondary serving cells (SCells) to be added or modified.
sCellToReleaseList
List of secondary serving cells (SCells) to be released
spCellConfig
Parameters for the SpCell of this cell group (PCell of MCG or PSCell of SCG).

TABLE 12

SCellConfig field descriptions smtc
The SSB periodicity/offset/duration configuration of target cell for NR SCell addition. The network sets the periodicityAndOffset to indicate the same periodicity as ssb-periodicityServingCell in sCellConfigCommon. The smtc is based on the timing of the SpCell of associated cell group. In case of inter-RAT handover to NR, the timing reference is the NR PCell. In case of intra-NR PCell change (standalone NR) or NR PSCell change (EN-DC), the timing reference is the target SpCell. If the field is absent, the UE uses the SMTC in the measObjectNR having the same SSB frequency and subcarrier spacing, as configured before the reception of the RRC message.

TABLE 13

SpCellConfig field descriptions servCellIndex
Serving cell ID of a PSCell. The PCell of the Master Cell Group uses ID = 0.

TABLE 14

| Conditional Presence | Explanation |
|---|---|
| BWP-Reconfig | The field is optionally present, Need N, if the BWPs are reconfigured or if serving cells are added or removed. Otherwise it is absent. |
| DRX-Config2 | The field is optionally present, Need N, if drx-ConfigSecondaryGroup is configured. It is absent otherwise. |
| ReconfWithSync | The field is mandatory present in the RRCReconfiguration message:<br>    in each configured CellGroupConfig for which the SpCell changes,<br>  in the masterCellGroup at change of AS security key derived from $K_{gNB}$,<br>  in the secondaryCellGroup at:<br>  PSCell addition,<br>  SCG resume with NR-DC or (NG)EN-DC,<br>  update of required SI for PSCell,<br>  change of AS security key derived from S-$K_{gNB}$ while the UE is configured with at least one radio bearer with keyToUse set to secondary and that is not released by this RRCReconfiguration message,<br>Otherwise, it is optionally present, need M. The field is absent in the masterCellGroup in RRCResume and RRCSetup messages and is absent in the masterCellGroup in RRCReconfiguration messages if source configuration is not released during DAPS handover. |
| SCellAdd | The field is mandatory present upon SCell addition; otherwise it is absent. Need M. |
| SCellAddMod | The field is mandatory present upon SCell addition; otherwise it is optionally present, need M. |
| SCellAddSync | The field is optionally present, Need N, in case of SCell addition, reconfiguration with sync, and resuming an RRC connection. It is absent otherwise. |
| SCG | The field is mandatory present in an SpCellConfig for the PSCell. It is absent otherwise. |

IE ServingCellConfigCommon may be used to configure a cell-specific parameter of the serving cell of the UE. The IE may include parameters generally obtained from SSB, MIB, or SIBs when the UE accesses a cell in IDLE. From this IE, the network may provide this information with dedicated signaling when configuring the SCell and/or an additional cell group (SCG) to the UE. In addition, corresponding information may be provided for SpCell (MCG and/or SCG) when synchronization is reconfigured (upon reconfiguration with sync). ServingCellConfigCommon may include at least the fields of Table 15.

TABLE 15

```
ServingCellConfigCommon ::=     SEQUENCE {
  physCellId                                           PhysCellId
OPTIONAL, -- Cond HOAndServCellAdd,
  downlinkConfigCommon                                 DownlinkConfigCommon
OPTIONAL, -- Cond HOAndServCellAdd
  uplinkConfigCommon                                   UplinkConfigCommon
OPTIONAL, -- Need M
  supplementaryUplinkConfig                            UplinkConfigCommon
OPTIONAL, -- Need S
  n-TimingAdvanceOffset              ENUMERATED { n0, n25600, n39936 }
OPTIONAL, -- Need S
  ssb-PositionsInBurst           CHOICE {
    shortBitmap                    BIT STRING (SIZE (4)),
    mediumBitmap                   BIT STRING (SIZE (8)),
    longBitmap                     BIT STRING (SIZE (64))
  }
OPTIONAL, -- Cond AbsFreqSSB
  ssb-periodicityServingCell         ENUMERATED { ms5, ms10, ms20, ms40, ms80, ms160,
spare2, spare1, }    OPTIONAL, -- Need S
  dmrs-TypeA-Position                ENUMERATED {pos2, pos3},
  lte-CRS-ToMatchAround                  SetupRelease { RateMatchPatternLTE-CR3 }
OPTIONAL, -- Need M
  rateMatchPatternToAddModList       SEQUENCE (SIZE (1..maxNrofRateMatchPatterns))
OF RateMatchPattern   OPTIONAL, -- Need N
  rateMatchPatternToReleaseList      SEQUENCE (SIZE (1..maxNrofRateMatchPatterns))
OF RateMatchPatternId OPTIONAL, -- Need N
  ssbSubcarrierSpacing                                 SubcarrierSpacing
OPTIONAL, -- Cond HOAndServCellWithSSB
  tdd-UL-DL-ConfigurationCommon                        TDD-UL-DL-ConfigCommon
OPTIONAL, -- Cond TDD
  ss-PBCH-BlockPower                 INTEGER (-60..50),
  ...,
  [[
  channelAccessMode-r16          CHOICE {
    dynamic                        NULL,
    semiStatic                     SemiStaticChannelAccessConfig
  }
OPTIONAL, -- Cond SharedSpectrum
  discoveryBurstWindowLength-r16     ENUMERATED {ms0dot5, ms1, ms2, ms3, ms4,
ms5}          OPTIONAL, -- Need M
  ssb-PositionQCL-r16                                  SSB-PositionQCL-Relation-r16
OPTIONAL, -- Cond SharedSpectrum
  highSpeedConfig-r16                                  HighSpeedConfig-r16
OPTIONAL, -- Need R
  ]]
}
```

For a description of each field of Table 15, refer to Tables 16 to 17.

TABLE 16

ServingCellConfigCommon field descriptions channelAccessMode
If present, this field indicates which channel access procedures to apply for operation with shared spectrum channel access as defined in TS 37.213 [48]. If the field is configured as "semiStatic", the UE shall apply the channel access procedures for semi-static channel occupancy as described in subclause 4.3 in TS 37.213. If the field is configured as "dynamic", the UE shall apply the channel access procedures in TS 37.213, with the exception of subclause 4.3 of TS 37.213.
dmrs-TypeA-Position
Position of (first) DM-RS for downlink (see TS 38.211 [16], clause 7.4.1.1.1) and uplink (TS 38.211 [16]. clause 6.4.1.1.3).
downlinkConfigCommon
The common downlink configuration of the serving cell, including the frequency information configuration and the initial downlink BWP common configuration. The parameters provided herein should match the parameters configured by MIB and SIB1 (if provided) of the serving cell, with the exception of controlResourceSetZero and searchSpaceZero which can be configured in ServingCellConfigCommon even if MIB indicates that they are absent.
discoveryBurstWindowLength
Indicates the window length of the discovery burst in ms (see TS 37.213 [48]).
longBitmap
Bitmap when maximum number of SS/PBCH blocks per half frame equals to 64 as defined in TS 38.213 [13], clause 4.1.
lte-CRS-ToMatchAround
Parameters to determine an LTE CRS pattern that the UE shall rate match around.
mediumBitmap
Bitmap when maximum number of SS/PBCH blocks per half frame equals to 8 as defined in TS 38.213 [13], clause 4.1.
n-TimingAdvanceOffset
The N_TA-Offset to be applied for all uplink transmissions on this serving cell. If the field is absent, the UE applies the value defined for the duplex mode and frequency range of this serving cell. See TS 38.133 [14], table 7.1.2-2.

TABLE 16-continued

ServingCellConfigCommon field descriptions rateMatchPatternToAddModList
Resources patterns which the UE should rate match PDSCH around. The UE rate matches around the union of all resources indicated in the rate match patterns. Rate match patterns defined here on cell level apply only to PDSCH of the same numerology (see TS 36.214 [19], clause 5.1.4.1).
semiStaticChannelAcessConfig
The parameters for semi-static channel access.
shortBitmap
Bitmap when maximum number of SS/PBCH blocks per half frame equals to 4 as defined in TS 38.213 [13]. clause 4.1.
ss-PBCH-BlockPower
Average EPRE of the resources elements that carry secondary synchronization signals in dBm that the NW used for SSB transmission, see TS 38.213 [13], clause 7.
ssb-periodicityServingCell
The SSB periodicity in ms for the rate matching porpose. If the field is absent, the UE applies the value ms5. (see TS 38.213 [13]. clause 4.1)
ssb-PositionQCL
Indicates the QCL relationship between SSB positions for this serving cell as specified in TS 38.213 [13], clause 4.1.
ssb-PositionInBurst
For operation in licensed spectrum, indicates the time domain positions of the transmitted SS-blocks in a half frame with SS/PBCH blocks as defined in TS 38.213 [13], clause 4.1. The first/leftmost bit corresponds to SS/PBCH blocks index 0, the second bit corresponds to SS/PBCH blocks index 1, and so on. Value 0 in the bitmap indicates that the corresponding SS/PBCH block is not transmitted while value 1 indicates that the corresponding SS/PBCH block is transmitted. The network configures the same pattern in this field as in the corresponding feld in ServingCellConfigCommonSIB.
For operation with shared spectrum channel access, only mediumBitmap is used and the UE assumes that one or more SS/PBCH blocks indicated by ssb-PositionInBurst may be transmitted within the discovery burst transmission window and have candidate SS/PBCH blocks indexes corresponding to SS/PBCH blocks indexes provided by ssb-PositionInBurst (see TS 38.213 [13]. clause 4.1). If the k-th bit of ssb-PositionsInBurst is set to 1, the UE assumes that one or more SS/PBCH blocks within the discovery burst transmission window with candidate SS/PBCH block indexes corresponding to SS/PBCH block index equal to k-1 may be transmitted; if the kt-th bit is set to 0, the UE assumes that the corresponding SS/PBCH block(s) are not transmitted. If ssb-PositionQCL is configured, the UE expects that the k-th bit is set to 0, where k > ssb-PositionQCL and the number of actually transmitted SS/PBCH blocks is not larger than the number of 1's in the bitmap. The network configures the same pattern in this field as in the corresponding field in ServingCellConfigCommonSIB.
ssbSubcarrierSpacing
Subcarrier spacing of SSB. Only the values 15 kHz or 30 kHz (FR1), and 120 kHz or 240 kHz (FR2) are applicable.
supplementaryUplinkConfig
The network configures this field only if uplinkConfigCommon is configured. If this field is absent, the UE shall release the supplementaryUplinkConfig and the supplementaryUplink configured in ServingCellConfig of this serving cell, if configured.
tdd-UL-DL-ConfigurationCommon
A cell-specific TDD UL/DL configuration, see TS 38.213 [13]. clause 11.1.

TABLE 17

| Conditional Presence | Explanation |
| --- | --- |
| AbsFreqSSB | The field is absent when absoluteFrequencySSB in frequencyInfoDL is absent, otherwise the field is mandatory present. |
| HOAndServCellAdd | This field is mandatory present upon SpCell change and upon serving cell (PSCell/SCell) addition. Otherwise, the field is absent. |
| HOAndServCellWithSSB | This field is mandatory present upon SpCell change and upon serving cell (SCell with SSB or PSCell) addition. Otherwise, the field is absent. |
| SharedSpectrum | This field is mandatory present if this cell operates with shared spectrum channel access. Otherwise, it is absent, Need R. |
| TDD | The field is optionally present, Need R, for TDD cells; otherwise it is absent. |

Minimum Requirement for NR Carrier Aggregation

For intra-band CA, only co-located deployment may be applied. For intra-band discontinuous NR carrier aggregation, the UE should be able to at least handle a relative receive timing difference between slot timings of different carriers to be merged in the UE receiver. The maximum reception timing difference requirement for intra-band discontinuous NR carrier aggregation may refer to Table 18.

TABLE 18

| Frequency Range | Maximum receive timing difference (μs) |
| --- | --- |
| FR1 | 3[1] |
| FR2 | 0.26 |

Note 1:
In the case of different SCS on different CCs, if the receive time difference exceeds the cyclic prefix length of that SCS, demodulation performance degradation is expected for the first symbol of the slot.

For inter-band NR carrier aggregation, the UE should be able to at least handle a relative receive timing difference between slot timings of all pairs of carriers to be merged in the UE receiver. The maximum receive timing difference requirement for inter-band NR carrier aggregation may refer to Table 19.

TABLE 19

| Frequency Range of the pair of carriers | Maximum receive timing difference (μs) |
| --- | --- |
| FR1 | 33 |
| FR2 | 8 |
| Between FR1 and FR2 | 25 | deriveSSB-IndexFromCell Tolerance

When deriveSSB-IndexFromCell is enabled, the UE may assume that the frame boundary alignment (including half-frame, sub-frame and/or slot boundary (boundary) alignment) across cells of the same frequency carrier is within a tolerance that is not worse than min(2 SSB symbols, 1 PDSCH symbol), and all SFNs (system frame numbers) of all cells of the same frequency carrier are the same. For a description of deriveSSB-IndexFromCell, refer to Table 20.

TABLE 20

| deriveSSB-IndexFromCell |
| --- |
| This field indicates whether the UE may use the timing of any detected cell on that frequency to derive the SSB index of all neighbour cells on that frequency. If this field is set to true, the UE assumes SFN and frame boundary alignment across cells on the neighbor frequency as specified in TS 38.133 [14]. |

2. Various Embodiments

Hereinafter, various embodiments will be described in more detail based on the above technical idea. The contents of the first section described above may be applied to various embodiments described below. For example, operations, functions, terms, etc. that are not defined in various embodiments described below may be performed and described based on the contents of the first section.

Symbols/abbreviations/terms used in the description of various embodiments may be as follows.

A/B/C: A and/or B and/or C

ARFCN: absolute radio-frequency channel number, it may be a code designating a reference frequency pair used for transmission and reception in a wireless communication system.

CA: carrier aggregation

CC: component carrier, in the description of various embodiments, CC may be replaced with a cell/serving cell or the like.

DC: dual connectivity point A: it may be a common reference point for all resource grids in the frequency domain. For example, point A may be obtained as follows:

offsetToPointA for PCell downlink indicates the frequency offset between the point A and the lowest subcarrier of the lowest resource block overlapping the SS/PBCH block used by the UE for initial cell selection, and is expressed in resource block units assuming a 15 kHz subcarrier spacing for FR1 and a 60 kHz subcarrier spacing for FR2, for other cases, absoluteFrequencyPointA may indicate the frequency-position of point A expressed as in ARFCN.

SCS: subcarrier spacing

SFN: system frame number slot n: it may mean a slot having an n-th index/corresponding to the n-th index, and may be replaced with slot #n or the like. For example, a similar expression may be applied to symbols/subframes/frames and the like.

ceil (x): $\lceil x \rceil$, ceiling operation. ceil function. It may mean a minimum integer greater than or equal to the real number x and/or an integer greater than or equal to the real number x.

floor (x): $\lfloor x \rfloor$, floor operation. floor function. It may mean a maximum integer less than or equal to the real number x and/or an integer less than or equal to the real number x.

mod: modulo arithmetic, modulo operation. For example, the modulo operation may be an operation to obtain a remainder r obtained by dividing a dividend q by a divisor d. (r=q mod (d)).

In the description of various embodiments, more than/equal to or more than A may be replaced with equal to or more than/more than A.

In the description of various embodiments, less than/equal to or less than A may be replaced with equal to or less than/less than B.

In the description of various embodiments, the start of a symbol/slot/subframe/frame may be replaced with a start boundary of a symbol/slot/subframe/frame, and the end of the symbol/slot/subframe/frame may be replaced with the end boundary of the symbol/slot/subframe/frame.

In the existing carrier aggregation, SFN/frame boundary/slot boundary alignment (alignment) between all carriers was assumed. In the case of intra-band CA, when two signals transmitted from two cells are received, there is a requirement to be received with a time difference within 3 us (micro-second) between the two signals, and in the case of inter-band CA, when two signals transmitted from two cells are received, there is a requirement to be received with a time difference within 33 us between the two signals.

In a wireless communication system to which various embodiments are applicable (e.g., a wireless communication system supporting NR Release.16 and/or a wireless communication system supporting a release after Release.16), even in the case of CA, the time boundary used in each carrier may be designed to be operated differently. For example, when the time boundary of each cell (each SCell) is operated differently and the time difference becomes several hundred us or more, the UE may identify/determine/decide that each carrier is asynchronous and attempt an operation such as signal detection to identify/determine/decide/detect/find the time boundary of each carrier. In this case, for example, the detection complexity for the UE to identify/determine/decide/detect/find the time boundary of each carrier may be increased, and the time for SCell addition may also be increased.

Various embodiments may relate to a method in which time boundary information is obtained. For example, it may relate to a method in which carrier and/or inter-cell time boundary information is obtained in a multi-carrier system. According to various embodiments, a time information indication method for solving the above-described problem may be provided. For example, a time offset indication method may be provided.

Figure 10:
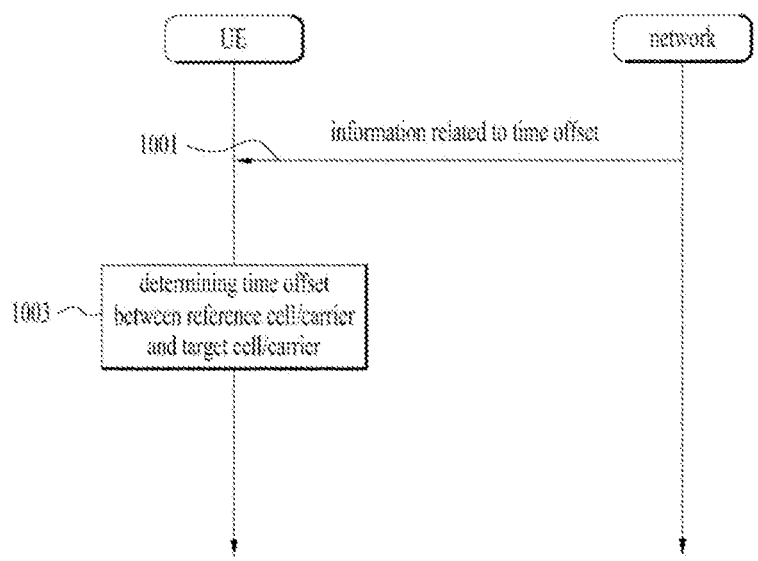
FIG. 10 is a diagram briefly illustrating a method of operating a UE and a network according to various embodiments.

FIG. 10 is a diagram briefly illustrating a method of operating a UE and a network according to various embodiments.

Figures 11A, 11B:
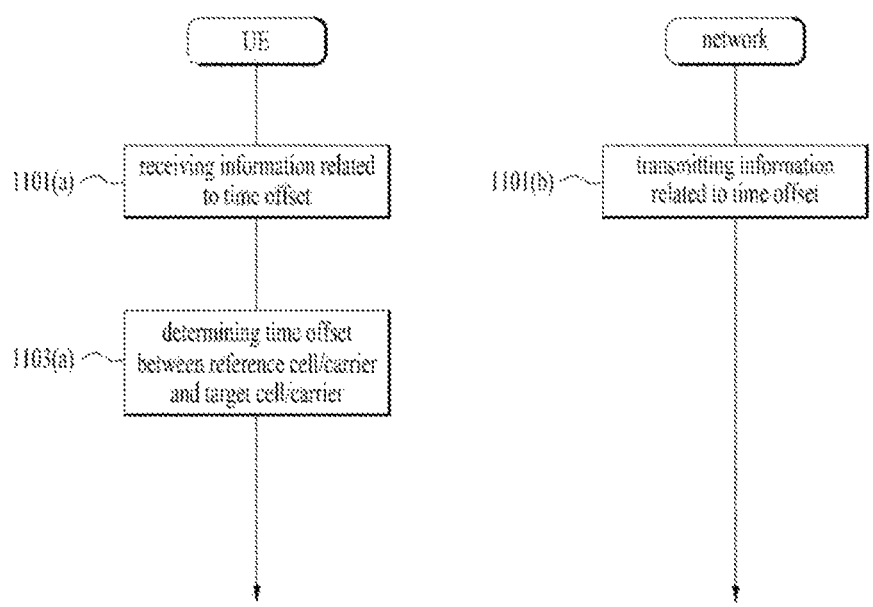
FIGS. 11A and 11B are flowcharts illustrating a method of operating a UE and a network according to various embodiments.

FIGS. 11A and 11B are flowcharts briefly illustrating a method of operating a UE and a network according to various embodiments.

Referring to FIG. 10 and FIGS. 11A and 11B, in operations 1001, 1101(a), 1101(b) according to various embodiments, a network (e.g., a base station) may transmit information related to a time offset and a UE may receive it.

In operations 1003 and 1103(a) according to various embodiments, the UE may determine a time offset between the reference cell/carrier (e.g., The time offset between SCells, etc.) and the target cell/carrier (e.g., SCell, etc.).

More specific operations, functions, terms, etc. in the operation according to each of the various embodiments may be performed and described based on the various embodiments to be described later. Meanwhile, the operations according to each of the various embodiments are exemplary, and according to the specific contents of each embodiment, one or more of the above-described operations may be omitted.

Hereinafter, various embodiments will be described in detail. The various embodiments described below may be combined in whole or in part to constitute other various embodiments unless mutually exclusive, which may be clearly understood by those of ordinary skill in the art.

Method 1

According to various embodiments, a network (e.g., a base station) may provide time offset information (e.g., information on a time offset value) between carriers and/or cells to a UE, and the UE may determine the time boundary constituting the signals using the time offset information provided by the network.

According to various embodiments, in CA/DC, when the PCell and the SCell and/or the PCell and the PScell and/or the PScell and the SCells operate with different boundaries, the network may define a time boundary serving as a reference and indicate a time offset for configuring the time boundary of each cell. According to various embodiments, the network may indicate a time offset corresponding to a difference between a reference time boundary and a time boundary of each cell.

According to various embodiments, a reference time boundary may be a specific cell (e.g., PCell/SpCell/any SCell) as a reference and/or may be configured according to an instruction of a network.

According to various embodiments, a time offset for configuring a time boundary of each cell may be variously expressed such as a slot offset, a SFN offset, an OFDM symbol offset, and a combination etc.

According to various embodiments, a reference time duration (reference time duration) may be an SCS used for a specific cell (e.g., PCell/PSCell/SCell) and/or a specific signal/channel. For example, the reference SCS (and/or offset SCS) may be the SCS of the SS/PBCH of the SpCell and/or the SCS indicated from the network and/or the SCS of any signal/channel used in the corresponding SCell.

According to various embodiments, a time offset may be indicated based on a reference time duration. For example, when the reference SCS is used as the reference time duration, the reference SCS may be one of predetermined values (e.g., 15 kHz/30 kHz/60 kHz/120 kHz/240 kHz), and a time offset (a slot offset, a SFN offset, an OFDM symbol offset and combination, etc.) for configuring the time boundary of each cell based on the reference SCS may be indicated. According to various embodiments, considering that numerology varies according to the SCS, the length of time corresponding to the time offset may vary according to the value of the reference SCS. According to various embodiments, the granularity of information related to the time offset may vary according to the reference SCS.

According to various embodiments, information on a time offset (e.g., information on a slot offset) may be transmitted and received based on the value of reference SCS in carrier aggregation, and information on the time offset (e.g., information on a slot offset) may indicate a time offset (e.g., a slot offset) between PCell/PSCell and SCell, and the UE may determine a time offset of SCell based on information on a time offset (e.g., information on the slot offset).

According to various embodiments, the reference SCS is related to a unit in which a time offset is indicated (e.g., per slot/slot unit), and the reference time boundary may be related to which cell the offset is applied based on the time boundary. For example, when PCell (and/or reference cell) is configured to 15 kHz SCS, and SCell (and/or target cell) is configured to 30 kHz SCS, as the reference SCS is determined as the 30 kHz, a time offset (e.g., a slot offset) may be indicated (e.g., indicated as 2) in a unit corresponding to the reference SCS. In this case, the UE may acquire/determine the time boundary of the SCell (e.g., a slot boundary) based on applying (e.g., shifting by 2 slots length at 30 kHz SCS with respect to the slot boundary of PCell configured to 15 kHz SCS) the indicated time offset (e.g., a slot offset) based on the 30 kHz SCS, based on the time boundary of the PCell configured as the 15 kHz SCS (e.g., a slot boundary). In other words, according to various embodiments, a slot granularity at which the slot offset is indicated may vary according to the reference SCS for the slot offset indication.

According to various embodiments, the reference SCS may be determined based on a preconfigured/defined method. For example, the reference SCS may be determined from among the SCSs of cells in which the time offset is indicated. For example, the time offset may indicate an offset between the PSCell/PSCell and the SCell, and the reference SCS may be determined from among the SCSs of the PSCell/PSCell and the SCell. According to various embodiments, a specific method of determining the reference SCS may be provided. For example, the reference SCS may be determined based on the magnitude relationship between the PSCell/PSCell and the SCS of the SCell.

According to various embodiments, when a slot offset is indicated, integer values of −A, . . . , −1, 0, 1, . . . , A may be used as an offset index, and A may be a different natural number value according to SCS. According to various embodiments, a granularity of information on the time offset may be determined according to a reference SCS for the time offset. For example, when a slot offset is indicated, integer values of −9, −8, −7, . . . , −1, 0, 1, 2, . . . , 9 may be used as the offset index. According to various embodiments, when a slot offset index is indicated for a specific cell, the UE identifies/determines/recognizes a slot at a point spaced apart by the slot offset index based on the reference slot index of the configured reference cell as the reference slot index of the specific cell.

According to various embodiments, the UE may receive information related to a time offset between a reference cell/carrier and another cell/carrier. According to various embodiments, the UE may receive a signal from a plurality of cells/carriers including a reference cell/carrier and other cell/carriers, and may determine/decide whether time boundaries of a plurality of cells/carriers match based on information related to a time difference and/or a time offset of a received signal. This is an example of various embodiments, and various embodiments are not limited thereto.

According to various embodiments, a network (e.g., a base station) may receive information related to a time offset between a reference cell/carrier and another cell/carrier. According to various embodiments, the network may transmit a signal for at least one of a plurality of cells/carrier including the reference cell/carrier and other cells/carriers. According to various embodiments, information related to one or more signals and/or time offsets may be used to determine/decide whether time boundaries of a plurality of cells/carriers match. This is an example of various embodiments, and various embodiments are not limited thereto.

Embodiment 1. Carrier Aggregation

For example, in a carrier aggregation, when the reception time difference of a signal transmitted from each cell is within an error range of 3 us (intra-band) or (about) 33 us (inter-band), it may be assumed that the time boundary is aligned.

According to various embodiments, when slot boundaries between cells do not match (however, the SFNs still match) and if two signals are received (from difference cells) within an error range of 3 us (intra-band) or (about) 33 us (inter-band) through slot staggering (e.g., N slot duration ±3 us)(N is an integer and/or an integer greater than or equal to zero and/or a natural number), the SFN and/or frame boundary of the two cells may be said to be aligned. In various embodiments, slot staggering may refer to the principle of deriving an uplink slot configuration from a downlink slot configuration. For example, the uplink slot configuration may be derived by shifting the slot number according to the downlink slot configuration by N.

Figure 12A:
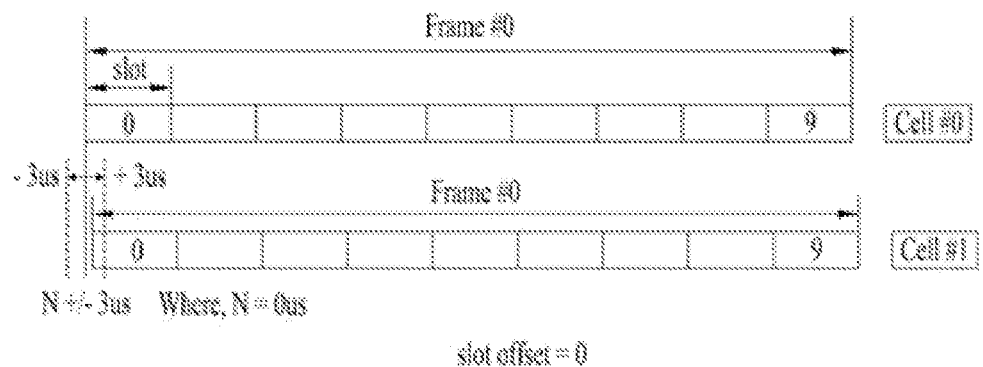
FIGS. 12A and 12B are diagrams illustrating an example of a frame boundary configuration according to various embodiments.
Figure 12B:
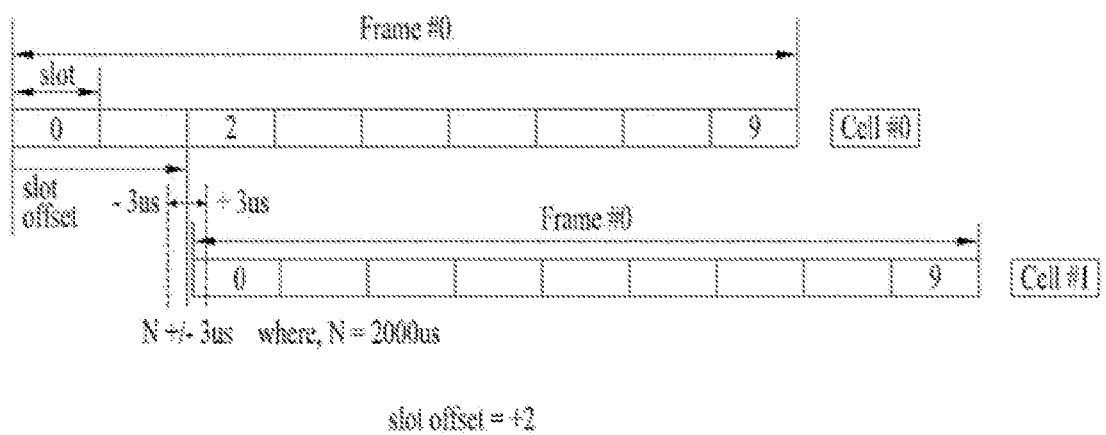

FIGS. 12A and 12B are diagrams illustrating an example of a frame boundary configuration according to various embodiments.

Referring to FIG. 12A, according to various embodiments, when a slot offset is configured/indicated to 0 (N corresponds to 0 us), and intra-band carrier aggregation is configured between cell #0 (serving cell/reference cell) and cell #1 (target cell), a UE may assume that the SFN and/or frame boundary of cell #1 (corresponding to frame #0) is aligned with the SFN and/or frame boundary of the serving cell (corresponding to frame #0) offset by 0 slot within an error range.

Referring to FIG. 12B, according to various embodiments, when a slot offset is configured/indicated to 2 (N corresponds to 2000 us. However, this is an example, and the actual time length occupied by the slot offset may vary according to SCS/numerology), when intra-band carrier aggregation is configured between cell #0 (serving cell) and cell #1 (target cell), the UE may assume that the SFN and/or frame boundary of cell #1 (corresponding to frame #0) is aligned with the SFN and/or frame boundary of the serving cell (corresponding to frame #0) offset by 2 slots within a tolerance range. According to various embodiments, in a time resource (e.g., a time resource corresponding to a time length of slot offset 2 (within an allowable error range)) positioned to the left of the slot boundary of slot 0 of cell #1, a different signal may be transmitted and received. For example, according to LTE-NR coexistence, signals based on the LTE system (e.g., PSS, SSS, etc. of the LTE system) may be transmitted/received in the corresponding time resource.

According to various embodiments, when a offset=N is configured/indicated according to a specific IE, and carrier aggregation between two cells (or frequency) is configured, the UE may assume that SFN and/or frame boundary of the target cell is aligned with the SFN and/or frame boundary of the serving cell offset by N slots. For example, the meaning of being aligned may include being aligned within a tolerance range according to the aforementioned intra-band carrier aggregation and inter-band carrier aggregation.

According to various embodiments, when a offset=N is configured/indicated, and carrier aggregation between two cells (or frequency) is configured, the UE may obtain the SFN and/or frame boundary of the target cell by applying an offset value of N slots to the SFN and/or frame boundary of the serving cell. For example, the SFN and/or frame boundary of the serving cell may be obtained based a synchronization procedure for obtaining frequency and time synchronization of the serving cell, and/or based on a frame boundary alignment assumption, and/or based on the method according to various other embodiments.

According to various embodiments, when a time boundary is different for each cell in carrier aggregation (e.g., when a slot offset is applied differently for each cell), in N (natural number) frequency layers, 1) based on a cell of a specific frequency layer 2) in a specific frequency layer, if slot offset is applied and deriveSSB-IndexFromCell (e.g., a parameter used in SIB2, SIB4, Measurement object, etc.) is configured to "true", the UE may assume that 1) all cells of a specific frequency layer will maintain a reference time boundary, and 2) that the same slot offset is applied to all cells of a specific frequency layer.

According to various embodiments, transmissions in multiple cells may be aggregated. Unless otherwise specified, the method according to various embodiments may be applied to each serving cell.

According to various embodiments, for carrier aggregation of cells with unaligned frame boundaries, the slot offset between the PCell/PSCell and the SCell may be determined from a higher layer parameter for the SCell. According to various embodiments, the slot offset may be indicated based on (numerology of) a reference SCS, and the reference SCS may correspond to an SCS of a specific cell. Based on one or more of the methods according to various embodiments, the reference SCS may be determined.

Embodiment 2. Dual Connectivity

For example, DC may be divided into synchronous DC and asynchronous DC.

According to various embodiments, a frequency domain (FD) synchronization indicator (FD-sync indicator) that indicates/informs that synchronization is matched or not synchronized for each carrier and/or each cell may be used. For example, when the frequency domain sync indicator is indicated as true, it may mean that synchronization is matched for each carrier and/or each cell, and when the frequency domain sync indicator is indicated as false, it may mean that synchronization is not matched for each carrier and/or each cell.

According to various embodiments, when the frequency domain sync indictor is true, synchronization is matched for each carrier and/or each cell. According to various embodiments, even when the frequency domain sync indicator is true, there may be a difference in a range of a specific level of time boundary (e.g., a slot level/an OFDM symbol level, etc.). For example, when a time offset is indicated/configured from the network and/or a time offset is assumed, if the time difference between two signals (received from different carrier and/or cells) is within a specific range based on the time offset, the UE may assume that the SFN and/or frame boundaries match.

According to various embodiments, when offset=N is configured/indicated according to a specific IE, and the frequency domain sync indicator is configured as true, the UE may assume that the SFN and/or frame boundary of the target cell is aligned with the SFN and/or frame boundary of the serving cell offset by N slots.

According to various embodiments, when offset=N is configured/indicated according to a specific IE, and the frequency domain sync indicator is configured as true, the UE may obtain the SFN and/or frame boundary of the target cell by applying an offset value of N slots to the SFN and/or frame boundary of the serving cell (reference cell). For example, the SFN and/or frame boundary of the serving cell may be obtained based on a synchronization procedure for obtaining frequency and time synchronization of the serving cell, and/or based on a frame boundary alignment assumption, and/or a method according to other various embodiments.

Embodiment 3. Time Offset Indication Method

According to various embodiments, in a multi-carrier system, when adding SpCell and/or SCell as a method for configuring/indicating a time offset for each carrier and/or each cell, a time offset may be configured/indicated for each carrier and/or each cell.

According to various embodiments, when a slot offset is configured differently in the SCell in carrier aggregation, a slot offset parameter may be configured in the SCellConfig IE. For example, the slot offset parameter may be included in SCellConfig in case of Scell addition. For example, the slot offset may be configured/indicated within a preconfigured integer range. For example, referring back to Table 10, sCellSlotOffset for configuring/indicating the slot offset of the SCell may be included in SCellConfig in CellGroupConFIG. For example, it may be configured/indicated as shown in Table 21. For example, in Table 21, M/N may be a constant integer value.

TABLE 21

```
SCellConfig ::= SEQUENCE {
    sCellIndex              SCellIndex,
    sCellConfigCommon       ServingCellConfigCommon        OPTIONAL, -- Cond SCellAdd
    sCellConfigDedicated    ServingCellConfig              OPTIONAL, -- Cond SCellAddMod
    sCellSlotOffset         SlotOffset   OPTIONAL, -- Cond SCellAdd
    ...,
    [[
    Smtc                                                   SSB-MTC OPTIONAL --
Need S
    ]]
}
SlotOffset                  INTEGER (M, ..., N)
```

And/or, according to various embodiments, a slot offset may be applied to the SpCell.

According to various embodiments, a cell that is a reference of a time offset (e.g., a slot offset) of the SpCell may be a master cell and/or a PCell.

According to various embodiments, a cell on which the time offset (e.g., slot offset) of the SCell is referenced may be a SpCell and/or a master cell and/or a PCell. For example, a cell serving as a reference for the time offset of the SCell may be an SpCell included in CellGroupConfig (or configured/defined/indicated based on CellGroupConfig). As another example, if SpCell is not defined in CellGroupConfig, a master cell and/or PCell may be a reference cell.

Method 2

According to various embodiments, when an offset of a slot level is indicated, it may indicate in units of 0.5 ms and/or 1 ms.

EMBODIMENT

Figure 13:
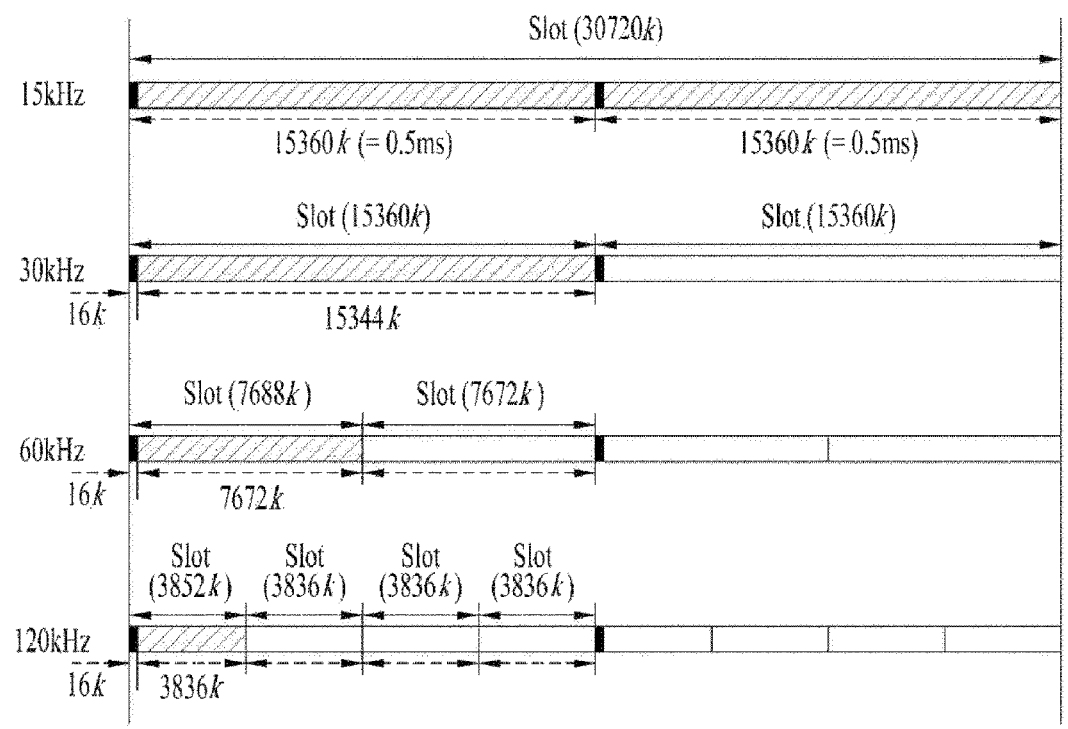
FIG. 13 is a diagram illustrating an example of a slot structure according to various embodiments.

FIG. 13 is a diagram illustrating an example of a slot structure according to various embodiments.

In a wireless communication system to which various embodiments are applicable, sizes of various fields in the time domain may be expressed based on a time unit of $T_c=1/(\Delta f_{max}*N_f)$. Here, $\Delta f_{max}$ is $480*10^3$ Hz and $N_f$ is 4096.

In a wireless communication system to which various embodiments are applicable, constant number k (k, kappa) may be $T_s/T_c=64$, and $T_s$ may be $1/(\Delta f_{ref}*N_{f,ref})$, and $\Delta f_{ref}$ may be $15*10^3$ Hz, and $N_{f,ref}$ may be 2048.

For example, a subframe defined in the NR system may be represented by 30720k with a 1 ms (=$30720*T_s$=30720/$F_s$, $F_s$=1/2048/15000 Hz) time length.

For example, a 15 kHz SCS slot length may be 30720k (1 ms) (k (x, kappa)=$T_s/T_c=64$), and each half-slot may be 15360k (15344k+16k) (0.5 ms).

For example, a 30 kHz SCS slot length may be 15360k (15344k+16k) (0.5 ms).

For example, a 60 kHz SCS and/or a 120 kHz SCS slot length may be defined as a value divided by a value of a power of 2 for the remaining time except for 16k in front of every 0.5 ms, and, in particular, a 16k length may be added to slots specifically positioned 0.5 ms ahead (60 kHz SCS slots=[7688k, 7672k], 120 kHz SCS slots=[3852k, 3836k, 3836k, 3836k]). For example, a length of 16k may be added to the first slot positioned at the front in the time domain within the 0.5 ms time duration.

For example, the slot index may be defined so that the slot positioned before 0.5 ms has index 0. For example, the slot index may be defined such that index 0 is assigned to the first slot positioned at the front in the time domain within the 0.5 ms time duration, and then sequential indexes are assigned.

According to various embodiments, when a slot offset is applied to a specific carrier in inter-band CA, in order to ensure that the slot positioned before 0.5 ms has index 0, a slot offset may be specified in units of 0.5 ms. According to various embodiments, when a slot offset is applied to a specific carrier in inter-band CA, a slot offset may be designated in units of 0.5 ms so that index 0 may be assigned to the first slot positioned at the front in the time domain within the 0.5 ms time duration.

For example, in case of 60 kHz SCS and/or 120 kHz SCS slot, a slot offset value may be indicated as −4, −2, 0, 2, 4, . . . and/or −8, −4, 0, 4, 8 etc. For example, in case of 60 kHz SCS and/or 120 kHz SCS slot, a slot offset value may be indicated by one of {−4, −2, 0, 2, 4, . . . } and/or one of {−8, −4, 0, 4, 8}.

According to various embodiments, in particular, when the alignment between slot indices within a frame (10 ms) having the same SFN between carriers is configured to not match, the range of the slot offset may be −5 ms/+5 ms.

According to various embodiments, a slot offset index and/or a slot offset value may depend on reference numerology and/or reference SCS for indicating a slot offset. According to various embodiments, the reference numerology and/or the reference SCS may be preconfigured and/or may be determined based on a specific numerology and/or a specific SCS of the SCell.

For example, the range of the slot offset index according to a value of the reference SCS may be as follows:

For 15 kHz SCS, the slot offset may be −5, −4, −3, −2, −1, 0, 1, 2, 3, 4. For 15 kHz SCS, the slot offset may be indicated by one of {−5, −4, −3, −2, −1, 0, 1, 2, 3, 4}.

For 30 kHz SCS, the slot offset may be −10, −9, −8, −7, −6, −5, −4, −3, −2, −1, 0, 1, 2, 3, 4, 5, 6, 7, 8, 9. For 30 kHz SCS, the slot offset may be indicated by one of {−10, −9, −8, −7, −6, −5, −4, −3, −2, −1, 0, 1, 2, 3, 4, 5, 6, 7, 8, 9}.

For 60 kHz SCS, the slot offset may be (−10, −9, −8, −7, −6, −5, −4, −3, −2, −1, 0, 1, 2, 3, 4, 5, 6, 7, 8, 9)*2. For 60 kHz SCS, the slot offset may be indicated by one of {−20, −18, −16, −14, −12, −10, −8, −6, −4, −2, 0, 2, 4, 6, 8, 10, 12, 14, 16, 18}.

For 120 kHz SCS, the slot offset may be (−10, −9, −8, −7, −6, −5, −4, −3, −2, −1, 0, 1, 2, 3, 4, 5, 6, 7, 8, 9)*4. For 120 kHz SCS, the slot offset may be indicated by one of {−40, −36, −32, −28, −24, −20, −16, −12, −8, −4, 0, 4, 8, 12, 16, 20, 24, 28, 32, 36}.

Method 3

According to various embodiments, when an offset of a slot level is indicated, a slot offset and/or a shift value may be indicated so as to be aligned on a slot grid including 16k of the front part every 0.5 ms. According to various embodiments, when an offset of a slot level is indicated, the slot offset and/or shift value may be indicated so as to be aligned with the slot grid including 16k positioned at the front within the 0.5 ms time duration.

OFDM Symbol Generation

For example, for any physical channel and/or signal except for a physical random access channel (PRACH) and/or a remote interference management reference signal (RIM-RS), a time-continuous signal $S_l^{(p,\mu)}$ for antenna port p and SCS configuration for OFDM symbol $l \in \{0, 1, \ldots, N^{subframe,\mu}_{slot}N^{slot}_{symbol}-1\}$ in the subframe may be determined to satisfy Equation 1 below (defined by Equation 1 below).

$$S_l^{(p,\mu)}(t) = \begin{cases} \bar{S}_l^{(p,\mu)}(t) & t_{start,l}^{\mu} \le t < t_{start,l}^{\mu} + T_{symb,l}^{\mu} \\ 0 & \text{otherwise} \end{cases} \quad [\text{Equation 1}]$$

$$\bar{S}_l^{(p,\mu)}(t) = \sum_{k=0}^{N^{size,\mu}_{grid,x}N^{RB}_{sc}-1} a_{k,l}^{(p,\mu)} e^{j2\pi(k+k_0^{\mu}-N^{size,\mu}_{grid,x}N^{RB}_{sc}/2)\Delta f(t-N^{\mu}_{CP,l}T_c-t^{\mu}_{start,l})}$$

$$k_0^{\mu} = (N^{start,\mu}_{grid,x} + N^{size,\mu}_{grid,x}/2)N^{RB}_{sc} - (N^{start,\mu 0}_{grid,x} + N^{size,\mu 0}_{grid,x}/2)N^{RB}_{sc}2^{\mu_0-\mu}$$

$$T_{symb,l}^{\mu} = (N_u^{\mu} + N_{CP,l}^{\mu})T_c$$

Here, at the start t=0 of the subframe, $N^{\mu}_u$ and $N^{\mu}_{cp,l}$ may be determined to satisfy Equation 2 below (defined by Equation 2 below).

$$N_u^{\mu} = 2048\kappa \cdot 2^{-\mu} \quad [\text{Equation 2}]$$

$$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix}, \; l = 0 \text{ or } l = 7 \cdot 2^{\mu} \\ 144\kappa \cdot 2^{-\mu} & \text{normal cyclic prefix}, \; l \ne 0 \text{ and } l \ne 7 \cdot 2^{\mu} \end{cases}$$

Δf may refer to Table 1

μ may be a subcarrier spacing (SCS) configuration.

μ0 may be the largest value among SCS configuration by the higher layer parameter scs-SpecificCarrierList.

Embodiment 1

According to various embodiments, a slot having a specific index in the existing slot grid may be shifted to have a slot index 0. According to various embodiments, a slot having a specific index based on the slot grid before the shift may be shifted according to a slot offset and/or a shift value to become a slot having a slot index 0.

For example, in a 60 kHz SCS slot, it may be assumed that slot indexes 0, 1, 2, 3, 4, . . . , 39 are configured in accordance with the length order of 7688k, 7672k, 7688k, 7672k, . . . , 7688k, 7672k. For example, when the slot offset is 1, it may be configured to be in the order of length, such as 7672k, 7688k, 7672k, 7688k, . . . , 7672k, 7688k. In this example, when the slot offset is 1, (about) 7688k may be shifted, and the slot duration of the slot index 0 may be changed to 7672k. In this example, +16k may not be applied in the case of slot index 0 in the OFDM symbol generation equation. For example, referring to Equation 2, $N^{\mu}_{cp,l}$ may be 144k*$2^{-\mu}$+16k for normal CP, 1=0 and 1=7*$2^{\mu}$, in this example, 16k is not added, $N^{\mu}_{cp,l}$ may be 144k*$2^{-\mu}$.

According to various embodiments, according to slot shifting, a slot including +16k may be changed from a slot having a slot index of 0 to a slot having a non-zero slot index, and in this case, alignment between the target cell and the reference cell may be achieved.

Slot Offset Indication

As described above, in a wireless communication system to which various embodiments are applicable, sizes of various fields in the time domain may be expressed based on a time unit of $T_c=1/(\Delta f_{max}*N_f)$, where $\Delta f_{max}$ may be 480*103 Hz and $N_f$ may be 4096.

In a wireless communication system to which various embodiments are applicable, the constant k may be $T_s/T_c=64$, and $T_s$ may be $1/(\Delta f_{ref}*N_{f,ref})$, and $\Delta f_{ref}$ may be 15*103 Hz, and $N_{f,ref}$ may be 2048.

According to various embodiments, the slot offset may be determined such that Equation 3 below is satisfied.

$$u \text{ is the subcarrier spacing configuration } (u=0,1,2,3,4), \Delta f=2^u \cdot 15 \text{ [kHz]}$$

$$T_c=1/(\Delta f_{max} \cdot N_f), \text{ where } \Delta f_{max}=480 \cdot 10^3 \text{ Hz}, N_f=4096$$

$$k=T_s/T_c=64, \text{ where, } T_s=1/(\Delta f_{ref} \cdot N_{f,ref}), \Delta f_{ref}=15 \cdot 10^3 \text{ Hz and } N_{f,ref}=2048$$

$$T_o=N_o T_c$$

$$N_o=16k \cdot \text{floor}(O_s+\text{ceiling}(2^{n-1})-1) \cdot 2^{1-u})+ 15344k \cdot O_s \cdot 2^{1-u}, \text{ where } M=10 \cdot 2^u, O_s=-M,\ldots,M \quad \text{[Equation 3]}$$

In Equation 3, $T_o$ may be related to the length of time shifted in the time domain according to the slot offset, and $N_o$ is related to the length of time shifted in the time domain according to the slot offset expressed in units of constant k and $O_s$ may be associated with a slot offset index and/or a slot offset value indicated according to one or more of the methods according to various embodiments. According to various embodiments, a minimum/maximum value and/or a granularity of a slot offset index and/or a slot offset value may vary according to an SCS (reference SCS).

As described above, since 16k is added to the first slot within every 0.5 ms compared to other slots, the amount shifted per slot offset index and/or slot offset value 1 according to SCS may be 16k+L or L, and the floor operation part of $N_o$ may take this point into consideration.

Figure 14:
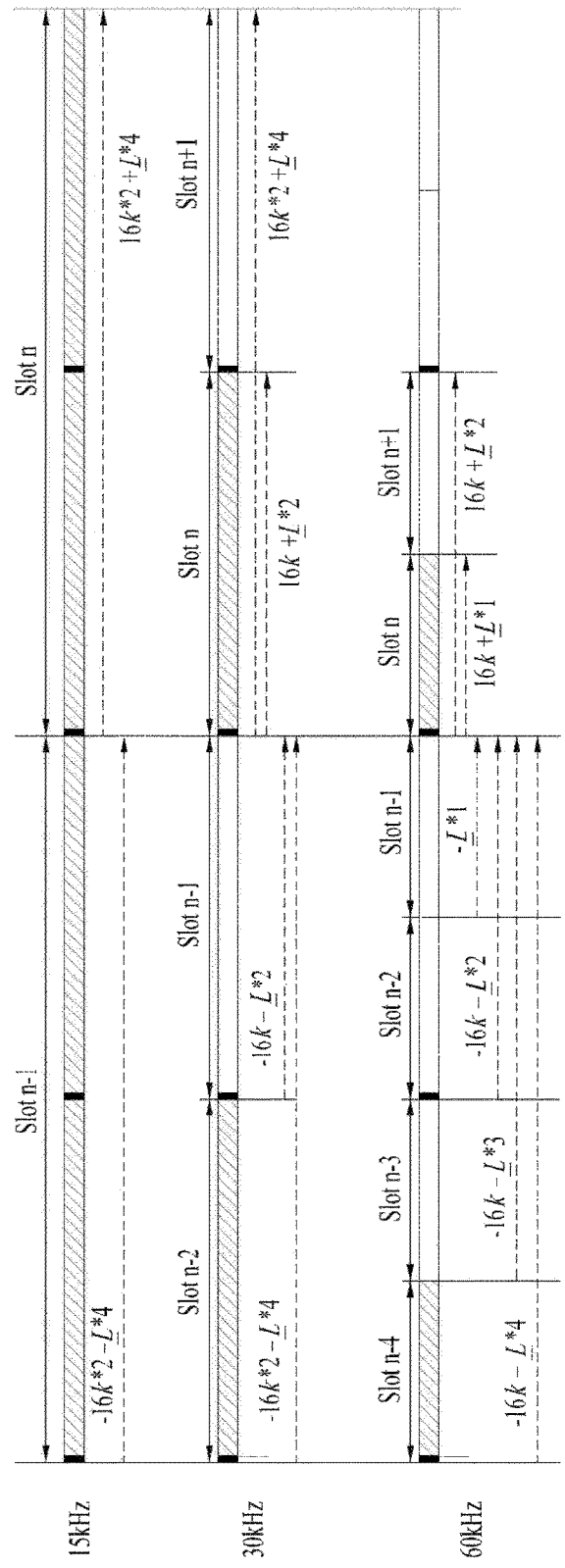
FIG. 14 is a diagram illustrating an example of a slot shifting according to various embodiments.

FIG. 14 is a diagram illustrating an example of a slot shifting according to various embodiments.

In the description of various embodiments, L may mean a length obtained by dividing the remaining length obtained by subtracting 16k from 0.5 ms into quarters in the case of 120 kHz SCS, that is, a length in which the corresponding remaining length is divided into quarters. For convenience, 2L at 60 kHz SCS, 4L at 30 kHz SCS and 15 kHz SCS may be indicated.

In the description of various embodiments, L may be a value determined according to SCS, and in the case of 60 kHz SCS, the length of the slot is 16k+L (=16k+2L) and/or L (2L), and in case of 30 kHz SCS, the length of the slot may be 16k+L (=16k+4L), and in case of 15 kHz SCS, the length of the slot may be 2*(16k+L) (=2*(16k+4L)).

Referring to FIG. 14, in the case of 15 kHz SCS, 30 kHz SCS, it may be equally shifted by 16k+L per slot offset index and/or slot offset value 1, but in the case of 60 kHz SCS, it may be shifted by 16k+L or L per slot offset value 1.

Embodiment 2

According to various embodiments, regardless of the exiting slot grid, the slot may be shifted so that slot index 0 is always 16k. According to various embodiments, regardless of the pre-shift slot grid, a slot with slot index 0 may always include +16k. For example, referring to Equation 2, in OFDM symbol generation, a slot having a slot index 0 is assumed to be a slot including 16k, and according to various embodiments, regardless of the pre-shift slot grid, a slot having the slot index 0 always includes +16k, and thus, according to various embodiments, a separate method for generating an OFDM symbol may not be required.

For example, in a 60 kHz SCS slot, it is assumed that slot index 0, 1, 2, 3, 4, . . . , 39 according to the length order of 7688k, 7672k, 7688k, 7672k, . . . , 7688k, 7672k may be configured. For example, even when the slot offset is 1, the length may be configured to be in the order of 7688k, 7672k, 7688k, 7672k, . . . , 7688k, 7672k. In this example, when the slot offset is 1, (about) 7688k may be shifted, and the slot duration of the slot index 0 may be maintained at 7688k.

Embodiment 3

According to various embodiments, the end of the symbol may be considered a boundary and it may be shifted.

For example, when there are slot #0, slot #1, . . . , slot #n−1 in 0.5 ms half-subframe, and if slot #0 has a length of 16k+L, and slots #1, . . . , and slot #n−1 each have a length of L, and if the slot offset is positive/negative (shifted right in the time domain) in such a way that all slots of variable length are shifted, the shifted length may be shifted n−1 times by L length and then shifted once by 16k+L length, and if the slot offset is negative/positive (shift left in time domain), the shifted length may be shifted once by 16k+L lengths and then shifted n−1 times by L lengths in the order of shifting.

Embodiment 4

According to various embodiments, it may be shifted based on a head of a symbol.

According to various embodiments, when shifted to the right n times, it may be shifted first by a length of 16k+L and then shifted n−1 times by an length of L.

For example, when there are slot #0, slot #1, . . . , slot #n−1 in 0.5 ms half-subframe, and if slot #0 has a length of 16k+L, and slots #1, . . . , and slot #n−1 each have a length of L, and if the slot offset is positive/negative (shifted right in the time domain) in such a way that all slots of variable length are shifted, the shifted length is shifted once by 16k+L lengths and then shifted n−1 times by L lengths, and if slot offset is negative/positive (shift left in time domain), the shifted length may be shifted n−1 times by L length and then shifted once by 16k+L length.

The above-described embodiments may be an example of a scheme in which all samples of 0.5 ms are shifted to be viewed as valid samples. According to the above-described embodiments, when shifted by 1 slot, all n slots constituting 0.5 ms may be shifted by the same length (shifted by 16k+L sample length or shifted by L sample length) at a specific shift moment.

As described above, for example, the length of the 60 kHz SCS and/or 120 kHz SCS slot may be defined as the value divided by the power of 2 (e.g., 2,4) for the remaining time except for 16k before every 0.5 ms, and in particular, 16k lengths may be added to slots positioned 0.5 ms ahead (60 kHz SCS slot=[7688k, 7672k], 120 kHz SCS slot=[3852k, 3836k, 3836k, 3836k]). For example, a length of 16k may be added to the first slot positioned at the front in the time domain within the 0.5 ms time duration. The shift order as described above may take into consideration that a length of 16k is added to the first slot positioned at the front in the time domain within the 0.5 ms time duration.

Method 4

According to various embodiments, the first 16k portion of every 0.5 ms may be regarded as a fixed duration that does not move (invalid interval from the viewpoint of a provisional slot at the time of shift) and a slot offset may be applied.

According to various embodiments, it may be characterized in that the distance at which each provisional slot is shifted may be different for every 1 slot. According to various embodiments, only a slot passing a fixed duration may be shifted by 16k+L samples, and other slots may be shifted by L samples.

In accordance with various embodiments, a method of continuing to stay in the original position will be described with respect to the part of the head 16k length duration of every 0.5 ms as a common fixed duration.

According to various embodiments, once all slots 0,1, . . . , n−1 within 0.5 ms may be generated from provisional slots of length L, and the first slot may be generated as a slightly longer slot (16k+L length) by further extending the CP of the first symbol of the provisional slot by 16k based on the position of the non-shifted half-subframe (0.5 ms). According to various embodiments, the remaining provisional slots may be slots without change.

According to various embodiments, the definition of shifted by 1 slot (either left or right) may be as follows.

For example, when shifting, once provisional slots of length L may be shifted by different amounts, and among the shifted provisional slots, the slots passing through a common fixed duration (the first 16k length interval of the original unshifted 0.5 ms half-subframe) of 16k length may be shifted by 16k+L, and slots that do not pass through a common fixed duration may be shifted only by L.

For example, when a shift by m slots is required, after shifting the provisional slots by 1 slot consecutive m times according to a method according to various embodiments, the provisional slot positioned immediately after the 16k-length common fixed duration may extend the CP of the first symbol by 16k to generate an actual slot with a length of 16k+L, and the remaining provisional slots may be actual slots as they are.

Method 4—Enhancement

According to the above principle according to various embodiments, an explicit operation may be provided when the slot length of the shifted cell (e.g., SCell) is shorter than or equal to the slot (and/or slot unit) length of the reference cell (e.g., PCell/PSCell) for which the timing is fixed.

Hereinafter, according to various embodiments, in order to provide a clear operation in all cases, including a case in which the slot length of the shifted cell is longer than the slot length of the reference cell for which the timing is fixed, a clearer operation is expressed by using an equation or the like.

As described below, according to various embodiments, a slot unit, which is a unit in which a slot offset is indicated, may be indicated based on a reference SCS. For example, a slot having the same length or shorter length among a slot of a shifted cell (e.g., a target cell) and a slot of a reference cell having a fixed timing may be a slot unit. For more detailed information, reference may be made to the description of the slot unit according to various embodiments.

For example, when a slot unit is 1 ms, (that is, when the slot unit is more than 0.5 ms, in this case, it may be the case that both the SCS of the shifted cell and the SCS of the reference cell may be SCS=15 kHz):

To be shifted by i slot units (and/or i slot units) may mean shifted by the number of $i*2*15360k$ ($=i*32720k$) samples. For example, if i is negative, it may mean shifting left in the time domain, and if i is positive, it may mean shifting right in the time domain.

In a wireless communication system to which various embodiments are applicable (e.g., 5G NR system), a cell having a shorter slot length among two cells is an expression equivalent to a cell having a larger SCS among two cells (i.e., a shorter slot length may be an expression equivalent to an SCS being larger), and the same length of the slots of two cells may be an expression equivalent to that the SCSs of the two cells are the same.

In the description of various embodiments, when a slot unit is less than or equal to 0.5 ms, k (kappa) may be $T_s/T_c=64$, as described above, and N may be defined as the number of slot units within 0.5 ms. In the description of various embodiments, a slot unit and a slot may be used interchangeably For example, shifted by i slot units (and/or i slot units) may mean that, for $L=(15360k-16k)/N$, when P=floor(i/N), (P is negative, 0, or positive integer), and r=(i mod N), (r=0, 1, . . . , N−1)

then, first, slot index j ($0<=j<K$, K is the number of slots in the 10 ms frame of the shifted cell) of shifted cell (e.g., SCell), is changed to, slot index ((j−P)mod K)

then, all slots are additionally shifted by (−r*L) samples, if r<N;

(−(16k+r*L)) samples, if r >=N,

For example, shifted by a negative number may mean shifting to the left in the time domain, and shifted by a positive number may mean shifting to the right in the time domain.

For example, to re-express the shift by i slot units (and/or i slot units), first, slot index j ($0<=j<K$, K is the number of slots in the 10 ms frame of the shifted cell)

of shifted cell (e.g., SCell), may be changed to, slot index ((j−ceil(i/M))mod K)

then, all slots of the cell shifted by (−(ceil(i/M)*M−i)*L) samples, if (ceil(i/M)*M−i)<N;

(−(16k+(ceil(i/M)*M−i)*L)) samples, if (ceil(i/M)*M−i)>=N, may be additionally shifted. For example, shifted by a negative number may mean shifting to the left in the time domain, and shifted by a positive number may mean shifting to the right in the time domain.

For example, WHEN all slot boundaries of a cell having a lower SCS may be aligned with a slot boundary of a cell having a higher SCS, two cells may be said to be a slot alignment. According to various embodiments, perfect slot alignment may be achieved between the shifted cell and the reference cell.

In a wireless communication system (e.g., 5G NR system) to which various embodiments are applicable, when the slot is not shifted, while only the length of the slot corresponding to the slot index value m*N ($0<=m*N<K$, m is an integer) is 16k longer than the length of the other slots and the other slots have the same length, according to the above-described various embodiments, after being shifted by i slot units, only the length of the slot corresponding to the slot index value (m*N−ceil(i/M))mod K may be 16k longer than the lengths of other slots and the lengths of other slots may be changed to be the same.

Example 1

For example, when the slot length of the shifted cell (e.g., SCell) is the same as the length of a slot unit (for example, when a slot unit is defined with a slot length equal to or smaller than the slot length of two cells, the slot length of the shifted cell is less than or equal to the slot length of the reference cell, etc.):
Being shifted by i slot unit may mean that
slot index j ($0 \leq j < K$, K is the number of slots in 10 ms frame of the shifted cell)
of the shifted cell (e.g., SCell)
is changed to,
slot index ((j−i/M)mod K),
then it is completed. For example, it may not be necessary to additionally shift in units of samples.

Example 2

For example, when it is to be shifted by i slot units, and when the value of i corresponds to an integer multiple M, which is the number of slot units within one slot length of the shifted cell (e.g., SCell):
Being shifted by i slot unit may mean that
slot index j ($0 \leq j < K$, K is the number of slots in 10 ms frame of the shifted cell)
of the shifted cell (e.g., SCell)
is changed to
slot index ((j−i/M)mod K)
then it is completed. For example, it may not be necessary to additionally shift in units of samples.

Example 3

For example, when M<=N (that is, when the slot length of the shifted cell (e.g., SCell) is equal to or less than 0.5 ms, that is, when the SCS of the shifted cell (e.g., SCell) is more than 15 kHz, etc.):
Being shifted by i slot unit may mean that
first, slot index ($0 \leq j < K$, K is the number of slots in 10 ms frame of the shifted cell)
of the shifted cell (e.g., SCell)
is changed to
slot index ((j−ceil(i/M))mod K)
then,
all slots of a cell shifted by (−(ceil(i/M)*M−i*L) samples
are further shifted. For example, shifting by a negative number may mean shifting left in the time domain, and shifting by a positive number may mean shifting right in the time domain.
Hereinafter, specific examples/equations for indicating a slot offset according to various embodiments will be described.
Slot Unit for Shift
For example, when the number of slot units within 0.5 ms is N (integer/natural number greater than or equal to 0), a slot offset may be indicated based on
a slot of a higher SCS between the PCell and the SCell, and/or
a slot having a length corresponding to a higher SCS among the SCS of the SSB of the PCell and the SCS of the SSB of the SCell, and/or
a slot having a length corresponding to the higher SCS among the lowest SCS among the BWP of the PCell and the lowest SCS among the BWP of the SCell, and/or
a slot having a length corresponding to the SCS of the SSB of the PCell, and/or
a slot having a length corresponding to the SCS of the SSB of the SCell, etc.
and various other methods may be considered. That is, according to various embodiments, a reference SCS for indicating a slot unit, which is a unit in which a slot offset is indicated, may be determined based on the above-described method.
Time Samples for Slot Shift (Equation 1)
For example, i slot units may be expressed as i=Q*N+R [slot units] (R<N) ((N: the number of slot units within 0.5 ms, R is an integer from 0 to N−1, Q is the quotient of i divided by N)). According to various embodiments, the number of samples of a shifted slot may be expressed as follows:
A. when the criterion for slot boundary alignment is configured to the end of slot:
when a shift is required in i slot units,
right shift: Q*(16k+N L)+R*L [samples]
left shift: Q*(16k+N L)+(16k+R*L) [samples]
Here, the length of the slot index M*N may be 16k+L [samples], the length of the slot index M*N+j may be L [samples] ($1 \leq j \leq N-1$), M may be an arbitrary integer, and L may be (S−16k)/N, and S may be 15360k.
and/or according to various embodiments, the number of samples of the shifted slot may be indicated as follows:
B. when the criterion for slot boundary alignment is configured to the start of slot:
when a shift if required in i slot units,
right shift: Q*(16k+N*L)+(16k+R*L) [samples]
left shift: Q*(16k+N*L)+R*L [samples]
Time Samples for Slot Shift (Equation 2)
Hereinafter, $\mu=\{0, 1, 2, 3, 4\}$ may be determined as SCS ($2^\mu$) of a slot unit for shift.
For example, given the slot offset $S_{offset}$, according to various embodiments, the number of samples in the shifted slot may be expressed as follows:
if $\mu>0$,
(−M*S+(Q*S+R*L)) [samples]
Here, $S_{offset}$ may be $\{-M*N, -M*N+1, \ldots, (M+1)*N-1\}$, Q may be floor (($M*N+S_{offset}$)/N), R may be mod(($M*N+S_{offset}$)/N), N may be $2^(-1)$, S may be 15360k, and L may be (S−16k)/N.
if $\mu>0$,
(−M*S+(Q*S)) [samples]
Here, $S_{offset}$ may be $\{-M*N, \ldots, (M+1)*N-1\}$, Q may be floor ($M*N+S_{offset}$)/N), N may be $2^(-1)$, and S may be 15360k.
According to various embodiments, a slot shifting method according to a slot offset may be provided. Some terms used in the description of various embodiments may be defined as follows.
[When Slot Unit is 1 ms]
As described above, according to various embodiments, a slot unit, which is a unit in which a slot offset is indicated, may be indicated based on the reference SCS. For example, a slot having the same length or shorter length among a slot of a shifted cell (e.g., a target cell) and a slot of a reference cell having a fixed timing may be a slot unit. For more detailed information, reference may be made to the description of the slot unit according to various embodiments.

For example, when a slot unit is 1 ms (that is, when a slot unit is greater than 0.5 ms, in this case, both the SCS of the shifted cell and the SCS of the reference cell may be SCS=15 kHz):

Shifted by i slot units (and/or i slot units) may mean shifted by the number of i*2*15360k (=i*32720k) samples. For example, when i is negative, it may mean shifting left in the time domain, and when i is positive, it may mean shifting right in the time domain.

In a wireless communication system to which various embodiments are applicable (e.g., 5G NR system), a cell with a shorter slot length among the two cells may be an expression equivalent to a cell with a larger SCS among the two cells (that is, the shorter length of the slot may be equivalent to the larger SCS), and the same slot length of two cells may be an expression equivalent to the same SCS of two cells.

[When Slot Unit is Equal to or Less than 0.5 ms]

In the description of various embodiments, when the slot unit is less than or equal to 0.5 ms, k (kappa) may be $k=T_s/T_c=64$, as described above and N may be defined as the number of slot units within 0.5 ms. In the description of various embodiments, a slot unit and a slot may be used interchangeably For example, being shifted by i slot unit (and/or i slot unit) may be organized as follows according to the methods according to various embodiments, for L=(15360k−16k)/N when Q=floor(i/N), (Q is negative 0, or positive integer), R=(i mod N), (R=0, 1, . . . , N−1).

Figure 15:
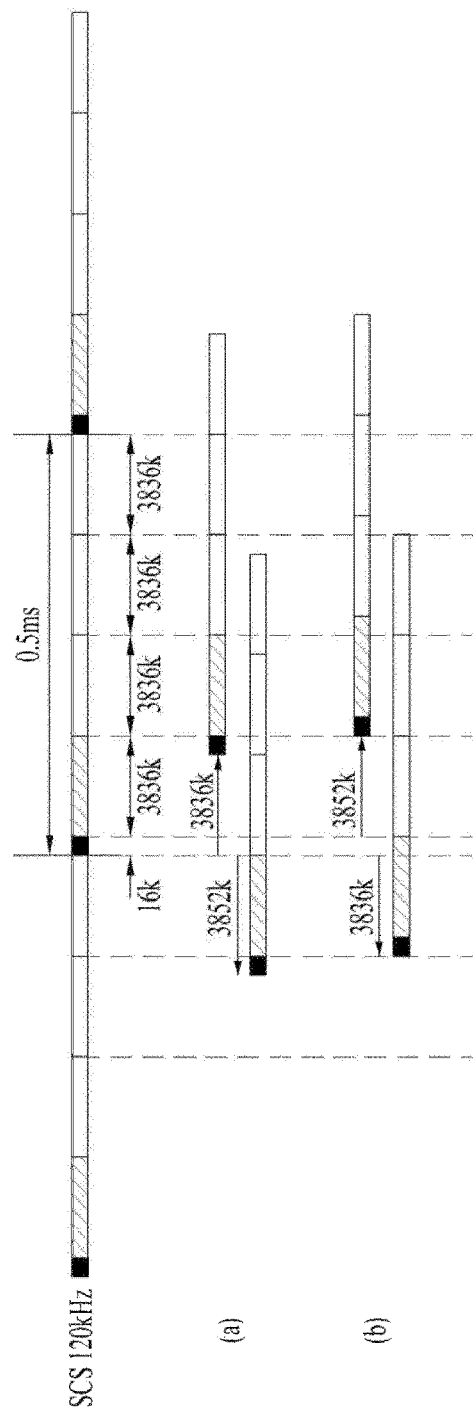
FIG. 15 is a diagram illustrating an example of a slot shifting according to various embodiments.

FIG. 15 is a diagram illustrating an example of slot shifting according to various embodiments.

Referring to FIG. 15, as described above, unlike other slots, a length of 16k is added to the first slot within every 0.5 ms, so in shifting the N slots constituting every 0.5 ms, a difference may occur depending on which one is aligned while shifting (according to the reference time position for slot shifting). For example, in the case of (a) shifted while aligning the start of the first slot among the N slots constituting every 0.5 ms with the slot boundary of the reference cell, when shifted right/left by 1 slot, the added 16k length may be located to the left with respect to the start of the slot of the reference cell. On the other hand, in the case of (b), in which the end of the first slot (and/or the start of the last slot) among the N slots is shifted while aligning with the slot boundary of the reference cell, when shifted right/left by 1 slot, the added 16k length may be positioned to the right with respect to the end of the slot of the reference cell.

[Method 1]

According to various embodiments, it may be shifted based on shifting alignment of the end of the last slot among N slots constituting every 0.5 ms and/or based on shifting alignment of the start of the first slot among N slots constituting every 0.5 ms.

Figure 16:
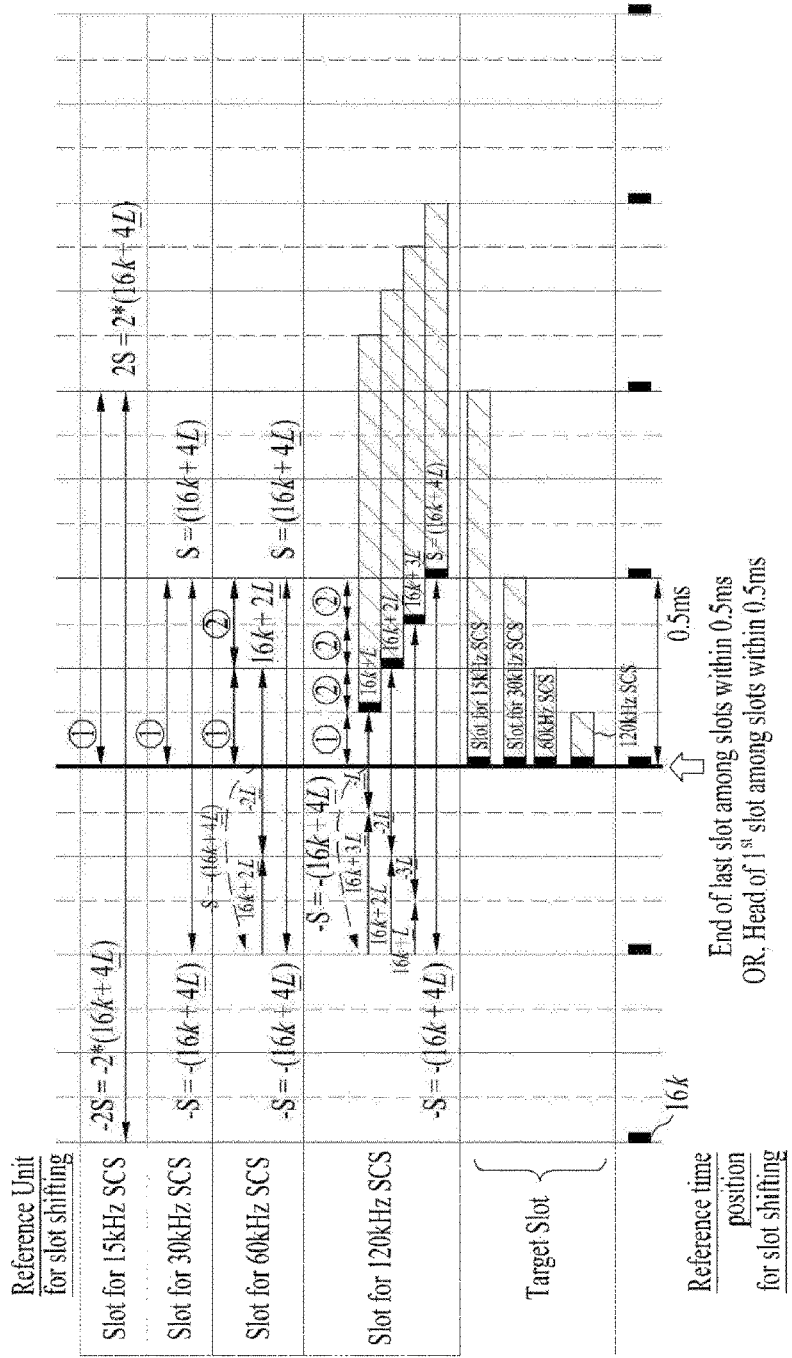
FIG. 16 is a diagram illustrating an example of a slot shifting according to various embodiments.

FIG. 16 is a diagram illustrating an example of slot shifting according to various embodiments.

According to various embodiments, it may be shifted based on the shifting alignment of the end of the last slot among the N slots constituting every 0.5 ms and/or based on the shifting alignment of the start of the first slot among the N slots constituting every 0.5 ms. According to various embodiments, the reference time position for slot shifting may be the start of the first slot and/or the end of the last slot within 0.5 ms.

In the description of various embodiments, L may mean a length obtained by dividing the remaining length obtained by subtracting 16k from 0.5 ms into quarters in the case of 120 kHz SCS, that is, the length in which the remaining length is divided into quarters. For convenience, 2L at 60 kHz SCS, 4L at 30 kHz SCS and 15 kHz SCS may be indicated.

According to various embodiments, L may be a value determined according to SCS, and the slot length is 16k+L (16k+2L) and/or L(2L) for 60 kHz SCS, and the slot length is 16k+L (=S=16k+4L) for 30 kHz SCS, and the length of the slot may be 2*(16k+L) (=2*(16k+4L)) for 15 kHz SCS.

Referring to FIG. 16, a reference unit for slot shifting may be a slot for 15 kHz SCS/slot for 30 kHz SCS/slot for 60 kHz SCS/slot for 120 kHz SCS. According to various embodiments, since the length of the slot in the time domain varies according to the SCS, the actual shifted length in the time domain may vary according to the reference SCS.

For example, in the case of a slot for 15 kHz SCS→①: (16k+4L)*2

For example, in the case of a slot for 30 kHz SCS→①: 16k+4L

For example, in the case of a slot for 60 kHz SCS→1: 16k+2L, ②: 2L

For example, in the case of a slot for 120 kHz SCS→①:16k+L, ②: L

In FIG. 16, the length of the slot boundary displayed for the slot shift may be expressed as ①, ②, ②, ②.

According to various embodiments, the slot shift illustrated in FIG. 16 may be performed based on the shifting alignment of the end of the last slot among the N slots constituting every 0.5 ms and/or based the shifting alignment of the start of the first slot among N slots constituting every 0.5 ms For example, when shifting right in the time domain in 60 kHz SCS, after shifting by the length corresponding to ① (16k+2L), it may be shifted from 0 to 1 by the length corresponding to ② (2L).

For example, when shifting left in the time domain in 60 kHz SCS, after shifting from 0 to 1 by the length corresponding to ② (2L), it may be shifted by the length corresponding to ① (16k+2L).

For example, when shifting right in the time domain in 120 kHz SCS, after shifting by the length corresponding to ① (16k+L), it may be shifted from 0 to 3 times by the length corresponding to ② (L).

For example, when shifting left in the time domain in 120 kHz SCS, after shifting from 0 to 3 times by the length corresponding to ② (L), it may be shifted by the length corresponding to ① (16k+L).

According to the example of FIG. 16, a slot including 16k may be located at the front (frontmost) within 0.5 ms. As another example, the length of the slot boundary displayed for slot shift may be displayed as ②, ②, ②, ①, etc. and in this case, the slot including 16k may be located at the rear (the rearmost) within 0.5 ms.

Hereinafter, a slot boundary alignment method according to the relationship between the slot length of the SCell and the slot length of the PCell will be described in various embodiments.

A-1

According to various embodiments, when the slot length of the SCell is shorter than or equal to the slot length of the PCell (when the slot length of the SCell is less than or equal to the slot length of the PCell), boundaries alignment may be performed based on the end of the slot. For example, it may be a criterion to align the end of the last slot among the N slots constituting every 0.5 ms while shifting.

B-1

According to various embodiments, when the slot length of the SCell is longer than the slot length of the PCell (when the slot length of the SCell exceeds the slot length of the PCell), boundary alignment may be performed based on the end of the slot. For example, it may be a criterion to align the end of the last slot among the N slots constituting every 0.5 ms while shifting.

A-2

According to various embodiments, when the slot length of the SCell is shorter than or equal to the slot length of the PCell (when the slot length of the SCell is less than or equal to the slot length of the PCell), boundary alignment may be performed based on the start of the slot. For example, it may be a criterion to align the start of the first slot among the N slots constituting every 0.5 ms while shifting.

B-2

According to various embodiments, when the slot length of the SCell is longer than the slot length of the PCell (when the slot length of the SCell exceeds the slot length of the PCell), boundary alignment may be performed based on the start of the slot. For example, it may be a criterion to align the start of the first slot among the N slots constituting every 0.5 ms while shifting.

According to various embodiments, when it is instructed/indicated to shift by i slot unit (and/or i slot unit), when i (it is not expressed as a left shift and a right shift after taking the absolute value of i) is negative, it may be interpreted as left shift, when i is positive, it may be interpreted as right shift, and when i is 0, it may be interpreted as not shifted. That is, according to various embodiments, the direction of the shift in the time domain may be indicated/configured according to the indicated sign of i.

According to various embodiments, it may be expressed as $i=Q*N+R$, where N may be the number of slot units within 0.5 ms, Q may be an integer (negative, 0, positive) values, and R may be a remaining value satisfying $0=<R<N$. According to various embodiments, after being shifted by $Q*(16k+N*L)$ by Q (if Q is negative, it may be left shift, if Q is positive, it may be right shift, and if Q is 0m, it may not be shifted), since the remainder is always $R>=0$, only an additional right shift may be generated by R.

According to various embodiments, in the case of right shift by R, the number of samples of the shifted slot is $(16k*[1-\text{delta}(R)]+R*L)$ in all cases of A-1, B-1, A-2, and B-2, so there may be no need to differentiate.

That is, according to various embodiments, in the case of A-1, B-1, A-2, and B-2, the total number of samples of the shifted slot may be expressed as one equation $Q*(16k+N*L)+(16k*[1-\text{delta}(R)]+R*L)$ (for $R=0, 1, \ldots, N-1$), where $\text{delta}(R)=1$ if $R=0$ and $\text{delta}(R)=0$ if $R\neq 0$.

According to various embodiments, in the case of A-1, B-1, A-2, B-2, the total number of samples in the shifted slot may be expressed as follows:

$Q=\text{floor}(i/N)$, (Q is negative, 0, or positive integer)

$R=(i \bmod N)$, $(R=0, 1, \ldots, N-1)$

According to various embodiments, in the case of Normal CP, the number of samples to be shifted ($N_{shift\_samples}$) may be expressed as follows:

$N_{shift\_samples}=Q*(16k+N*L)+(16k*[1-\text{delta}(R)]+R*L)=\text{floor}(i/N)*(16k+N*L)+(16k*[1-\text{delta}(i \bmod N)]+(i \bmod N)*L)=i*L+(\text{floor}(i/N)+[1-\text{delta}(i \bmod N)])*16k$ In addition, the various embodiments and effects described above are the same, but when there is a difference in the equations in which Q and R are calculated according to i slot unit (here, $i=-M, \ldots, M-1$), equations according to various embodiments will be described. For example, the corresponding Equation may be the same as Equation 4 below.

[Equation 4]

SCS index for 15 kHz, 30 kHz, 60 kHz, 120 kHz: $\mu=\{0,1,2,3\}$

Number of slots within 0.5 ms: $N=2^{\mu-1}$

Slot offset index: $i=-M, \ldots, M-1$ where, $M=5*2^\mu/2$

Slot length:

if $N\neq \frac{1}{2}$, $16k+L$ or L where, $S=(16k+N*L)$ for normal CP

L where, $S=N*L$ for extended CP if $N=\frac{1}{2}$, $2*S$ where, $S=(16k+L)$ for normal CP $2*S$ where, $S=L$ for extended CP Number of samples for slot shifting:

if $N\neq \frac{1}{2}$, $N_{shift\_samples}=Q*S+16k*[1-\text{delta}(R)]+R*L$ for normal CP $N_{shift\_samples}=Q*S+R*L$ for extended CP where, $Q=\text{floor}((M+i)/N)-\text{floor}(M/N)$ $R=\text{mod}((M+i)/N)-\text{mod}(M/N)$ $\text{delta}(R)=1$ if $R=0$ and $\text{delta}(R)=0$ if $R\neq 0$ if $N=\frac{1}{2}$, $N_{shift\_samples}=Q*S$ where, $Q=MN$ Equations according to the above-described various embodiments may be applied to various embodiments described below and other various embodiments.

[Method 2]

Figure 17:
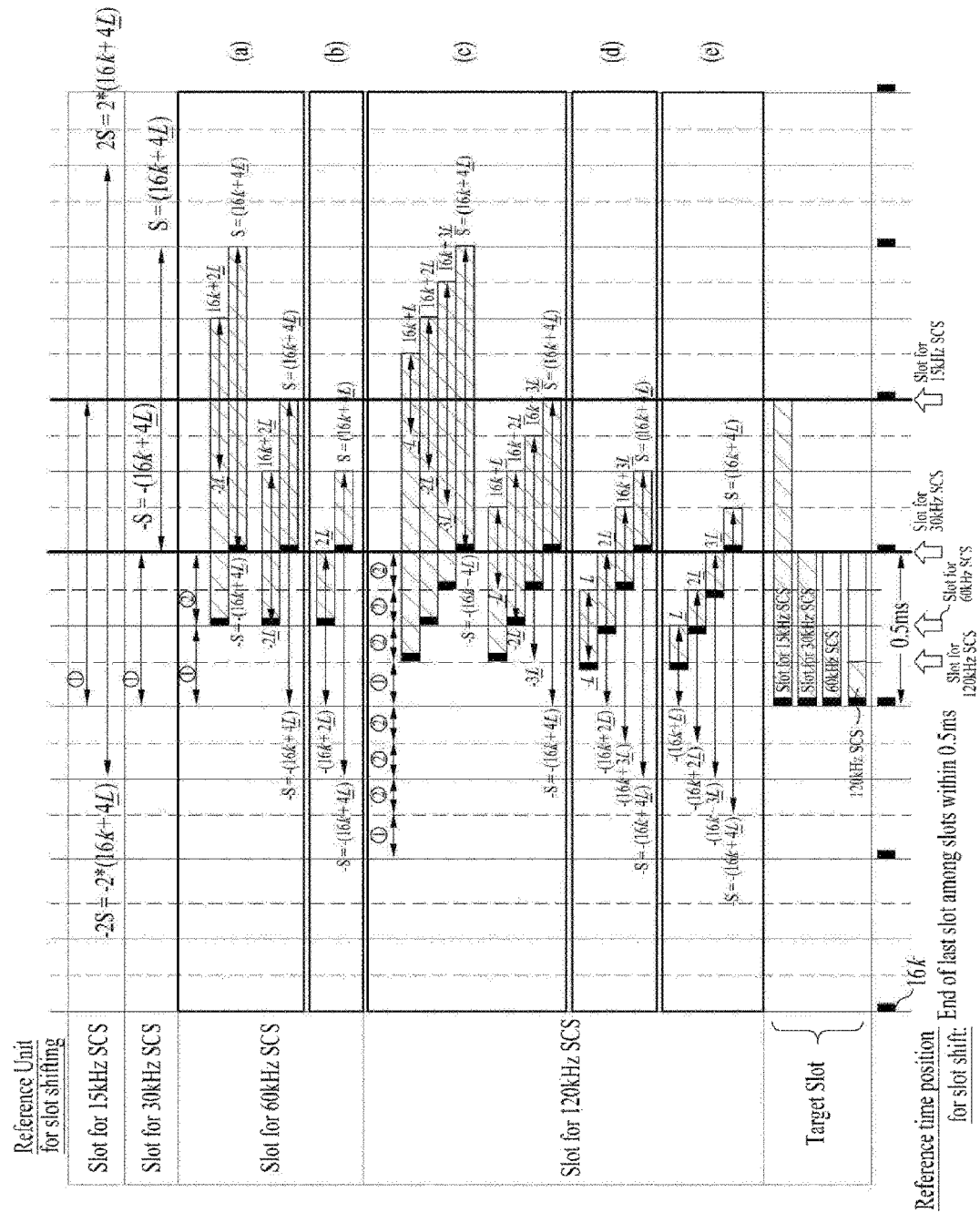
FIG. 17 is a diagram illustrating an example of a slot shifting according to various embodiments.

FIG. 17 is a diagram illustrating an example of a slot shifting according to various embodiments.

According to various embodiments, it may be shifted based on the alignment of the end of the first slot among the N slots constituting every 0.5 ms. According to various embodiments, the reference time position for slot shifting may be the end of the first slot within 0.5 ms.

In the description of various embodiments, L may mean a length obtained by dividing the remaining length obtained by subtracting 16k from 0.5 ms into quarters in the case of 120 kHz SCS, that is, a length in which the corresponding remaining length is divided into quarters. For convenience, 2L at 60 kHz SCS, 4L at 30 kHz SCS and 15 kHz SCS may be indicated.

In the description of various embodiments, L may be a value determined according to SCS, and in the case of 60 kHz SCS, the length of the slot is $16k+L$ ($=16k+2L$) and/or L(2L), and in the case of 30 kHz SCS, the length of the slot may be $16k+L$ ($=S=16k+4L$), and in the case of 15 kHz SCS, the length of the slot may be $2*(16k+L)$ ($=2*(16k+4L)$).

Referring to FIG. 17, a reference unit for slot shifting may be a slot for 15 kHz SCS/slot for 30 kHz SCS/slot for 60 kHz SCS/slot for 120 kHz SCS. According to various embodiments, since the length of the slot in the time domain varies according to the SCS, the actual shifted length in the time domain may vary according to the reference SCS.

For example, in the case of a slot for 15 kHz SCS→①: $(16k+4L)*2$

For example, in the case of a slot for 30 kHz SCS→①: $16k+4L$

For example, in the case of a slot for 60 kHz SCS→①:$16k+2L$, ②: $2L$

For example, in the case of a slot for 120 kHz SCS→①:$16k+L$, ①: L

In FIG. 17, the length of the slot boundary displayed for the slot shift may be expressed as ①, ②, ②, ②.

According to various embodiments, the slot shift illustrated in FIG. 17 may be performed based on the shifting alignment of the end of the last slot among the N slots constituting every 0.5 ms and/or based on the shifting alignment of the start of the first slot among the N slots constituting every 0.5 ms and/or based on the shifting alignment of the end of the first slot among N slots that make up every 0.5 ms.

For example, when 60 kHz SCS is the reference SCS, (a) the slot shift may be performed based on the shifting alignment of the end of the last slot among the two slots constituting every 0.5 ms and/or based on the shifting alignment of the start of the first slot among the two slots constituting every 0.5 ms, and (b) the slot shift may be performed based on the shifting alignment of the end of the first slot among the two slots constituting every 0.5 ms. For example, in the case of (a), a discrepancy of +16k may be located at the end of the first slot among the two slots with respect to the slot boundary before the shift, and in the case of (b), a discrepancy of +16k may be located at the beginning of the first slot among the two slots with respect to the slot boundary before the shift.

For example, when 120 kHz SCS is the reference SCS, (c) the slot shift may be performed based on the shifting alignment of the end of the last slot among the 4 slots constituting every 0.5 ms and/or based on the shifting alignment of the start of the first slot among the 4 slots constituting every 0.5 ms, and (e) slot shift may be performed based on the shifting alignment of the end of the first slot among the four slots constituting every 0.5 ms. For example, in the case of (c), a discrepancy of +16k may be located at the end of the first slot among the 4 slots with respect to the slot boundary before the shift, and in the case of (e), a discrepancy of +16k may be located at the beginning of the first slot among the four slots with respect to the slot boundary before the shift.

On the other hand, for example, (d) performing the slot shift based on the shifting alignment of the end of the last slot among the 4 slots constituting every 0.5 ms and/or based on the shifting alignment of the start of the first slot among the 4 slots constituting every 0.5 ms and performing the slot shift based on the shifting alignment of the end of the first slot among the 4 slots that make up every 0.5 ms may be combined/mixed.

A-1

According to various embodiments, when the slot length of SCell is equal to or shorter than the slot length of PCell, a method for performing boundary alignment based on the end of the slot may be provided, and alignment by shifting the end of the first slot among N slots constituting every 0.5 ms may be a reference.

B-1

According to various embodiments, when the slot length of SCell is longer than the slot length of PCell, a method for performing boundary alignment based on the end of the slot may be provided, and alignment by shifting the end of the first slot among N slots constituting every 0.5 ms may be a reference.

According to various embodiments, when instructed/indicated to shift by i slot unit (and/or i slot unit), if i (it is not expressed as a left shift and a right shift after taking the absolute value of i) is negative, it may be interpreted as left shift, if i is positive, it may be interpreted right shift, and if i is 0, it may be interpreted as no shift. That is, according to various embodiments, the direction of the shift in the time domain may be indicated/configured according to the indicated sign of i.

According to various embodiments, it may be expressed as i=Q*N+R, where N may be the number of slot units within 0.5 ms, Q may be the quotient when i is divided by N and have an integer (negative, 0, positive) value, and R may be a remainder value that satisfies 0=<R<N. According to various embodiments, after being shifted by Q*(16k+N*L) by Q (if Q is negative, it may be left shift, if Q is positive, it may be right shift, and if Q is 0, it may not be shifted), since the remainder is always R>=0, only an additional right shift may be generated by R.

According to various embodiments, right shift by R may be:

R*L in the case of A-1.

In the case of B-1, when M is the number of slot units corresponding to the slot length of the SCell (strictly speaking, since the slot length of the SCell is long, the ratio of PCell SCS (2^mµ_p) to SCell SCS (2^mµ_s), that is, M=2^(mµ_p)/2^(mµ_s)), if 0<=R<=(N−M), it may be R*L, and if (N−M)<R<N, it may be 16k+R*L.

In conclusion, according to various embodiments, the total number of samples to be shifted may be expressed in the equation as:

$Q*(16k+N*L)+R*L$ in the case of A-1;

$Q*(16k+N*L)+R*L$ if $0<=R<=N-M$ in the case of B-1, $Q*(16k+N*L)+(16k+R*L)$ if $(N-M)<R<N$; $(M=2^{(m\mu\_p)}/2^{(m\mu\_s)})$ For example, the above equation may be expressed in another form as follows.

$Q=\text{floor}(i/N)$, ($Q$ is negative, 0, or positive integer)

$R=(i \bmod N)$, ($R=0, 1, \ldots, N-1$)

According to various embodiments, in the case of Normal CP, the number of samples to be shifted ($N_{shift\_samples}$) may be expressed as follows:

(1) in the case of A-1:

$$N_{shift\_samples} = Q*(16k + N*L) + R*L$$
$$= \text{floor}(i/N)*(16k + N*L) + (i \bmod N)*L$$
$$= i*L + \text{floor}(i/N)*16k$$

(2) in the case of B-1:

$$N_{shift\_samples} = Q*(16k + N*L) + R*L \text{ if } 0 <= R <= N - M$$
$$= \text{floor}(i/N)*(16k + N*L) + (i \bmod N)*L$$
$$= i*L + \text{floor}(i/N)*16k$$
$$N_{shift\_samples} = Q*(16k + N*L) + (16k + R*L) \text{ if } (N - M) < R < N;$$
$$= \text{floor}(i/N)*(16k + N*L) + (16k + (i \bmod N)*L)$$
$$= i*L + (\text{floor}(i/N) + 1)*16k$$

(M=2(mµ_p−mµ_s))

On the other hand, the above-described various embodiments may be the number of samples to be shifted with respect to a slot having a Normal CP (normal slot). For example, in the case of a slot having an extended CP (extended slot), there may not be a portion corresponding to 16k of a normal slot.

For example, Next is the number of extended slot units within 0.5 ms, L_ext is the number of samples constituting the extended slot unit, and it is said that the slot unit for the extended slot may be defined in the same principle as in the case of the normal slot.

According to various embodiments, the total number of samples to be shifted may always be expressed as one equation as follows:

$$N_{shift\_samples} = Q*N\_ext*L\_ext + R*L\_ext$$

According to various embodiments, the number of samples to be shifted ($N_{shift\_samples}$), in the case of extended CP, may be expressed as follows:

$$\begin{aligned}N_{shift\_samples} &= Q*\text{N\_ext}*\text{L\_ext} + R*\text{L\_ext}\\ &= \text{floor}\,(i/\text{N\_ext})*\text{N\_ext}*\text{L\_ext} + (i \bmod N)*\text{L\_ext}\\ &= i*\text{L\_ext}\end{aligned}$$

Figure 18:
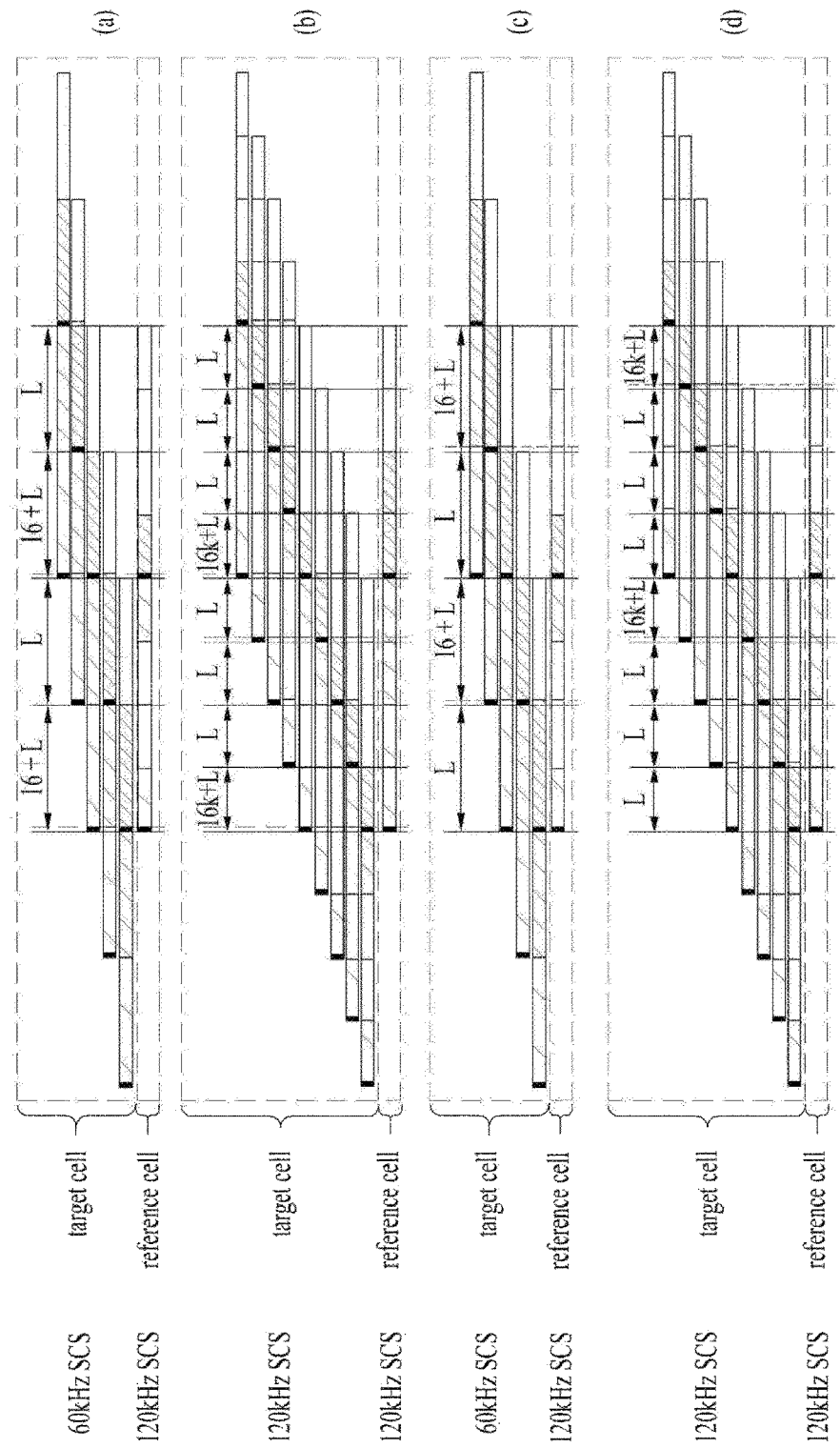
FIG. 18 is a diagram illustrating an example of a slot shifting according to various embodiments.

FIG. 18 is a diagram illustrating an example of slot shifting according to various embodiments.

According to various embodiments, information on the slot offset may be transmitted/received based on the value of the reference SCS in carrier aggregation, and the information on the slot offset may indicate the slot offset between the PCell/PSCell and the SCell, and the UE may determine the time offset of the SCell based on the information on the slot offset.

According to various embodiments, the reference SCS may be related to a unit in which the time offset is indicated, and the reference time boundary may be related to which cell's time boundary is applied as the time offset based on the reference time boundary.

For example, referring to FIGS. 18(a) and 18(c), the reference cell is configured to 120 kHz SCS, and the SCell is configured to 60 kHz SCS, and when the reference SCS is determined to be the 60 kHz SCS, the slot offset may be indicated in a unit corresponding to the reference SCS. For example, the UE may obtain/determine a slot boundary of the target cell based on the slot boundary of the reference cell configured to 120 kHz SCS, based on slot shifting in the order of 16k+L→L or L→16k+L by applying the indicated slot offset based on 60 kHz SCS.

For example, referring to FIG. 18(b) and FIG. (d), the reference cell is configured to 120 kHz SCS, and the SCell is configured to 60 kHz SCS, and when the reference SCS is determined to be the 120 kHz SCS, the slot offset may be indicated in a unit corresponding to the reference SCS. For example, the UE may obtain/determine a slot boundary of the target cell based on the slot boundary of the reference cell configured to 120 kHz SCS, based on slot shifting in the order of 16k+L→L or L→16k+L by applying the indicated slot offset based on 120 kHz SCS.

For example, the start of slot 0 for the target cell may coincide with the start of slot N for the reference cell. For example, N may be determined based on the slot offset and the reference SCS.

Symbol Alignment

Methods of achieving symbol alignment according to various embodiments will be described.

For example, if slot alignment is achieved, there may be a method in which symbol alignment is achieved and a method in which symbol alignment is not achieved in that situation.

For example, when the slot length of the shifted cell is longer (than the slot length of the reference cell), when the slot index is shifted by −ceil(i/M) and remains the same until re-indexing, and then sample shift is additionally performed by a fraction −r*L or −(16k+r*L):

method a) a method in which the CP of the middle symbol of the slot is longer than the CP of other symbols by fixing the 16k sample part to the original position method b) a method of making the CP length of the first symbol (CP of the symbol located after 0.5 ms with the first symbol in the slot of the cell with 15 kHz SCS) longer than the CPs of other symbols by moving the 16k sample part to the first symbol of the slot etc. may be performed, and for example, for method b), there may be two options as follows.

For example, after the slot index is re-indexed, for the shifted cell, the original slot 0 (the slot with index 0) may become the slot (−ceil(i/M))(the slot with index (−ceil(i/M))), and the original slot (ceil(i/M))(the slot with index (ceil(i/M))) may be changed to the slot 0, in addition, when the long symbol in samples is shifted to be the first symbol:

(1) the changed slot 0 may be aligned with the slot boundary of the reference cell. and/or;

(2) the changed slot (−ceil(i/M))(i.e., original slot 0) may be aligned with the slot boundary of the reference cell.

To discuss method a), method b) and/or slot alignment, symbol alignment, etc. according to various embodiments, some concepts may be generalized.

For example, samples may be grouped to form a symbol, 14 symbols may be grouped to form a slot, and slots may be grouped to form a frame.

For example, unlike in the case of fixed timing, when a timing shift occurs, these samples, symbols, slots, frames, etc. may be interpreted as two different concepts:

Concept 1: For example, each sample group configured with zero timing shift itself may be a symbol, and each symbol group consisting of 14 symbols itself may be a slot, and each slot group itself may be a frame. For example, symbol indices of 0, 1, . . . , 13 may be assigned from the first symbol to each symbol group. For example, in this case, shifting by i slots may mean that all symbols corresponding to the slot are shifted by the length corresponding to 14*i symbols and all samples corresponding to the symbols are shifted by the length.

Concept 2: For example, an upper group may be just a container that contains a group of sub elements. That is, for example, in the relationship between a sample and a symbol, samples may be elements and a symbol may be a container containing a group of sample elements. For example, in the relationship between a symbol and a slot, symbols may be elements, and a slot may be a container containing a group of symbol elements. For example, in the relationship between a slot and a frame, a slot may be a container containing elements, and a frame may contain a group of slot elements. For example, each symbol group may consist of 14 symbols, and symbol indices of 0, 1, . . . 13 may be assigned starting from the first symbol of the slot. For example, in this case, shifting by i slots may mean that leaving the symbols corresponding to the slots as they are in their original timing and after only a container called a slot that can hold 14 symbols is shifted in symbol granularity by 14*i symbols, putting 14 symbols located within the start and end boundaries of the container into a new container and belonging to the slot. For example, at this time, the slot index of the corresponding container is assigned to 14 symbols contained in the shifted container, and it may be re-indexed by assigning symbol indices 0, 1, . . . , 13 starting from the first symbol in the container. For example, this may be a method in which only the slot corresponding to the container is shifted without shifting the timing of neither the symbol nor the sample at all in preparation for the case where the shift is 0, and may correspond to method a).

The methods according to the above-described various embodiments may be clearly applied when the slot length of the shifted cell is equal to or smaller than the length of the slot unit. Hereinafter, various embodiments in a general case including when the slot length of a shifted cell is greater than a slot unit will be described.

In the description of various embodiments, similar to defining slots determined by the reference SCS as slot units, symbols determined by the same reference SCS may be defined as symbol units.

According to various embodiments, for non-shifted timing, the first symbol units appearing every 0.5 ms may have a CP of length 16k longer than other symbol units. For example, the first symbol units in the time domain within every 0.5 ms may have a CP having a length of 16k longer than other symbol units.

According to various embodiments, when the slot unit is 1 ms (slot length corresponding to SCS=15 kHz, that is, greater than 0.5 ms) and/or when the slot unit is greater than the shifted slot length, shifting by i slot units may mean that all samples are shifted by 14*i symbol units.

For example, in the case opposite to the above example (that is, the length of the slot unit is less than or equal to 0.5 ms, and the length of the slot unit is equal to or less than the slot length of the shifted cell), it may be assumed that M is the number of slot units included in one slot of the shifted cell. According to various embodiments, shifted by i slot units may mean that "slot containers" are shifted with a symbol unit granularity of 14*i symbol units with the sample and/or symbol units (i.e. elements) fixed at the original timing. According to various embodiments, each of the shifted containers may contain 14*M symbol units accurately.

According to method a) according to various embodiments, 14 "symbol containers" may be generated by grouping M symbol units, starting from the first symbol unit in the "slot container", to integrate them into one symbol. For example, the slot index of the "slot container" may be assigned to the 14 symbols obtained by integrating in this way and it may be re-indexed in such a way that symbol indexes 0, 1, . . . , 13 are assigned starting from the first symbol.

According to method a) according to various embodiments, both the slot alignment and the symbol alignment may be perfectly maintained in the shifted cell relative to the timing of the reference cell, and a symbol having a longer CP than other symbols in a slot may not be a symbol corresponding to symbol index 0.

According to method a) according to various embodiments, shifted by i slot unit may mean that samples and/or symbols (that is, elements) are fixed at the unshifted original timing, and both "slot container" and "symbol container" are shifted in symbol unit granularity by 14*i symbol units (the symbol determined by the reference SCS). For example, a "symbol container" of the shifted cell may be a container containing M consecutive symbol units, and a "slot container" may be a container containing 14*M symbol units.

According to various embodiments, after being shifted, M symbol units belonging to the "symbol container" may be integrated to form one symbol (element). For example, after being shifted, 14 symbols (element) made by 14*M symbol units in a "slot container" may constitute one slot.

According to various embodiments, for the overall methods according to concept 2, as the slot container and/or symbol container is shifted, the length of the elements belonging to the container may vary by 16k samples, so the length of the container is variable, but a slot index and/or symbol index assigned to a slot container and/or a symbol container before being shifted may be maintained even after being shifted.

According to various embodiments, samples, symbols, slots, and frame elements may be fixed in their original timing, and as only the container is shifted, the concept that the size of the container is minutely variable ((about) ±16k) so that it exactly matches the length of the new elements belonging to the container may be implemented with the concept that only the indices of symbols, slots, and frames are shifted when shifted.

A method a) in which a container called a frame and/or a container called a slot and/or a container called a symbol according to various embodiments is shifted is described below based on an index shift concept:

According to various embodiments, when the number of slots of a cell (e.g., SCell) to be shifted within a 10 ms frame is K, and the number of slot units corresponding to one slot of a cell to be shifted is M, in a frame based on a non-shifted fixed time, there may be K*M slot units having a slot unit index s=0, 1, . . . , K*M−1 from the first slot unit.

According to various embodiments, since there are 14 symbol units having symbol unit indexes 0, 1, . . . , 13 in every slot unit, there may be 14*K*M symbol units in one frame. According to various embodiments, a symbol unit virtual index n=0, 1, . . . 14K*M−1 may be assigned to symbol units from the first symbol unit.

According to various embodiments, it may be realized that the cell is timing shifted by i slot units as follows:

first, the slot unit index j may be changed to floor(((j−i) mod (K*M))/M)

then, K*M slot units in one frame may have one of indices from 0 to K−1 by index change, and consecutive M slot units may have the same index.

M consecutive slot units having the same index may be integrated to form one slot, and the index (e.g., the same index assigned to consecutive M slot units) may be assigned as the slot index of the slot.

next, the symbol unit virtual index n may be changed to floor(((n−14*i)mod (14*K*M))/M)

then, 14*K*M symbol units in one frame may have a value of one of the indices from 0 to (14*K−1) by index change, and M consecutive symbol units may have the same index.

M consecutive symbol units having the same index are integrated to become one symbol, and (index mod 14) calculated/obtained from the corresponding index (the same index assigned to consecutive M symbol units) may be assigned as the symbol index of the symbol.

After all, the shifted frame consists of consecutive K slots starting from a slot with a new slot index 0, and the shifted slot may consist of 14 consecutive symbols starting from a symbol having a new symbol index 0.

According to method b) according to various embodiments, symbol unit elements and containers (that is, the symbol unit itself determined by the reference SCS and the corresponding "symbol unit (called) container") are shifted (for example, shifting negatively may mean shifting left (in the time domain)) in symbol unit granularity by −14*(ceil (i/M)*M−i) symbol units with the "slot container" shifted, then based on the 14*M symbol unit containers contained in the shifted "slot container", starting from the first symbol unit container, being bundled by M to integrate them into one symbol, 14 symbols may be generated.

According to various embodiments, the slot index of the "slot container" may be given to the symbols obtained/acquired by integration and re-indexing may be performed in such a way that symbol indices 0, 1, . . . , 13 are assigned starting from the first symbol.

According to method b) according to various embodiments, in order for the shifted cell to prepare for the timing of the reference cell, symbol alignment may not normally be maintained/achieved, but slot alignment may be perfectly maintained/achieved, and the principle that a symbol having a longer CP than other symbols in a slot is symbol 0 (a symbol with index 0) may also be always maintained.

According to the method integrated to become the slot and/or symbol length of the shifted cell (e.g., SCell) after only the index of the slot unit and the symbol unit according to various embodiments is shifted, as the SCell frame structure is different from TS 38.211, etc. in the UE configured in slot alignment with another PCell and/or slot shift SCell is configured to PCell, it may be a problem in terms of lower-level compatibility and/or ability and it may need to be supplemented.

For example, for a UE supporting a wireless communication system (e.g., NR Rel 16) to which various embodiments are applicable, even when carrier aggregation is not configured, an indication that the frame structure has changed may be signaled by slot offset signaling itself, and the UE supporting a wireless communication system to which various embodiments are applicable may interpret the corresponding signaling as the above meaning. For example, the UE supporting a wireless communication system to which various embodiments are applicable may interpret the slot offset signaling as an indication indicating that the frame structure has changed.

In addition, for example, information related to a non-carrier aggregation cell and/or no shift for PCell and/or PSCell, and/or how many symbols/slot units are shifted compared to the basic frame structure may be signaled.

For example, this information may be indicated in a SIB (e.g., SIB1) and/or a UE-specific RRC signal with SFI (slot format index/slot format indicator) related information. And/or, for example, considering the payload of the SIB and/or UE-specific RRC signal, etc., whether or not the basic frame structure may be known/indicated with a binary 1-bit flag, and when the UE knows that the (frame) structure is not the basic structure by the flag, it may know the frame structure based on reading the RRC signaling (by decoding the RRC signaling/from the RRC signaling) and obtaining the shifted length value.

For example, there may be a question about whether the system/UE will not operate because there is no signaling (related to the structure) and there is a difference in understanding between the transceivers by 0.52 us for the CP.

For example, there may be coverage reduction and performance degradation due to CP, but whether the operation itself is not performed may vary for each case. For example, in the absence of signaling, if the issues that occur are listed in order of severity, it may be as follows:

1) For shift based on time offset, if it is limited to shift by 0.5 ms, there may be no problem in all cases. For example, in this case, slot alignment and symbol alignment may be maintained, and a limited granularity of 0.5 ms may be achieved.
2) In the case of method b) according to various embodiments, (since channel estimation and/or beamforming is performed independently in units of slots), the issue of the operation itself (issue of not operating) may not occur. For example, in this case, slot alignment may be maintained, and fine granularity in units of slot units may be achieved.
3) In the method a) according to various embodiment, when the index is changed in only slot units, (that is, when long symbol is always positioned at the front in units of symbols), (since channel estimation and/or beamforming is performed independently in units of slots), the issue of the operation itself (the issue of whether it will not work) may not occur. For example, in this case, when the slot length of the shifted cell (e.g., SCell) is less than or equal to the slot length of the reference cell (e.g., PCell/PSCell) and/or when the slot of the shifted cell is longer than the slot of the fixed cell, there may be cases in which shift is allowed only in units of the slot length of the shifted cell, by applying restrictions on the shiftable grid. In this case, a slot alignment may be maintained and a (slightly) limited granularity per slot may be achieved.
4) In the method a) according to various embodiment, when the slot of the shifted cell is longer than the slot of the fixed cell, and the structure is changed up to the symbol unit within the slot as the index is changed in units of slot units because there is no limit to the shiftable grid, a slot may be generated in which 0.52 us is placed in the middle of the slot. For example, in this case, the amount of phase change in the slot is different from the case of the basic structure, and as the channel changes rapidly in the slot, it may appear as a result of applying/allocating two different channels with a boundary somewhere in the middle symbol of the slot. That is, for example, one channel estimation value and one beamforming value may not be estimated for the slot. For example, in this case, although the effect on the network/UE operation may vary depending on the implementation of the channel estimator, until structure information is known or indicated by signaling, it is necessary to perform channel estimation in units of symbols rather than in units of slots, and performance in the corresponding slot may definitely deteriorate. For example, in this case, slot alignment and symbol alignment may be maintained, and fine granularity in units of slot units may be achieved.

Signaling (structure-related) according to various embodiments may be a complement to 4) described above. For example, although in the case of 1)-3) (structure-related) signaling may or may not be transmitted/received between the network and the UE, in the case of 4) (structure-related) signaling may be required to be transmitted/received between the network and the UE.

Larger SCS Slot Shift Unit

According to various embodiments, a larger SCS slot shift unit may be indicated in units of N times (For example, N is the value obtained by dividing the larger value of the PCell/PSCell SCS and the SCell SCS by the smaller value.).

And/or, according to various embodiments, regardless of any SCS, a larger SCS slot shift unit may be indicated in units of N times (e.g., N is a value obtained by dividing the SCS of a shifted slot by 30 kHz SCS) to always fit in units of 0.5 ms.

And/or, according to various embodiments, when the SCS of PCell/PSCell and SCell is greater than 30 kHz (e.g., 60 kHz, 120 kHz), a larger SCS slot shift unit may be indicated in units of N times (for example, N is the SCS of the shifted slot divided by the 30 kHz SCS) to fit in units of 0.5 ms. For example, when the shifted slot corresponds to 60 kHz SCS, it may be indicated as a multiple of 2, and when the shifted slot corresponds to 120 kHz SCS, it may be indicated as a multiple of 4.

Embodiment A

According to various embodiments, for inter-band carrier aggregation, carrier aggregation with an unaligned frame boundary with slot alignment and partial SFN alignment may be provided. A specific operation example of a CA operation with an unaligned frame boundary according to various embodiments may be as follows:

For example, in carrier aggregation with an unaligned frame boundaries with slot alignment and partial SFN alignment, a slot offset may be configured/indicated by explicit RRC signaling to the UE.

For example, a slot offset for a CC (and/or serving cell) may be defined for PCell/PSCell timing, and the slot offset may be a slot offset between the PCell/PSCell and the SCell, and the slot granularity (and/or the reference SCS for indicating the slot offset) may be defined/determined as follows.

Alt. 1: the maximum SCS among the lowest SCS of PCell/PSCell among all configured SCSs (corresponding to DL/UP BWP) and the lowest SCS among all SCSs (corresponding to DL/UP BWP) configured in the CC (the maximum of PCell/PSCell lowest SCS among all the configured SCSs and this serving cell's lowest SCS among all the configured SCSs). That is, the maximum SCS among the lowest SCSs among the SCSs configured for each of the PCell/PSCell and the SCell (the maximum of the lowest SCS configuration among the SCSs configured for PCell/PSCell and the SCell).

Alt. 2: When CC is FR1, 15 kHz, and when CC is FR2, 60 kHz

Alt. 3: When CC is FR1, 60 kHz, and when CC is FR2, 120 kHz

Alt.4: 120 kHz

The Alt (alternatives) according to various embodiments are an example of various embodiments, and slot granularity (and/or a reference SCS for indicating a slot offset) may be defined/determined by other methods according to various other embodiments.

For example, when the offset (e.g., slot offset) is not 0 for the UE indicated to support the related function, the offset may always be signaled.

For example, one slot right-shift and one slot left-shift may correspond to different samples.

For example, the offset range may be limited to ±76800 Ts.

The method of Alt.1 in which the slot granularity is defined/determined for an offset indication according to various embodiments may be described in more detail as follows:

For a given SCell, a single value indicating a slot offset having a slot granularity may be indicated as an RRC parameter.

In the case of slot offset N, the start of slot #0 of a CC (e.g., SCell)(in the case of same SCS, PCell/PScell) with a lower SCS may coincide with the slot #(qN mod M) of the CC (e.g., PCell/PScell)(in the case of same SCS, SCell) with the higher SCS.

q may be defined as follows.
when the SCS of the PCell/PSCell is less than or equal to (less than or equal to) the SCS of the SCell, q=−1.
In other cases, q=1.

M may be the number of slots per frame of a CC with a higher SCS. For example, M may vary according to SCS (reference SCS).

A more specific operation example of a carrier aggregation operation with an unaligned frame boundary according to various embodiments may be as follows.

The definition of a slot offset

According to various embodiments, when a slot offset is indicated, the slot shift method may have two solutions:
first solution: 16k may always be positioned at the front of slot number #0 of the SCell.
second solution: The position of 16k may be changed so that slot boundary alignment can be maintained.

Referring back to Equations 1 and 2 related to OFDM symbol generation in a wireless communication system to which various embodiments are applicable, 16k may be positioned in front of the first OFDM symbol in a subframe, and according to this, when the slot index of the SCell is moved, the first solution in which 16k is always located in front of the slot number #0 of the moved cell may be considered.

Considering that there is no limitation that the position of 16k must be maintained in a wireless communication system to which various embodiments are applicable, for strict slot alignment, the second solution that can change the position of 16k to the front of a slot other than slot number #0 of the moved cell may be considered.

FIGS. 19A and 19B are diagrams illustrating an example of slot shifting according to various embodiments.

Referring to FIG. 19A, an example of the first solution according to various embodiments is illustrated. For example, even in the case of a slot shift, 16k may always be located in slot number #0 of the moved cell. For example, when qN=−2, the slot of the SCell may be shifted by 2 slots to the right in the time domain based on the slot of the PCell/PSCell, and the start of slot #0 of the PCell/PSCell may be shifted to align with the start of slot #79 of the SCell.

Referring to FIG. 19B, an example of a first solution according to various embodiments is illustrated. For example, 16k may be located in a slot other than the slot number #0 of the SCell according to the change of the slot index according to the slot shift. For example, when qN=−2, the slot of the SCell may be shifted to the right by 2 slots in the time domain based on the slot of the PCell/PSCell, and accordingly, 16k may be positioned in front of the slot number #2.

In the first solution according to various embodiments, the number of shifted samples may be determined based on Table 22. For more detailed description, reference may also be made to the description of the various embodiments described above.

TABLE 22

If SCS of Pcell/Pscell and Scell is 15kHz,
- $N_{shift\_samples}$ = N * 32720κ samples
  else,
- For normal CP
  For q=−1, $N_{shift\_samples}$ = N *L+ floor(N /Ns ) * 16κ samples,
  And
  For q= 1, $N_{shift\_samples}$ = N *L+ (floor(N /Ns )+[1-delta(N mod Ns)]) * 16κ samples
- For extended CP
  $N_{shift\_samples}$ = N *$L_{ext}$ samples
  where
  - N is slot offset configured by higher layer (in the slot granularity given by Alt 1.).
  - L = (15360κ − 16κ)/Ns
  - Ns is number of slot within 0.5ms in the CC with higher SCS.
  - Lext = 15360κ / Ns
  - delta(i) = 1 if i = 0 and delta(i) = 0 if i ≠ 0
  - κ = $T_s$ / $T_c$ = 64, where, $T_s$ = 1/($\Delta f_{ref} \cdot N_{f,ref}$), $\Delta f_{ref}$ = 15·10³ Hz and $N_{f,ref}$ = 2048

In the second solution according to various embodiments, slot index shifting (re-numbering) and the number of shifted samples may be determined based on Table 23. For more detailed description, reference may also be made to the description of the various embodiments described above.

TABLE 23

If SCS of Pcell/Pscell and Scell is 15kHz,
$N_{shift\_samples}$ = N * 32720κ samples
else,
For normal CP
First, change slot index j of Scell to slot index (j − ceil( N / S ) )mod K (where, j=0,..., K−1)
Then, frame is shifted by
  $N_{shift\_samples}$ = −( ceil( N / S )*S − N) * L samples, if (ceil( N / S )* S − N) < Ns;
  $N_{shift\_samples}$ = −(16κ +( ceil( N / S )*S − N ) * L) samples, if (ceil( N / S )* S − N) >= Ns
For extended CP
$N_{shift\_samples}$ = N * $L_{ext}$ samples
where
K is the number of slots per frame in Scell.
N is slot offset configured by higher layer (in the slot granularity given by Alt1.).
S is number of slots in the CC with higher SCS per slot in Scell.

$$\left(i.e., S = \frac{2^{\mu\_Cell\_with\_higher\_SCS}}{2^{\mu\_Scell\_SCS}}\right)$$

Ns is number of slots within 0.5ms in the CC with higher SCS.
L = (15360κ − 16κ) / Ns
Lext = 15360κ / Ns
κ = $T_s$ / $T_c$ = 64, where, $T_s$ = 1/($\Delta f_{ref} \cdot N_{f,ref}$), $\Delta f_{ref}$ = 15·10³ Hz and $N_{f,ref}$ = 2048
ceil(x) is an integer greater than or equal to x.

Figure 20:
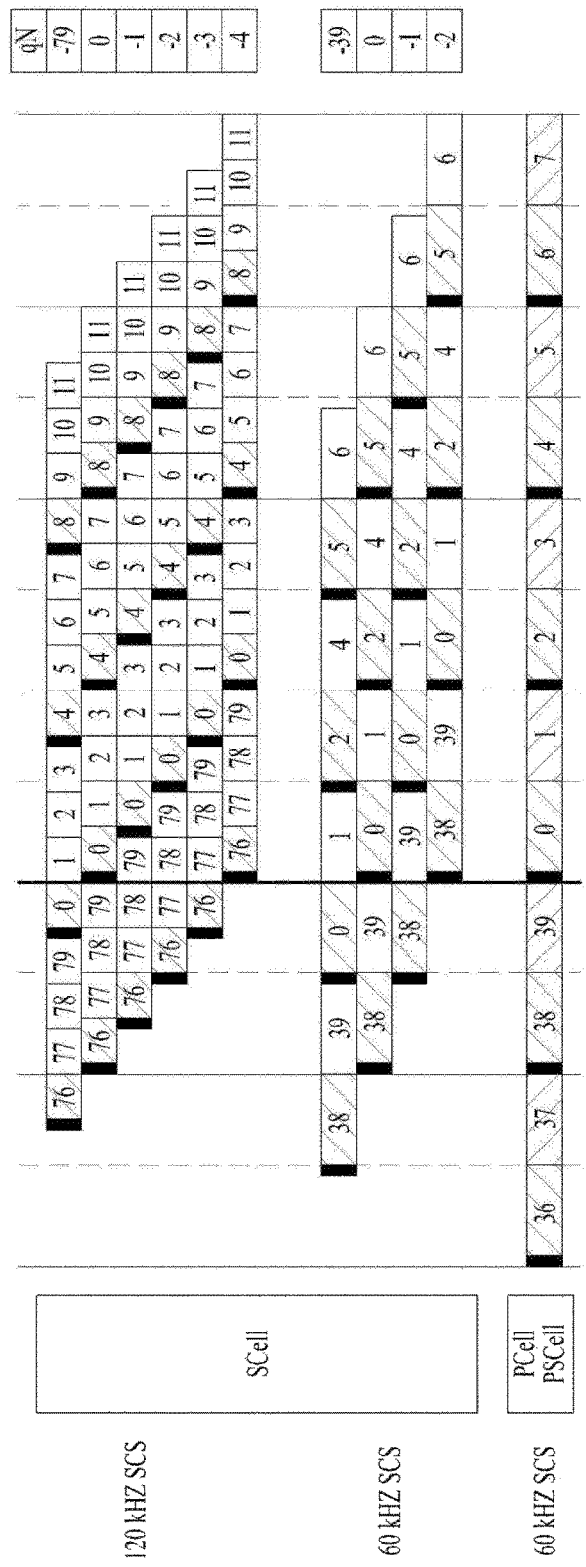
FIG. 20 is a diagram illustrating an example of a slot shifting according to various embodiments.

FIG. 20 is a diagram illustrating an example of slot shifting according to various embodiments.

Figure 21:
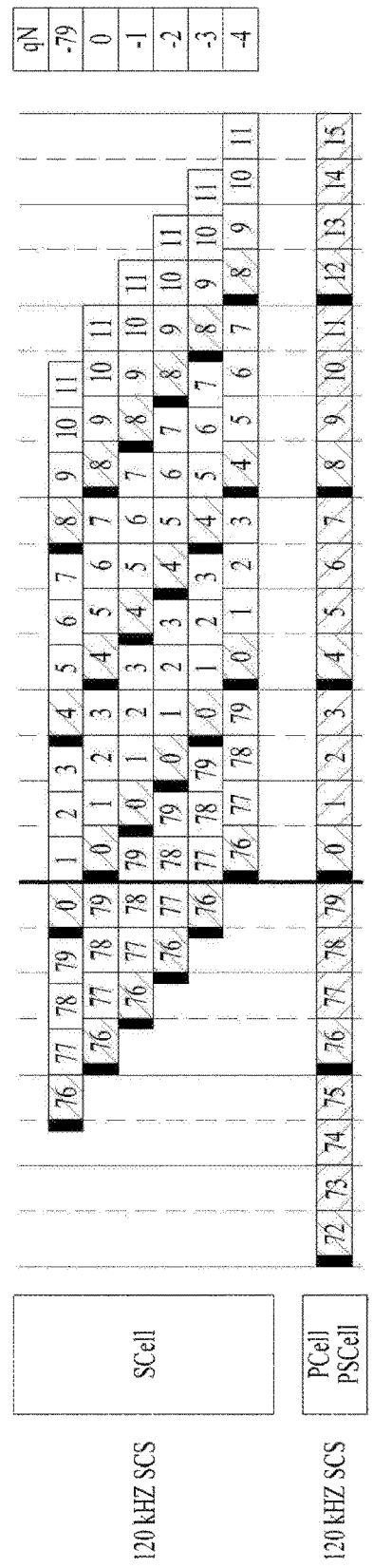
FIG. 21 is a diagram illustrating an example of a slot shifting according to various embodiments.

FIG. 21 is a diagram illustrating an example of slot shifting according to various embodiments.

Figure 22:
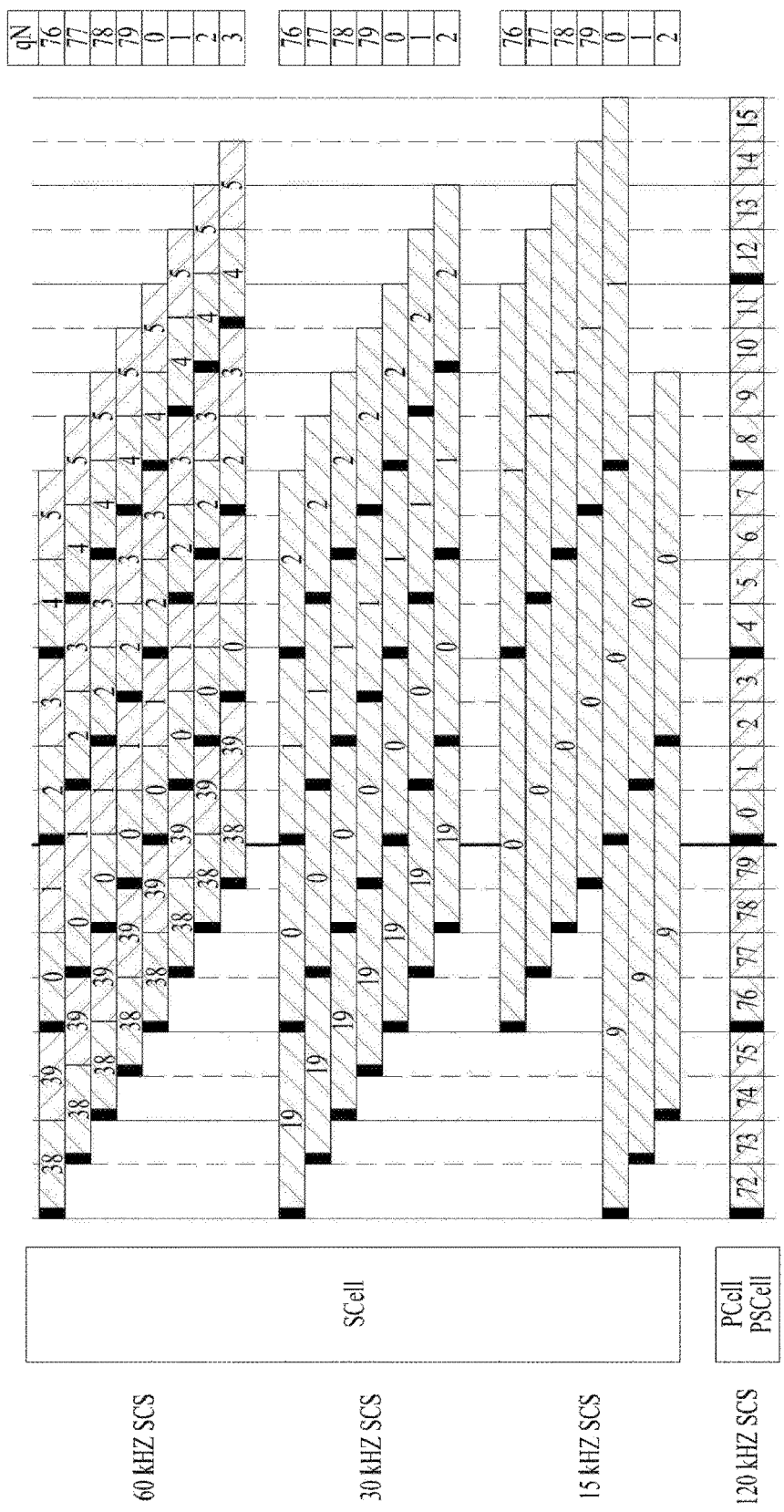
FIG. 22 is a diagram illustrating an example of a slot shifting according to various embodiments.

FIG. 22 is a diagram illustrating an example of slot shifting according to various embodiments.

FIGS. 20 to 22 may illustrate an example of a slot shift according to the first solution according to various embodiments.

Referring to FIGS. 20 to 22, according to the first solution according to various embodiments, when one or more of the SCS of the PCell/PSCell and the SCS of the SCell is less than or equal to (or less than) 30 kHz, the slot boundary may always be maintained (aligned) even by the slot shift. Meanwhile, according to the first solution according to various embodiments, when both the SCS of the PCell/PSCell and the SCS of the SCell exceed 30 kHz, the slot boundary between the PCell/PSCell and the SCell may not be aligned. For example, one of the start of slot #0 and the end of slot #0 of the SCell may not be aligned with the start/end of the slot of the PCell/PSCell.

Figure 23:
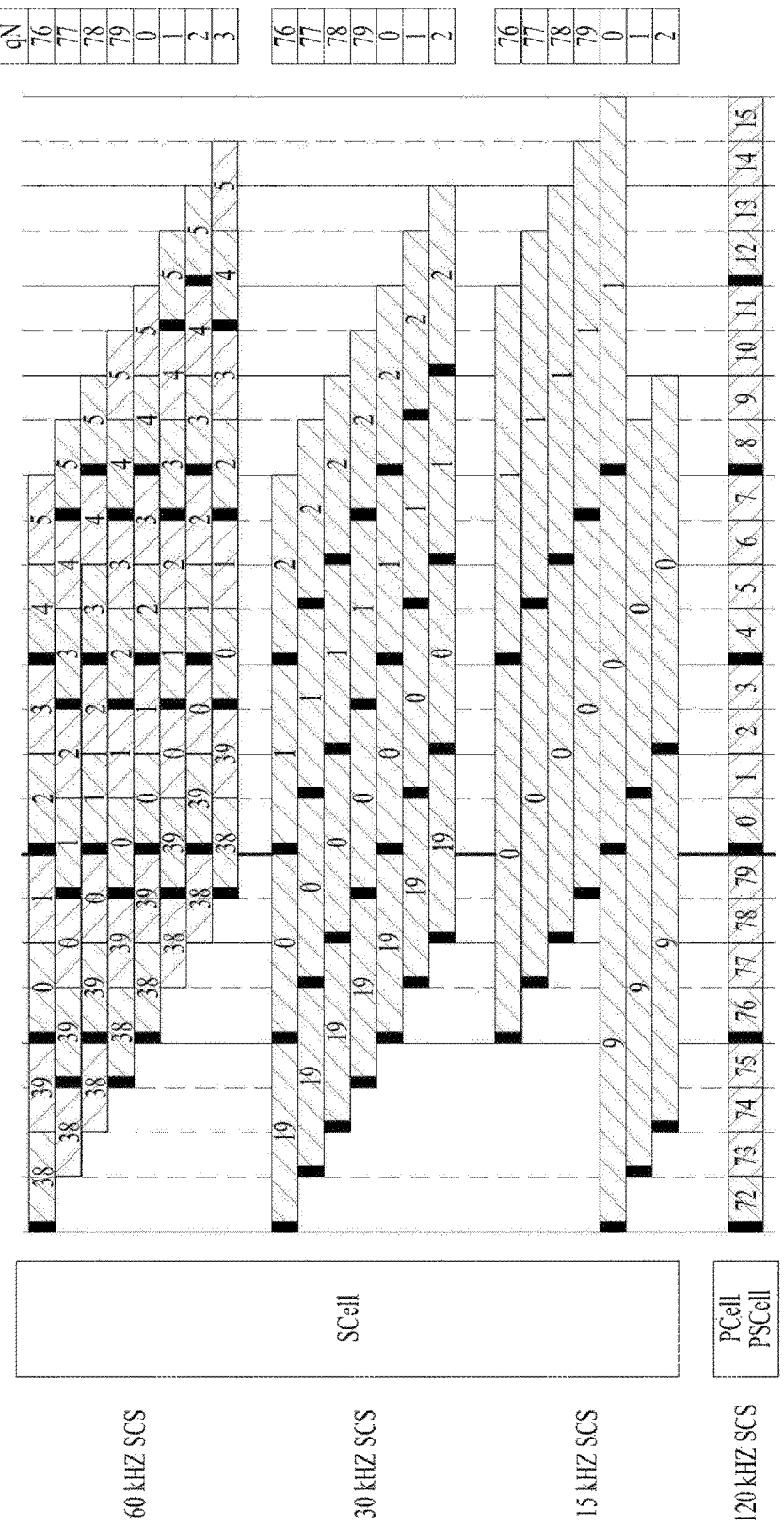
FIG. 23 is a diagram illustrating an example of a slot shifting according to various embodiments.

FIG. 23 is a diagram illustrating an example of slot shifting according to various embodiments.

FIG. 23 may show an example of a slot shift according to the second solution according to various embodiments.

Referring to FIG. 23, according to the second solution according to various embodiments, a change of a 16k position according to a slot shift is allowed, so that a slot boundary may be aligned in all cases.

According to various embodiments, when the shifted slot has a longer slot duration (e.g., a slot corresponding to 15 kHz SCS and 30 kHz SCS), the slot boundary between the PCell/PSCell and the SCell may be aligned even if 16k is located in the first OFDM symbol of the subframe.

According to various embodiments, when the shifted slot has a shorter slot period (e.g., a slot corresponding to 60 kHz SCS), when a change of 16k position according to the slot shift is allowed, the slot boundary between the PCell/PSCell and the SCell may be aligned.

Considering this, if both the SCS of the PCell/PSCell and the SCS of the SCell exceed 30 kHz, the second solution according to various embodiments may be a more preferred solution, however, various embodiments are not limited thereto, and even when both SCS of PCell/PSCell and SCS of SCell exceed 30 kHz, the first solution according to various embodiments may be applied.

Embodiment B

According to various embodiments, when a slot offset is given and the SCSs of two cells are the same, the slot boundary of the SCell may be aligned with the start of slot #0 of the PCell/PSCell.

For example, assuming that cell 1 is PCell, cell 2 is SCell, the SCS of both cells are the same, and a 1 slot offset is placed in cell 2 compared to cell 1, the system may shift the timing of cell 2 to the right with respect to cell 1 by L samples.

For example, when the network indicates 1 offset to the UE, the UE may align the slot boundary according to the same assumption of shifting the timing of cell 2 to the right by L samples with respect to cell 1.

For example, from the perspective of cell 2, it may be seen that the slot boundary of cell 1 is shifted by L samples to the left in the time domain.

For example, assuming that cell 1 and cell 2 are PCells for both UEs in the above situation, if the above assumption for the slot offset is equally applied to the UE in which cell 2 is PCell, when the timing of cell 1 is shifted to the left by 16k+L samples with respect to cell 2, the slot boundary is aligned, and if the system applies a slot offset based on how cell 1 is shown shifted left by L samples, then a UE whose cell 2 is a PCell may recognize a time point different from the slot boundary operated by the system as the slot boundary, and thus a solution for this may be required.

Method 1

According to various embodiments, a certain cell serving as a reference for the slot boundary may be defined, and a shift may be defined/indicated based on the timing of the cell. For example, a cell-specific PCell/PSCell (and/or network-specific PCell/PSCell and/or system-specific PCell/PSCell) may be defined, not a UE-specific PCell/PSCell, which is not related to whether it is a PCell/PSCell or an SCell, and a shift may be defined/indicated based on the timing of the cell-specific PCell/PSCell.

Embodiment 1

For example, a slot offset between the cell and the SCell serving as a reference of the slot boundary may be indicated. For example, a slot offset between a cell-specific PCell/PSCell and an Scell may be indicated.

For example, since a slot offset may be generated between a cell serving as a reference of the slot boundary and a PCell/PSCell, a slot offset for the PCell/PSCell may be indicated. For example, since a slot offset may also be generated between a cell-specific PCell/PSCell and a (UE-specific) PCell/PSCell, the slot offset for the (UE-specific) PCell/PSCell may be indicated.

For example, a certain cell serving as a reference for the slot boundary may be named Rcell (reference cell), PTcell (primary timing cell), TPcell (timing primary cell), timing (reference) PCell, Tcell with reference timing 0 (Tcell with reference timing 0), and the like.

Method 2

According to various embodiments, a signal and/or alignment indicator (slot alignment indicator/slot indicator) indicating how to align the slot boundary may be introduced.

For example, according to the slot boundary used in the system, the network selects a slot boundary alignment method, and indicates/configures the method to the receiver (e.g., UE, IAB DU(integrated access and backhaul distributed unit), IAB MT(integrated access and backhaul mobile termination), etc.).

For example, the receiver may align the slot boundary according to the instruction/configuration received method.

Embodiment 1

For example, the following two slot boundary alignment methods may be configured/indicated by an indicator. For example, one of the following two types of slot boundary alignment method may be configured/indicated by the indicator:

1) whether the start of slot 0 of PCell/PSCell is aligned with slot boundary of SCell
2) whether the end of slot 0 of the PCell/PSCell is aligned with the slot boundary of the SCell For example, the slot boundary alignment method according to 1) may be expressed by the equation shown in Table 24.

TABLE 24

If SCS of Pcell/Pscell and Scell is 15kHz,
- $N_{shift\_samples} = N * 32720\kappa$ samples else,
- For normal CP For q= −1, $N_{shift\_samples} = N *L+ \text{floor}(N /Ns) * 16\kappa$ samples, And For q= 1, $N_{shift\_samples} = N *L+ (\text{floor}(N /Ns )+[1-\text{delta}(N \bmod Ns)]) * 16\kappa$ samples
- For extended CP $N_{shift\_samples} = N *L_{ext}$ samples where
- N is slot offset configured by higher layer (in the slot granularity given by Alt 1.).
- $L = (15360\kappa - 16\kappa)/Ns$
- Ns is number of slot within 0.5ms in the CC with higher SCS.
- $L_{ext} = 15360\kappa / Ns$
- $\text{delta}(i) = 1$ if i = 0 and $\text{delta}(i) = 0$ if i ≠ 0
- $\kappa = T_s / T_c = 64$, where, $T_s = 1/(\Delta f_{ref} \cdot N_{f,ref})$, $\Delta f_{ref} = 15 \cdot 10^3$ Hz and $N_{f,ref} = 2048$

Embodiment 2

For example, when UE-specific PCell/PSCell and SCell are configured, it may be indicated for each UE. For example, the indicator may be transmitted as additional information (e.g., PBCH, SIB1, RRC, etc.) when the PCell informs the slot offset of the SCell.

Embodiment 3

For example, if the SCS of two cells is the same, at least one of Embodiment 1 and/or Embodiment 2 may be applied, and when SCSs of two cells are different, it may be based on a magnitude relationship between SCSs of two cells.

For example, when the slot offset of the SCell for the PCell/PSCell is given as N (N is an integer):
 If the SCS of the PCell/PSCell is the same as the SCS of SCell,
  If the alignment indicator is configured to starting alignment, the UE may assume that the start of slot 0 of the PCell/PSCell is aligned with the start of the slot (−N mod M) of the SCell,
  If the alignment indicator is configured to end alignment, the UE may assume that the end of slot 0 of the PCell/PScell is aligned with the end of the slot (−N mod M) of the SCell.
 Otherwise,
  The UE may assume that the start of the slot 0 of the cell with the lower SCS is aligned with the start of the slot (qN mod M) of the cell with the higher SCS.

For example, M may be the number of slots in a frame in (higher) SCS.

For example, a slot boundary alignment method according to Embodiment 3 may be expressed by the equation shown in Table 25.

boundary of another cell, but in order to prevent that the boundary of a cell with a short slot (compared to other cells) may be shifted to be located in the middle of the slot of another cell, in this case, the allowed value of the slot shift may be limited to an integer multiple of the slot length of a cell having a smaller SCS.

Embodiment 5

For example, when an indicator is required, the indicator may be used to indicate the value of q. For example, the q value may be indicated by the alignment indicator.

Method 3

According to various embodiments, a frequency point (reference point/reference frequency point) for determining a reference cell/target cell may be defined/configured. According to various embodiments, at the start of slot 0 of a cell having a lower frequency point in the frequency domain among the two cells, (the start of) the slot boundary of a cell having a higher frequency point among the two cells may be aligned.

For example, regardless of whether it is PCell/PScell or SCell, at the start of slot 0 of a cell having a lower center frequency among the two cells, (the start of) the slot boundary of a cell having a higher center frequency among the two cells may be aligned.

For example, regardless of whether it is PCell/PScell or SCell, at the start of slot 0 of the cell having the lower ARFCN among the two cells, (the start of) the slot boundary of a cell having the higher ARFCN among two cells may be aligned.

For example, regardless of whether it is PCell/PScell or SCell, at the start of slot 0 of a cell having a lower point A among two cells, (the start of) the slot boundary of a cell having the higher point A among two cells may be aligned.

For example, when the SCSs of two cells are the same, the above-described method may be applied, and when the

TABLE 25

If SCS of Pcell/Pscell and Scell is 15kHz,
- $N_{shift\_samples} = N * 32720\kappa$ samples else,
- For normal CP,
  if SCS of PCell/PScell is smaller than SCS of SCell or
    SCS of PCell/PScell is equal to SCS of SCell with slot indicator set to "beginning alignment"(i.e., the beginning of slot 0 of PCell/PScell is to be aligned to (the beginning of) a slot boundary of SCell),
      $N_{shift\_samples} = N * L + floor(N / Ns) * 16\kappa$ samples,
  and
  if SCS of PCell/PScell is larger than SCS of SCell or
    SCS of PCell/PScell is equal to SCS of SCell with slot indicator set to "ending alignment"(i.e., the end of slot 0 of PCell/PScell is to be aligned to (the end of) a slot boundary of SCell),
      $N_{shift\_samples} = N * L + (floor(N / Ns) + [1-delta(N \mod Ns)]) * 16\kappa$ samples
- For extended CP
  $N_{shift\_samples} = N * L_{ext}$ samples where
- N is slot offset configured by higher layer (in the slot granularity given by Alt 1.).
- $L = (15360\kappa - 16\kappa)/Ns$
- Ns is number of slot within 0.5ms in the CC with higher SCS.
- $L_{ext} = 15360\kappa / Ns$
- $delta(i) = 1$ if $i = 0$ and $delta(i) = 0$ if $i \neq 0$
- $\kappa = T_s / T_c = 64$, where, $T_s = 1/(\Delta f_{ref} \cdot N_{f,ref})$, $\Delta f_{ref} = 15 \cdot 10^3$ Hz and $N_{f,ref} = 2048$

Embodiment 4

For example, regardless of the magnitude relationship (i.e., the magnitude relationship between the slot lengths of two cells) between the SCSs of two cells, the above-described methods in which the PCell/PSCell is always the reference timing and the slot offset alignment method is indicated may be applied.

For example, the boundary of a cell with a long slot (compared to other cells) may always be aligned with the SCSs of the two cells are different, according to the magnitude relationship between the SCSs of two cells (that is, the magnitude relationship between the slot lengths of two cells), for example, the start of the slot 0 of the cell having the longer slot length may be shifted so that the start of the slot boundary of the cell having the shorter slot length may be aligned.

For example, the slot boundary alignment method according to the Method 3 may be expressed by the equation shown in Table 26.

TABLE 26

If SCS of Pcell/Pscell and Scell is 15kHz,
- $N_{shift\_samples} = N^* 32720\kappa$ samples else,
- For normal CP,
    if SCS of PCell/PScell is smaller than SCS of SCell or
      SCS of PCell/PScell is equal to SCS of SCell with ARFCN of Pcell/PScell being smaller than ARFCN of Scell(or, center frequency of PCell/PScell being lower than center frequency of SCell),
        $N_{shift\_samples} = N *L+ floor(N /Ns ) * 16\kappa$ samples,
    and
    if SCS of PCell/PScell is larger than SCS of SCell or
      SCS of PCell/PScell is equal to SCS of SCell with ARFCN of Pcell/PScell being larger than ARFCN of Scell(or, center frequency of PCell/PScell being higher than center frequency of SCell),
        $N_{shift\_samples} = N *L+ (floor(N /Ns )+[1-delta(N\ mod\ Ns)] ) * 16\kappa$ samples
- For extended CP
    $N_{shift\_samples} = N *L_{ext}$ samples where
- N is slot offset configured by higher layer (in the slot granularity given by Alt 1.).
- $L = (15360\kappa - 16\kappa)/Ns$
- Ns is number of slot within 0.5ms in the CC with higher SCS.
- $Lext = 15360\kappa / Ns$
- $delta(i) = 1$ if $i = 0$ and $delta(i) = 0$ if $i \neq 0$
- $\kappa = T_s / T_c = 64$, where, $T_s = 1/(\Delta f_{ref} \cdot N_{f,ref})$, $\Delta f_{ref} = 15 \cdot 10^3$ Hz and $N_{f,ref} = 2048$ Method 4

According to various embodiments, a frequency point (reference point/reference frequency point) for determining a reference cell/target cell may be defined/configured. According to various embodiments, at the start of the slot 0 of a cell having a higher frequency point in the frequency domain among two cells, (the start of) the slot boundary of a cell having a lower frequency point among the two cells may be aligned.

For example, regardless of whether it is PCell/PScell or SCell, at the start of the slot 0 of a cell having a higher center frequency among two cells, (the start of) the slot boundary of a cell having a lower center frequency among two cells may be aligned.

For example, regardless of whether it is PCell/PScell or SCell, at the start of the slot 0 of a cell having a higher ARFCN among two cells, (the start of) the slot boundary of a cell having a lower ARFCN among two cells may be aligned.

For example, regardless of whether it is PCell/PScell or SCell, at the start of the slot 0 of a cell having a higher point A among two cells, (the start of) the slot boundary of a cell having a lower point A among two cells may be aligned.

For example, when the SCSs of two cells are the same, the above-described method may be applied, and when the SCSs of the two cells are different, according to the magnitude relationship between the SCSs of two cells (that is, the magnitude relationship between the slot lengths of two cells), for example, the start of the slot 0 of the cell having the longer slot length may be shifted to align the start of the slot boundary of the cell having the shorter slot length. (And/or, for example, the start of slot 0 of a cell having a lower SCS may be shifted so that the start of the slot boundary of the cell having a higher SCS is aligned.)

For example, the slot boundary alignment method according to Method 4 may be expressed by the equation shown in Table 27.

TABLE 27

If SCS of Pcell/Pscell and Scell is 15kHz,
- $N_{shift\_samples} = N^* 32720\kappa$ samples else,
- For normal CP,
    if SCS of PCell/PScell is smaller than SCS of SCell or
      SCS of PCell/PScell is equal to SCS of SCell with ARFCN of Pcell/PScell being larger than ARFCN of Scell(or, center frequency of PCell/PScell being higher than center frequency of SCell),
        $N_{shift\_samples} = N *L+ floor(N /Ns ) * 16\kappa$ samples,
    and
    if SCS of PCell/PScell is larger than SCS of SCell or
      SCS of PCell/PScell is equal to SCS of SCell with ARFCN of Pcell/PScell being smaller than ARFCN of Scell(or, center frequency of PCell/PScell being lower than center frequency of SCell),
        $N_{shift\_samples} = N *L+ (floor(N /Ns )+[1-delta(N\ mod\ Ns)] ) * 16\kappa$ samples
- For extended CP
    $N_{shift\_samples} = N *L_{ext}$ samples where
- N is slot offset configured by higher layer (in the slot granularity given by Alt 1.).
- $L = (15360\kappa - 16\kappa)/Ns$
- Ns is number of slot within 0.5ms in the CC with higher SCS.
- $Lext = 15360\kappa / Ns$
- $delta(i) = 1$ if $i = 0$ and $delta(i) = 0$ if $i \neq 0$
- $\kappa = T_s / T_c = 64$, where, $T_s = 1/(\Delta f_{ref} \cdot N_{f,ref})$, $\Delta f_{ref} = 15 \cdot 10^3$ Hz and $N_{f,ref} = 2048$ Method 5

According to various embodiments, as a modification of the Method 1, a slot offset indicator for each cell with respect to the reference timing (e.g., its own slot offset indicator for each cell) may be introduced.

For example, instead of the relative shift concept that the SCell is relatively shifted by N slots based on the PCell/PSCell, it may be indicated (through MIB/SIB1/RRC, etc.) for each cell how many slots it is shifted based on the virtual reference timing 0. At this time, for example, it may be shifted so that the start of the slot #0 of the cell (i.e. shifted by 0 slots) indicated as not shifted is aligned with the start of the slot boundary of the other cell.

Embodiment 1

For example, when there are cell 1 and cell 2 in the system, it may be assumed that cell 1 is shifted by 0 slots (0 slot shifted) and cell 2 is itself indicated as shifted by N slots (N slots shifted).

For example, it may be assumed that cell 1 is configured as PCell/PSCell and cell 2 as SCell for UE 1, and cell 2 is configured as PCell/PSCell and cell 1 as SCell for UE 2.

For example, for UE 1, since the PCell/PSCell is shifted 0 slots and the SCell is shifted N slots, the UE 1 may assume/determine/recognize that the SCell is shifted by N slots (shifted right by N slots) so that the start of the slot (−N mod M) of the SCell is aligned with the start of the slot 0 of the PCell/PSCell.

On the other hand, for example, for UE 2, since the SCell is shifted by 0 slots and the PCell/PSCell is shifted by N slots, UE 2 may assume/determine/recognize that the SCell is shifted by −N slots (shifted left by N slots) so that the slots (−N mod M) of the PCell/PSCell are aligned at the start of slot 0 of the SCell. For example, in the case of UE 2, the start of slot 0 of the PCell/PSCell may not always be aligned with the start of the slot (N mod M) of the SCell, and, for example, there may be a difference in the slot boundary by 16k.

For example, in Embodiment 1, when shifted by N slots, the shift unit to be shifted may be predefined/determined as a reference slot unit (e.g., the slot corresponding to 120 kHz SCS).

Embodiment 2

For example, when the SCSs of two cells are the same, embodiment 1 may be applied, and when the SCSs of the two cells are different (that is, when the slot length of two cells are different), it may be based on the magnitude relationship between the SCSs of the two cells (that is, the magnitude relationship between the slot length of two cells). For example, the start of slot 0 of the cell having the longer slot may be shifted to align the start of the slot boundary of the cell having the shorter slot.

Embodiment 3

For example, Method 5 according to various embodiments may also be applied to a slot shift method based on slot index shifting (slot re-numbering) according to the various embodiments described above. For example, the UE may know how the frame structure is changed from this.

For example, for a (i.e. shifted by 0 slots) cell indicated as not shifted, a frame structure defined in a wireless communication system (e.g., NR system) to which various embodiments are applicable is maintained, and for a cell shifted by N slots, samples corresponding to 16k may exist at other positions in the frame other than the beginning of slot 0.

Method 6

According to various embodiments, at the start of slot 0 of a cell having the larger bandwidth among the two cells, the (start of) slot boundary of another cell may be aligned.

For example, regardless of whether it is PCell/PScell or SCell, by comparing the SCS of the BWPs of two cells, if the minimum SCS value (lowest SCS) of the two cells is the same, at the start of slot 0 of a cell (that is, with a longer slot) having the second smallest SCS value (second lowest SCS), (start of) the slot boundary of another cell may be aligned. For example, when the value of the second smallest SCS is also the same, the magnitude of the third smallest SCS is compared, and when the value of the third smallest SCS is also the same, the magnitude of the fourth smallest SCS is compared so that SCS values may be compared until they are different. If all are the same, other frequency points (e.g., center frequency, point A, bandwidth, etc.) may be further compared.

Method 7

According to various embodiments, when the relative slot timing offset N (N is an integer) of the SCell based on the timing of the PCell/PSCell is given, if N>0 (right shift of SCell), (the start of) the slot boundary of SCell may be aligned with the start of slot #0 of PCell/PSCell, and if N<0 (left shift of SCell), (the end of) the slot boundary of SCell may be aligned at the end of slot #0 of PCell/PSCell.

Method 7 according to various embodiments may be particularly effective when the SCSs of two cells are the same. For example, if the SCS or slot length of the two cells are different, considering that the boundary of a cell with a longer slot (than other cells) always coincides with the boundary of another cell, but the boundary of a cell with a shorter slot (than other cells) is positioned in the middle of the slots of other cells, the value of the allowed slot shift may be limited to an integer multiple of the slot length of a cell with a smaller SCS.

For example, When the SCSs of the two cells are the same, the method according to the above-described various embodiments may be applied. When the SCSs of the two cells are different (i.e., when the two cells have different slot lengths), it may be based on a magnitude relationship between the SCSs of the two cells (i.e., the magnitude relationship between the slot lengths of the two cells). For example, (the start of) the slot boundary of a cell having a shorter slot may be shifted to align with the start of slot #0 of a cell having a longer slot.

For example, when the SCSs of the two cells are different, (the start of) the slot boundary of the cell having the shorter slot may be aligned with the start of slot #0 of the cell having the longer slot. For example, when the SCSs of the two cells are the same, if N>0 (or N=0), the start of the slot #0 of the PCell/PSCell may be aligned with the start of the slot # (−N mod M) of the SCell. For example, when the SCSs of two cells are the same, if N<0, the end of the slot #0 of the PCell/PSCell may be aligned with the end of the slot # (−N mod M) of the SCell.

For example, M is the number of slots in one frame when the SCSs of two cells are the same, and when the SCSs of the two cells are different, it may be the number of slots in one frame in a cell having a larger SCS value (having a short slot length).

For example, the slot boundary alignment method according to the Method 7 may be expressed by the equation shown in Table 28.

TABLE 28

If SCS of Pcell/Pscell and Scell is 15kHz,
- $N_{shift\_samples}$ = N * 32720κ samples else,
- For normal CP,
    if 'SCS of PCell/PScell is smaller than SCS of SCell' or
    'SCS of PCell/PScell is equal to SCS of SCell and N > 0',
    $N_{shift\_samples}$ = N *L+ floor(N /Ns ) * 16κ samples,
- and
    if 'SCS of PCell/PScell is larger than SCS of SCell' or
    'SCS of PCell/PScell is equal to SCS of SCell and N < 0',
    $N_{shift\_samples}$ = N *L+ (floor(N/Ns )+[1-delta(N mod Ns)] ) * 16κ samples
- For extended CP
    $N_{shift\_samples}$ = N *$L_{ext}$ samples where
- N is slot offset configured by higher layer (in the slot granularity given by Alt 1.).
- L = (15360κ − 16κ)/Ns
- Ns is number of slot within 0.5ms in the CC with higher SCS (or in any CC if SCSs are equal between two CCs).
- Lext = 15360κ / Ns
- delta(i) = 1 if i = 0 and delta(i) = 0 if i ≠ 0
- κ = $T_s$ / $T_c$ = 64, where, $T_s$ = 1/($\Delta f_{ref} \cdot N_{f,ref}$), $\Delta f_{ref}$ = 15·$10^3$ Hz and $N_{f,ref}$ = 2048

For example, the slot boundary alignment method according to the Method 7 may be expressed by a more general equation shown in Table 29.

TABLE 29

If SCS of Pcell/Pscell and Scell is 15kHz,
- $N_{shift\_samples}$ = N * 32720κ samples else,
- For normal CP,
    if N > 0',
    $N_{shift\_samples}$ = N *L+ floor(N/Ns) * 16κ samples,
    and
    if N < 0',
    $N_{shift\_samples}$ = N *L+ (floor(N/Ns )+[1-delta(N mod Ns)] ) * 16κ samples
- For extended CP
    $N_{shift\_samples}$ = N *$L_{ext}$ samples where
- N is slot offset configured by higher layer (in the slot granularity given by Alt 1.).
- L = (15360κ − 16κ)/Ns
- Ns is number of slot within 0.5ms in the CC with higher SCS (or in any CC if SCSs are equal between two CCs).
- Lext = 15360κ / Ns
- delta(i) = 1 if i = 0 and delta(i) = 0 if i ≠ 0
- κ = $T_s$ / $T_c$ = 64, where, $T_s$ = 1/($\Delta f_{ref} \cdot N_{f,ref}$), $\Delta f_{ref}$ = 15·$10^3$ Hz and $N_{f,ref}$ = 2048

Method 7-a)

According to various embodiments, given the relative slot timing offset N (N is an integer) of the SCell based on the timing of the PCell/PSCell, if N<0 (left shift of SCell), the slot boundary (start of) of SCell may be aligned with the start of slot #0 of PCell/PSCell, and if N>0 (right shift of the SCell), the slot boundary (end of) of the SCell may be aligned at the end of slot #0 of the PCell/PSCell.

Method 7-a) according to various embodiments may be particularly effective when SCSs of two cells are the same. For example, if the SCS or slot length of the two cells are different, considering that the boundary of a cell with a longer slot (than other cells) always coincides with the boundary of another cell but the boundary of a cell with a shorter slot (than other cells) is positioned in the middle of the slots of other cells, the value of the allowed slot shift may be limited to an integer multiple of the slot length of a cell with a smaller SCS.

For example, the slot boundary alignment method according to the Method 7-a) may be expressed by the general equation shown in Table 30.

TABLE 30

If SCS of Pcell/Pscell and Scell is 15kHz,
- $N_{shift\_samples}$ = N* 32720κ samples else,
- For normal CP,
    if N > 0',
    $N_{shift\_samples}$ = N *L+ floor(N/Ns ) * 16κ samples,
    and
    if N < 0',
    $N_{shift\_samples}$ = N *L+ (floor(N/Ns )+[1-delta(N mod Ns)] )* 16κ samples TABLE 30-continued

- For extended CP
   $N_{shift\_samples} = N * L_{ext}$ samples where
- N is slot offset configured by higher layer (in the slot granularity given by Alt 1.).
- L = (15360κ − 16κ)/Ns
- Ns is number of slot within 0.5ms in the CC with higher SCS (or in any CC if SCSs are equal between two CCs).
- Lext = 15360κ / Ns
- delta(i) = 1 if i = 0 and delta(i) = 0 if i ≠ 0
- κ = $T_s$ / $T_c$ = 64, where, $T_s$ = 1/($\Delta f_{ref} \cdot N_{f,ref}$), $\Delta f_{ref}$ = 15·10³ Hz and $N_{f,ref}$ = 2048

According to the Method 7 and/or Method 7-a according to various embodiments, when two cells have the same SCS, since the number of samples of the SCell shifted right (and/or left) for a given positive (and/or negative) slot offset N is equal to the number of samples of the SCell shifted left (and/or right) with respect to −N, when the network operates with a slot offset N relative to the two cells (e.g., cell 1 and cell 2), the UE 1 with cell 1 as PCell/PSCell and the UE 2 with cell 2 as PCell/PSCell may accurately know the shift length maintained by the network up to the number of samples without contradiction.

According to Method 7 and/or Method 7-a according to various embodiments, when the given absolute values of N are the same, left/right shifted lengths may be symmetric (same).

That is, when the given absolute value of N is the same, the left and right shift lengths are symmetric.

Since a signal is transmitted and received between the network and the UE, it may be very important to accurately configure the timing assumed by the network and the UE. Taking the frame structure of a wireless communication system to which various embodiments are applicable, in particular, when the SCS values of the two cells are 60 kHz/60 kHz and 120 kHz/120 kHz, respectively, the Method 7 and/or Method 7-a according to various embodiments may be more effectively applied. For example, when SCS values of two cells are 60 kHz/60 kHz and 120 kHz/120 kHz, respectively, the Method 7 and/or the Method 7-a according to various embodiments may be limitedly applied.

Network Initial Access and Communication Process

The UE according to various embodiments may perform a network access process in order to perform the procedures and/or methods described/suggested above. For example, the UE may receive and store system information and configuration information necessary for performing the procedures and/or methods described/proposed above in a memory while performing access to a network (e.g., a base station). Configuration information necessary for various embodiments may be received through higher layer (e.g., RRC layer; Medium Access Control, MAC, layer, etc.) signaling.

Figure 24:
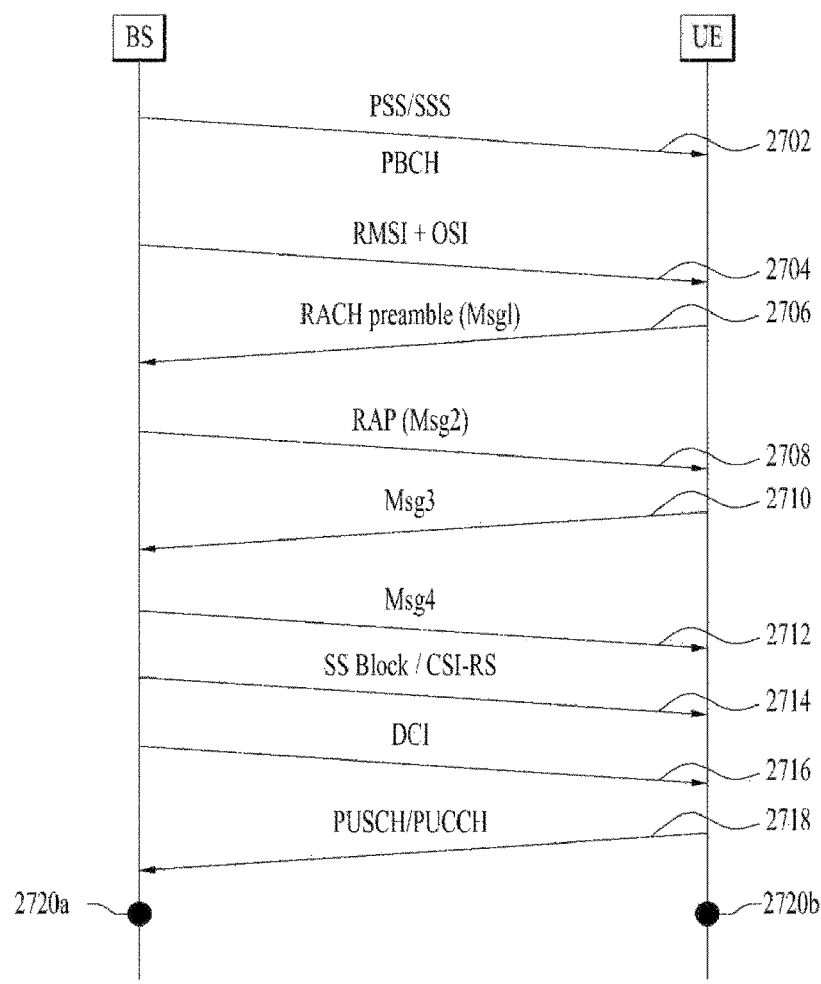
FIG. 24 is a diagram briefly illustrating an initial network access and a subsequent communication process according to various embodiments.

FIG. 24 is a diagram briefly illustrating an initial network connection and a subsequent communication process according to various embodiments of various embodiments. In an NR system to which various embodiments are applicable, a physical channel and a reference signal may be transmitted using beam-forming. When beam-forming-based signal transmission is supported, a beam management process may be involved in order to align beams between the base station and the UE. In addition, signals proposed in various embodiments may be transmitted/received using beam-forming. In Radio Resource Control (RRC) IDLE mode, beam alignment may be performed based on SSB (or SS/PBCH block). On the other hand, in the RRC CONNECTED mode, beam alignment may be performed based on CSI-RS (in DL) and SRS (in UL). Meanwhile, when beam-forming-based signal transmission is not supported, an operation related to a beam may be omitted in the following description.

As shown in FIG. 24, the base station (e.g., BS) may periodically transmit the SSB (2702). Here, SSB includes PSS/SSS/PBCH. The SSB may be transmitted using beam sweeping. Thereafter, the base station may transmit remaining minimum system information (RMSI) and other system information (OSI) (2704). The RMSI may include information (e.g., PRACH configuration information) required for the UE to initially access the base station. Meanwhile, the UE identifies the best SSB after performing SSB detection. Thereafter, the UE may transmit the RACH preamble (Message 1, Msg1) to the base station by using the PRACH resource linked/corresponding to the index (i.e., beam) of the best SSB (2706). The beam direction of the RACH preamble is related to the PRACH resource. Association between the PRACH resource (and/or the RACH preamble) and the SSB (index) may be configured through system information (e.g., RMSI). Thereafter, as part of the RACH process, the base station may transmit a random access response (RAR) (Msg2) in response to the RACH preamble (2708), and the UE may transmit Msg3 (e.g., RRC Connection Request) using the UL grant in the RAR (2710), and the base station may transmit a contention resolution message (Msg4) (2712). Msg4 may include RRC Connection Setup.

When the RRC connection is established between the base station and the UE through the RACH process, subsequent beam alignment may be performed based on SSB/CSI-RS (in DL) and SRS (in UL). For example, the UE may receive SSB/CSI-RS (2714). The SSB/CSI-RS may be used by the UE to generate a beam/CSI report. Meanwhile, the base station may request a beam/CSI report from the terminal through DCI (2716). In this case, the UE may generate a beam/CSI report based on SSB/CSI-RS and transmit the generated beam/CSI report to the base station through PUSCH/PUCCH (2718). The beam/CSI report may include a beam measurement result, information about a preferred beam, and the like. The base station and the UE may switch beams based on the beam/CSI report (2720a, 2720b).

Thereafter, the UE and the base station may perform the above-described/proposed procedure and/or methods. For example, the UE and the base station may process the information in the memory and transmit the radio signal or process the received radio signal and store it in the memory according to various embodiments based on the configuration information obtained during the network access process (e.g., system information acquisition process, RRC connection process through RACH, etc.). Here, the radio signal may include at least one of PDCCH, PDSCH, and RS (Reference Signal) for downlink, and may include at least one of PUCCH, PUSCH, and SRS for uplink.

And/or, the UE and the base station may perform the above-described/proposed procedure and/or methods as at least a part of the above-described initial access procedure.

The above-described initial access process may be combined with the contents of the above-mentioned sections 1 to 2 to configure other various embodiments, and this can be clearly understood by those of ordinary skill in the art.

Figure 25:
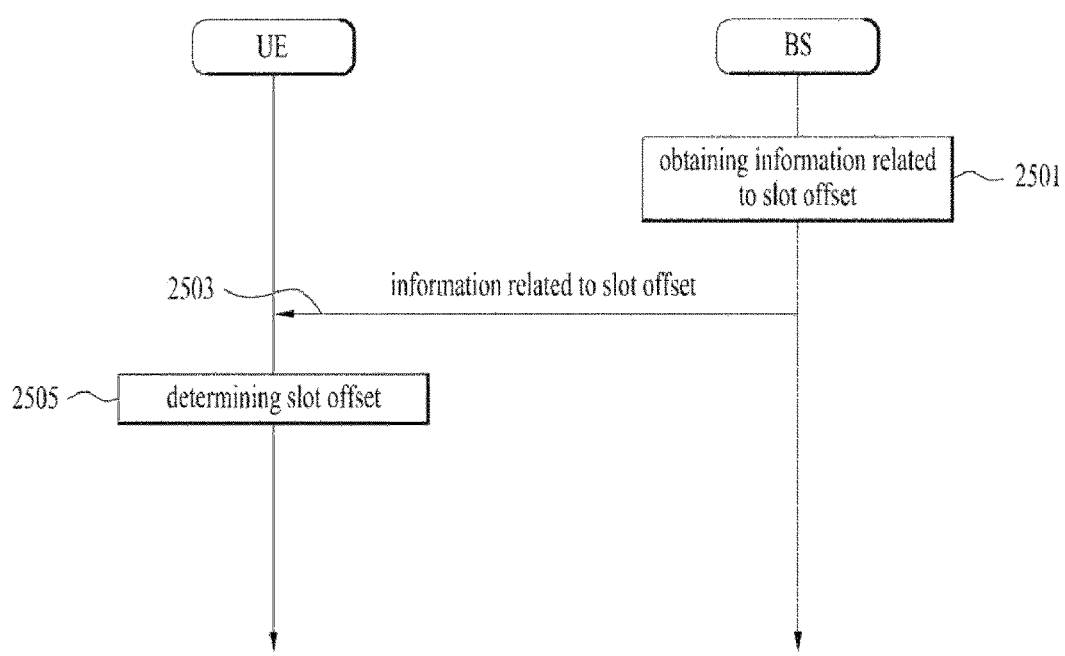
FIG. 25 is a diagram briefly illustrating a method of an operation of a UE and a base station according to various embodiments.

FIG. 25 is a diagram briefly illustrating a method of an operation a UE and a base station according to various embodiments.

Figure 26:
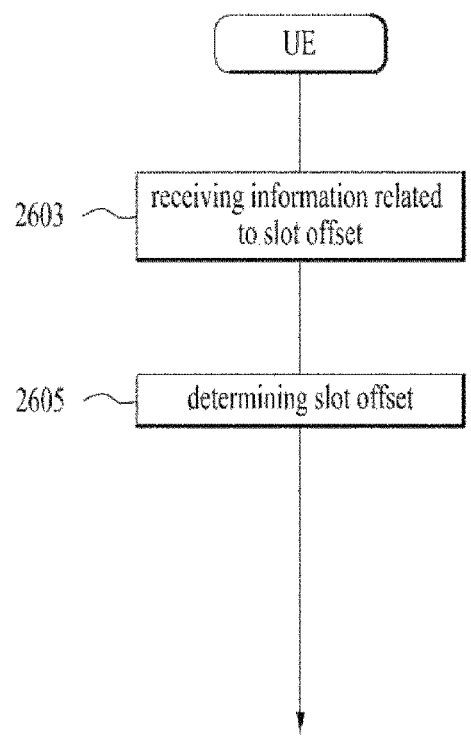
FIG. 26 is a flowchart illustrating a method of an operation of a UE according to various embodiments.

FIG. 26 is a flowchart illustrating a method of an operation of a UE according to various embodiments.

Figure 27:
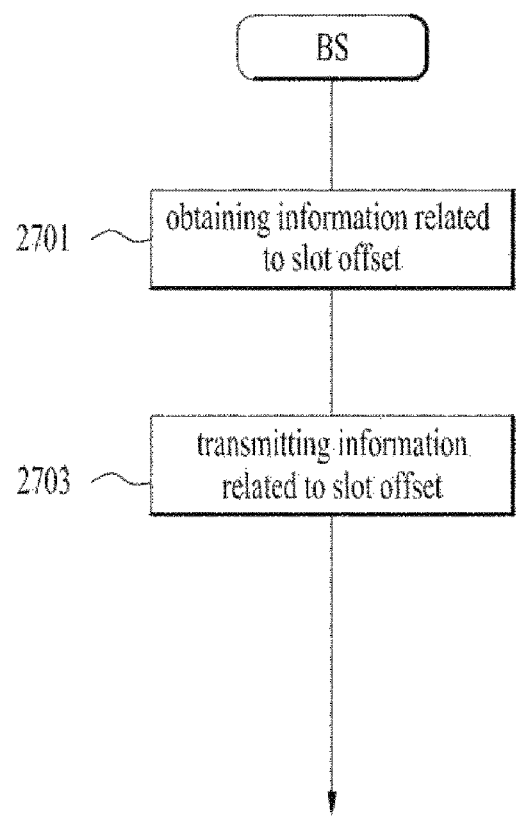
FIG. 27 is a flowchart illustrating a method of an operation of a base station according to various embodiments.

FIG. 27 is a flowchart illustrating a method of an operation of a base station according to various embodiments.

Referring to FIGS. 25 to 27, in operations 2501 and 2701 according to various embodiments, a base station may acquire/generate/configure information related to a slot offset. For example, the information related to the slot offset may be information related to carrier aggregation. For example, the slot offset may be a slot offset between a first cell and a second cell.

In operations 2503, 2603, and 2703 according to various embodiments, the base station may transmit information related to the slot offset, and the UE may receive it.

In operations 2505 and 2605 according to various embodiments, the UE may determine a slot offset. For example, the UE may determine the slot offset between a first cell and a second cell based on information related to the slot offset.

According to various embodiments, the information related to the slot offset may be information based on the reference SCS. For example, the reference SCS may be for a slot offset. For example, the reference SCS may be determined based on satisfying a preconfigured condition and/or based on a preconfigured condition. For example, the preset condition may be a preconfigured condition for defining/configuring/obtaining the reference SCS.

For example, the slot offset may be a slot offset between the first cell and the second cell of the unaligned frame boundary. For example, the frame boundary of the first cell and the frame boundary of the second cell may not be aligned in the time domain. For example, even if the frame boundary of the first cell and the frame boundary of the second cell are not aligned, the slot boundary of the first cell and the slot boundary of the second cell may be aligned.

A more specific operation of the UE and/or the base station according to the above-described various embodiments may be described and performed based on the contents of the above-described Sections 1 to 2.

Since examples of the above-described proposed method may also be included as one of various embodiments, it is clear that they may be regarded as a kind of proposed method. In addition, the above-described proposed methods may be implemented independently, but may also be implemented in the form of a combination (or merge) of some of the proposed methods. A rule may be defined so that the base station notifies the UE of information on whether the proposed methods are applied or not (or information on rules for the proposed methods) through a predefined signal (e.g., physical layer signal or higher layer signal).

3. Device Configuration Examples in which Various Embodiments are Implemented 3.1. Device Configuration Example to which Various Embodiments are Applied FIG. 28 is a diagram illustrating a device in which various embodiments may be implemented.

Figure 28:
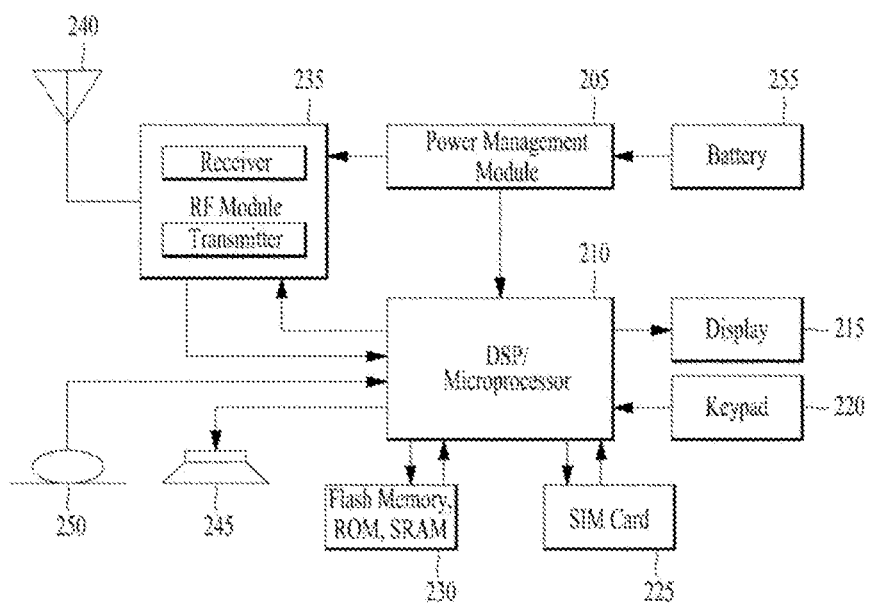
FIG. 28 is a diagram illustrating an apparatus in which various embodiments may be implemented.

The device shown in FIG. 28 may be a user equipment (UE) and/or a base station (e.g., eNB or gNB) adapted to perform the above-described mechanism, or any device performing the same operation.

Referring to FIG. 28, a device may include a digital signal processor (DSP)/microprocessor 210 and a radio frequency (RF) module (transceiver, Transceiver) 235. DSP/microprocessor 210 is electrically coupled to transceiver 235 to control transceiver 235. The device includes a power management module 205, a battery 255, a display 215, a keypad 220, a SIM card 225, a memory device 230, an antenna 240, a speaker 245, and an input device 250.

In particular, FIG. 28 may show a UE including a receiver 235 configured to receive a request message from a network and a transmitter 235 configured to transmit timing transmit/receive timing information to the network. Such a receiver and transmitter may constitute the transceiver 235. The UE may further include a processor 210 connected to the transceiver 235.

In addition, FIG. 28 may also show a network device including a transmitter 235 configured to transmit a request message to a UE and a receiver 235 configured to receive transmission/reception timing information from the UE. The transmitter and receiver may constitute the transceiver 235. The network further includes a processor 210 coupled to the transmitter and receiver. The processor 210 may calculate latency based on transmission/reception timing information.

Accordingly, the processor included in the UE (or the communication device included in the UE) and the base station (or the communication device included in the base station) according to various embodiments may control the memory and may operate as follows.

In various embodiments, the UE or base station may include one or more (at least one) transceiver; one or more memories; and one or more processors connected to the transceiver and the memory. The memory may store instructions that enable one or more processors to perform the following operations.

In this case, the communication device included in the UE or the base station may be configured to include the one or more processors and the one or more memories and the communication device may be configured to couple with the one or more transceivers with or without the one or more transceivers.

According to various embodiments, one or more processors included in the UE (or one or more processors of the communication device included in the UE) may receive information related to a slot offset between the first cell and the second cell. For example, the information related to the slot offset may be for carrier aggregation.

According to various embodiments, one or more processors included in the UE may determine the slot offset between the first cell and the second cell based on information related to the slot offset.

According to various embodiments, the information related to the slot offset may be information based on the reference SCS. For example, the reference SCS may be for a slot offset. For example, the reference SCS may be determined based on satisfying a preconfigured condition and/or based on a preconfigured condition. For example, the preconfigured condition may be a preconfigured condition for defining/configuring/obtaining the reference SCS.

For example, the slot offset may be a slot offset between the first cell and the second cell of the unaligned frame boundary. For example, the frame boundary of the first cell and the frame boundary of the second cell may not be aligned in the time domain. For example, even if the frame boundary of the first cell and the frame boundary of the second cell are not aligned in the time domain, the slot boundary of the first cell and the slot boundary of the second cell may be aligned.

According to various embodiments, one or more processors included in the base station (or, one or more processors of the communication device included in the base station) may obtain/generate/set information related to a slot offset between the first cell and the second cell. For example, the information related to the slot offset may be for carrier aggregation.

According to various embodiments, one or more processors included in the base station may transmit information related to the slot offset.

According to various embodiments, the information related to the slot offset may be information based on the reference SCS. For example, the reference SCS may be for a slot offset. For example, the reference SCS may be determined based on satisfying a preconfigured condition and/or based on a preconfigured condition. For example, the preconfigured condition may be a preconfigured condition for defining/configuring/obtaining the reference SCS.

For example, the slot offset may be a slot offset between the first cell and the second cell of the unaligned frame boundary. For example, the frame boundary of the first cell and the frame boundary of the second cell may not be aligned in the time domain. For example, even if the frame boundary of the first cell and the frame boundary of the second cell are not aligned, the slot boundary of the first cell and the slot boundary of the second cell may be aligned.

A more specific operation of the processor included in the base station and/or the UE according to the above-described various embodiments may be described and performed based on the contents of the first to second sections described above.

Meanwhile, various embodiments may be implemented in combination/combination with each other as long as they are not mutually incompatible. For example, the base station and/or the UE (or a processor in the base station and/or the UE) according to various embodiments may perform a combination/combined operation thereof unless the embodiments

3.2. Examples of Communication Systems to which Various Embodiments are Applied Various embodiments have been described focusing on a data transmission/reception relationship between a base station and a UE in a wireless communication system. However, various embodiments are not limited thereto. For example, various embodiments may also relate to the following technical configurations.

Although not limited thereto, the descriptions, functions, procedures, suggestions, methods, and/or operation flowcharts according to various embodiments may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 29:
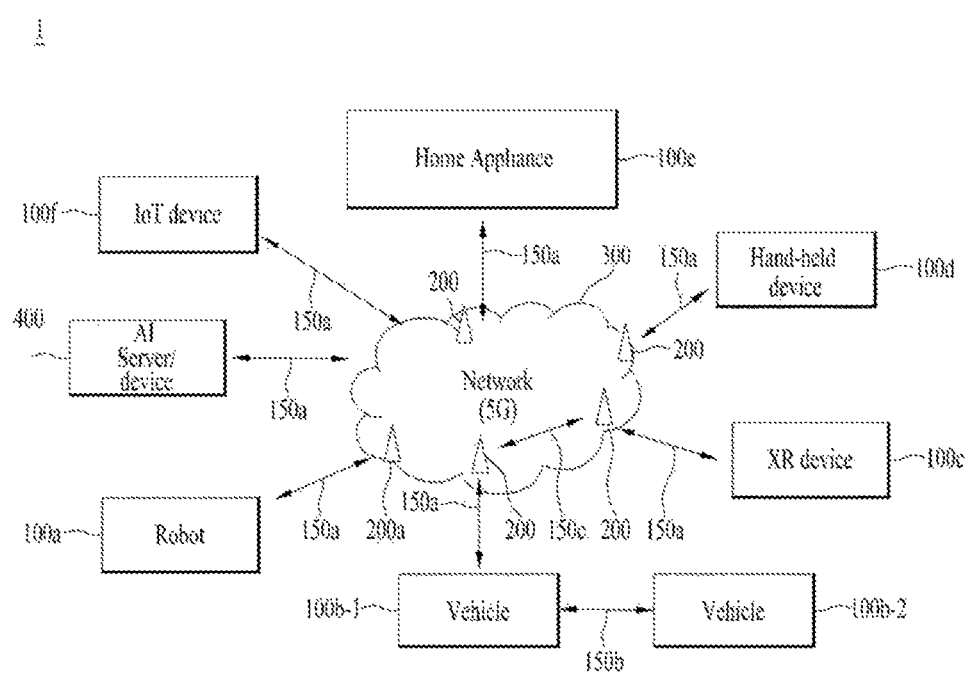
FIG. 29 illustrates a communication system applied to various embodiments.

FIG. 29 illustrates a communication system applied to various embodiments.

Referring to FIG. 29, the communication system 1 applied to the various embodiments includes a wireless device, a base station, and a network. Here, the wireless device means a device that performs communication using a wireless access technology (e.g., 5G NR (New RAT), LTE (Long Term Evolution)), and may be referred to as a communication/wireless/5G device. Although not limited thereto, the wireless device includes a robot 100*a*, a vehicle 100*b*-1, 100*b*-2, an eXtended Reality (XR) device 100*c*, a hand-held device 100*d*, and a home appliance 100*e*, an Internet of Thing (IoT) device 100*f*, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

The wireless devices 100*a* to 100*f* may be connected to the network 300 through the base station 200. Artificial intelligence (AI) technology may be applied to the wireless devices 100*a* to 100*f*, and the wireless devices 100*a* to 100*f* may be connected to the AI server 400 through the network 300. The network 300 may be configured using a 3G network, a 4G (e.g., LTE) network, or a 5G (e.g., NR) network. The wireless devices 100*a* to 100*f* may communicate with each other through the base station 200/network 300, but may also communicate directly (e.g., sidelink communication) without passing through the base station/network. For example, the vehicles 100*b*-1 and 100*b*-2 may perform direct communication (e.g., Vehicle to Vehicle (V2V)/Vehicle to everything (V2X) communication). In addition, the IoT device (e.g., sensor) may directly communicate with other IoT devices (e.g., sensor) or other wireless devices 100*a* to 100*f*.

Wireless communication/connection 150*a*, 150*b*, 150*c* may be performed between the wireless devices 100*a* to 100*f* and the base station 200 and between the base station 200 and the base station 200. Here, wireless communication/connection may be made through various wireless access technologies (e.g., 5G NR) such as uplink/downlink communication 150*a*, sidelink communication 150*b* (or D2D communication), and inter-base station communication 150*c* (e.g. relay, IAB(Integrated Access Backhaul). Through the wireless communication/connection 150*a*, 150*b*, and 150*c*, the wireless device and the base station/wireless device, and the base station and the base station may transmit/receive radio signals to each other. For example, the wireless communication/connection 150*a*, 150*b*, and 150*c* may transmit/receive signals through various physical channels. To this end, based on various proposals of the various embodiments, at least part of various configuration information configuration processes, various signal processing processes (e.g., channel encoding/decoding, modulation/demodulation, resource mapping/demapping, etc.), resource allocation processes, etc. may be performed.

3.2.1 Examples of Wireless Devices to which Various Embodiments are Applied

Figure 30:
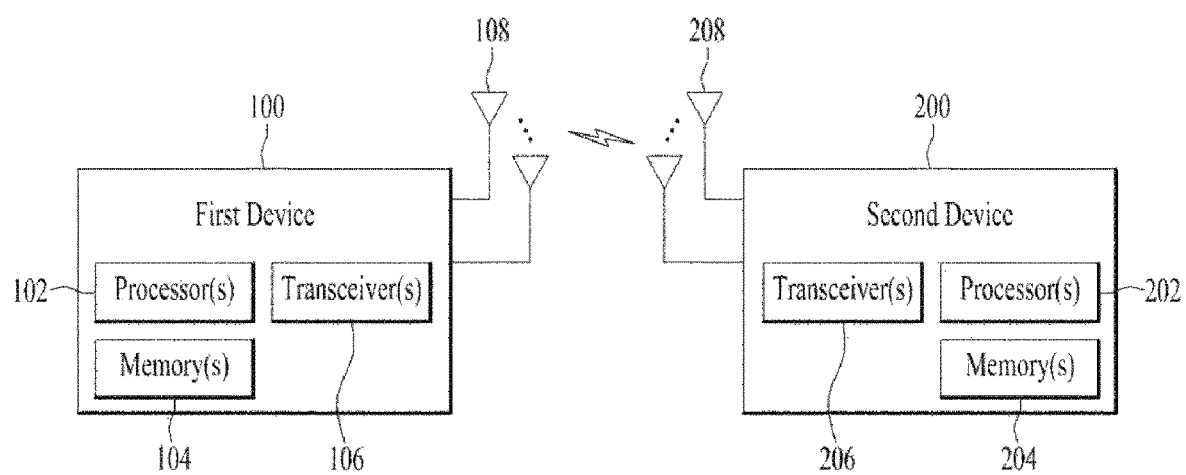
FIG. 30 illustrates a wireless device applied to various embodiments.

FIG. 30 illustrates wireless devices to which various embodiments is applied.

Referring to FIG. 30, the first wireless device 100 and the second wireless device 200 may transmit/receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 29.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods, and/or operational flow charts disclosed herein. For example, the processor 102 may process information in the memory 104 to generate first information/signal, and then transmit a wireless signal including the first information/signal through the transceiver 106. In addition, the processor 102 may receive the radio signal including the second information/signal through the transceiver 106, and then store the information obtained from the signal processing of the second information/signal in the memory 104. The memory 104 may be connected to the processor 102 and may store various information related to the operation of the processor 102. For example, the memory 104 may store software code including instructions for performing some or all of processes controlled by the processor 102, or for performing the descriptions, functions, procedures, suggestions, methods, and/or operational flowcharts disclosed in the document. Here, the processor 102 and the memory 104 may be part of a communication modem/circuit/chip designed to implement a wireless communication technology (e.g., LTE, NR). A transceiver 106 may be coupled to the processor 102 and may transmit and/or receive wireless signals via one or more antennas 108. The transceiver 106 may include a transmitter and/or a receiver. The transceiver 106 may be used interchangeably with a radio frequency (RF) unit. In various embodiments, a wireless device may refer to a communication modem/circuit/chip.

The second wireless device 200 includes one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods, and/or flow charts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206, and then store information obtained from signal processing of the fourth information/signal in the memory 204. The memory 204 may be connected to the processor 202 and may store various information related to the operation of the processor 202. For example, the memory 204 may store software code including instructions for performing some or all of the processes controlled by the processor 202, or for performing the descriptions, functions, procedures, suggestions, methods, and/or operational flowcharts disclosed in the document. Here, the processor 202 and the memory 204 may be part of a communication modem/circuit/chip designed to implement a wireless communication technology (e.g., LTE, NR). The transceiver 206 may be coupled to the processor 202 and may transmit and/or receive wireless signals via one or more antennas 208. Transceiver 206 may include a transmitter and/or receiver. Transceiver 206 may be used interchangeably with an RF unit. In various embodiments, a wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g., functional layers such as PHY, MAC, RLC, PDCP, RRC, SDAP). The one or more processors 102, 202 may generate one or more Protocol Data Units (PDUs) and/or one or more Service Data Units (SDUs) according to the description, function, procedure, proposal, method and/or operational flowcharts disclosed herein. One or more processors 102, 202 may generate messages, control information, data, or information according to the description, function, procedure, proposal, method, and/or flow charts disclosed herein. The one or more processors 102 and 202 generate a signal (e.g., a baseband signal) including PDUs, SDUs, messages, control information, data or information according to the functions, procedures, proposals and/or methods disclosed herein and provide it to one or more transceivers 106 and 206. One or more processors 102, 202 may receive signals (e.g., baseband signals) from one or more transceivers 106, 206, and may obtain PDUs, SDUs, messages, control information, data, or information according to description, functions, procedures, proposals, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202. The descriptions, functions, procedures, suggestions, methods, and/or flowcharts of operations disclosed in this document may be implemented using firmware or software, and the firmware or software may be implemented to include modules, procedures, functions, and the like. Firmware or software configured to perform the descriptions, functions, procedures, suggestions, methods, and/or flow charts disclosed herein may be included in one or more processors 102, 202 or may be stored in one or more memories 104, 204 and driven by one or more processors 102, 202. The descriptions, functions, procedures, suggestions, methods, and/or flowcharts of operations disclosed herein may be implemented using firmware or software in the form of code, instructions, and/or a set of instructions.

One or more memories 104, 204 may be coupled to one or more processors 102, 202 and may store various forms of data, signals, messages, information, programs, codes, instructions, and/or instructions. One or more memories 104, 204 may be comprised of ROM, RAM, EPROM, flash memory, hard drives, registers, cache memory, computer readable storage media, and/or combinations thereof. One or more memories 104, 204 may be located inside and/or external to one or more processors 102, 202. Additionally, one or more memories 104, 204 may be coupled to one or more processors 102, 202 through various technologies, such as wired or wireless connections.

One or more transceivers 106, 206 may transmit user data, control information, radio signals/channels, etc. referred to in the methods and/or operation flowcharts herein, to one or more other devices. The one or more transceivers 106, 206 may receive user data, control information, radio signals/channels, etc. referred to in the descriptions, functions, procedures, suggestions, methods and/or flow charts, etc. disclosed herein, from one or more other devices. For example, one or more transceivers 106, 206 may be coupled to one or more processors 102, 202 and may transmit and receive wireless signals. For example, one or more processors 102, 202 may control one or more transceivers 106, 206 to transmit user data, control information, or wireless signals to one or more other devices. In addition, one or more processors 102, 202 may control one or more transceivers 106, 206 to receive user data, control information, or wireless signals from one or more other devices. Further, one or more transceivers 106, 206 may be coupled to one or more antennas 108, 208, and may be configured to transmit and receive, through the one or more antennas 108, 208, user data, control information, radio signals/channels, etc. mentioned in description, functions, procedures, proposals, methods and/or operation flowcharts. In this document, one or more antennas may be a plurality of physical antennas or a plurality of logical antennas (e.g., antenna ports). The one or more transceivers 106, 206 convert the received radio signal/channel, etc. from the RF band signal into a baseband signal to process the received user data, control information, radio signal/channel, etc. using the one or more processors 102, 202. One or more transceivers 106 and 206 may convert user data, control information, radio signals/channels, etc. processed using one or more processors 102 and 202 from baseband signals to RF band signals. To this end, one or more transceivers 106, 206 may include (analog) oscillators and/or filters.

According to various embodiments, one or more memories (e.g., 104 or 204) may store instructions or programs, and the instructions or programs, when executed, may cause one or more processors operably coupled to the one or more memories to perform operations in accordance with various embodiments or implementations.

According to various embodiments, a computer readable (storage) medium may store one or more instructions or a computer program, and the one or more instructions or computer programs, when executed by one or more processors, may cause the one or more processors to perform operations in accordance with various embodiments or implementations.

According to various embodiments, a processing device or apparatus may include one or more processors and one or more computer memory connectable to the one or more processors. The one or more computer memories may store instructions or programs, and the instructions or programs, when executed, may cause one or more processors operably coupled to the one or more memories to perform operations in accordance with various embodiments or implementations.

Figure 31:
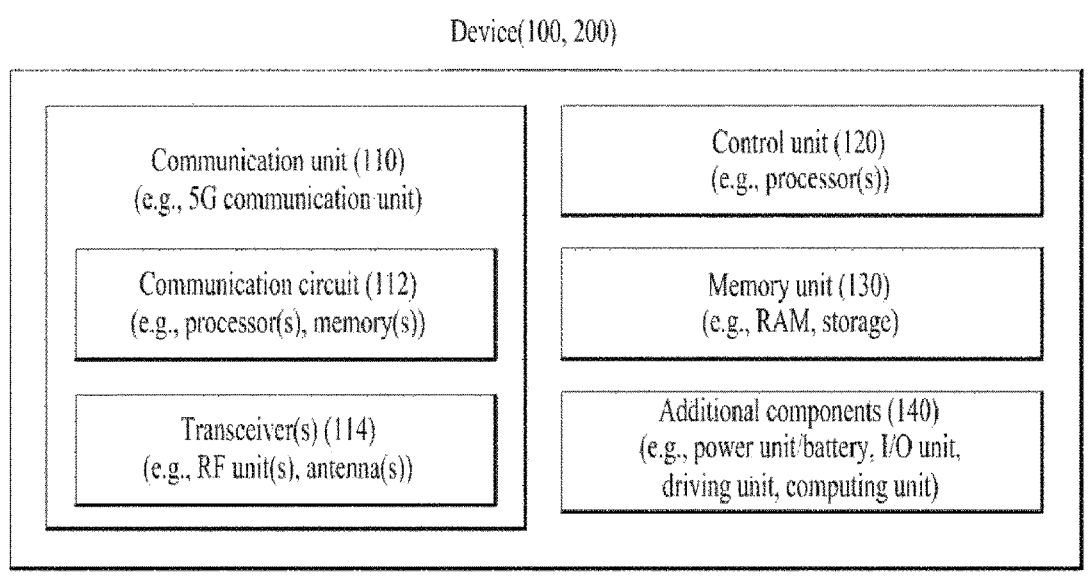
FIG. 31 illustrates an another example of a wireless device applied to various embodiments.

3.2.2. Examples of Use of Wireless Devices to which Various Embodiments are Applied FIG. 31 shows another example of a wireless device applied to various embodiments. The wireless device may be implemented in various forms according to use-examples/services (refer to FIG. 29).

Referring to FIG. 31, wireless devices 100 and 200 may correspond to wireless devices 100 and 200 of FIG. 30, and may consist of various elements, components, units/units, and/or modules. For example, the wireless devices 100 and 200 may include a communication unit 110, a control unit 120, a memory unit 130, and an additional element 140. The communication unit may include communication circuitry 112 and transceiver(s) 114. For example, communication circuitry 112 may include one or more processors 102, 202 and/or one or more memories 104, 204 of FIG. 30. For example, the transceiver(s) 114 may include one or more transceivers 106, 206 and/or one or more antennas 108, 208 of FIG. 30. The control unit 120 is electrically connected to the communication unit 110, the memory unit 130, and the additional element 140, and controls general operations of the wireless device. For example, the controller 120 may control the electrical/mechanical operation of the wireless device based on the program/code/command/information stored in the memory unit 130. In addition, the control unit 120 may transmit the information stored in the memory unit 130 to the outside(e.g., another communication device) through the communication unit 110 through a wireless/wired interface, or may store information received from the outside (e.g., another communication device) through a wireless/wired interface through the communication unit 110 in the memory unit 130.

The additional element 140 may be variously configured according to the type of the wireless device. For example, the additional element 140 may include at least one of a power unit/battery, an input/output unit (I/O unit), a driving unit, and a computing unit. Although not limited thereto, a wireless device may be implemented in the form of a robot (FIGS. 29 and 100a), a vehicle (FIG. 29, 100b-1, 100b-2), an XR device(FIG. 29, 100c), a portable device (FIG. 29, 100d), and a home appliance (FIG. 29, 100e), IoT device (FIG. 29, 100f), digital broadcasting terminal, hologram device, public safety device, MTC device, medical device, fintech device (or financial device), security device, climate/environment device, an AI server/device (FIG. 29, 400), a base station (FIG. 29, 200), and a network node. The wireless device may be mobile or used in a fixed location depending on the use-example/service.

In FIG. 31, various elements, components, units/units, and/or modules in the wireless devices 100 and 200 may be all interconnected through a wired interface, or at least some of them may be wirelessly connected through the communication unit 110. For example, in the wireless devices 100 and 200, the control unit 120 and the communication unit 110 are connected by wire, and the control unit 120 and the first unit (e.g., 130, 140) may be connected to the communication unit 110 wirelessly through the communication unit 110. In addition, each element, component, unit/unit, and/or module within the wireless device 100, 200 may further include one or more elements. For example, the controller 120 may be configured with one or more processor sets. For example, the control unit 120 may be configured as a set of a communication control processor, an application processor, an electronic control unit (ECU), a graphic processing processor, a memory control processor, and the like. As another example, the memory unit 130 may include random access memory (RAM), dynamic RAM (DRAM), read only memory (ROM), flash memory, volatile memory, and non-volatile memory. volatile memory) and/or a combination thereof.

Hereinafter, the embodiment of FIG. 31 will be described in more detail with reference to the drawings.

Figure 32:
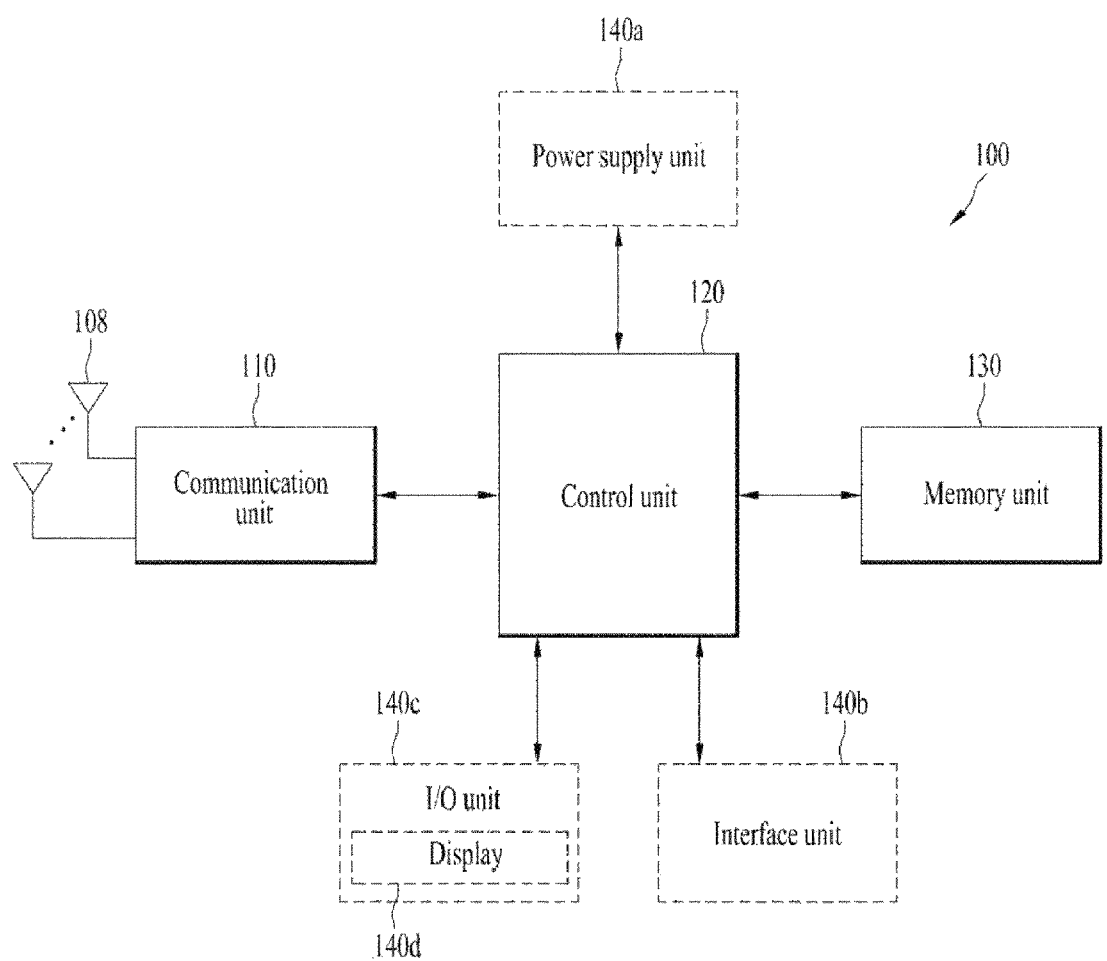
FIG. 32 illustrates a portable device applied to various embodiments.

3.2.3. Examples of Portable Devices to which Various Embodiments are Applied FIG. 32 illustrates a portable device applied to various embodiments. The portable device may include a smart phone, a smart pad, a wearable device (e.g., a smart watch, smart glasses), and a portable computer (e.g., a laptop computer). A portable device may be referred to as a mobile station (MS), a user terminal (UT), a mobile subscriber station (MSS), a subscriber station (SS), an advanced mobile station (AMS), or a wireless terminal (WT).

Referring to FIG. 32, the portable device 100 may include an antenna unit 108, a communication unit 110, a control unit 120, a memory unit 130, a power supply unit 140a, an interface unit 140b, and input/output unit 140c. The antenna unit 108 may be configured as a part of the communication unit 110. Blocks 110 to 130/140a to 140c respectively correspond to blocks 110 to 130/140 of FIG. 31.

The communication unit 110 may transmit and receive signals (e.g., data, control signals, etc.) with other wireless devices and base stations. The controller 120 may control components of the portable device 100 to perform various operations. The controller 120 may include an application processor (AP). The memory unit 130 may store data/parameters/programs/codes/commands necessary for driving the portable device 100. Also, the memory unit 130 may store input/output data/information. The power supply unit 140a supplies power to the portable device 100 and may include a wired/wireless charging circuit, a battery, and the like. The interface unit 140b may support a connection between the portable device 100 and another external device. The interface unit 140b may include various ports (e.g., an audio input/output port and a video input/output port) for connection with an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c may obtain information/signals (e.g., touch, text, voice, image, video) input from the user, and the obtained information/signals may be stored in the memory unit 130. The communication unit 110 may convert the information/signal stored in the memory into a wireless signal, and transmit the converted wireless signal directly to another wireless device or to a base station. Also, after receiving a radio signal from another radio device or base station, the communication unit 110 may restore the received radio signal to original information/signal. After the restored information/signal is stored in the memory unit 130, it may be output in various forms (e.g., text, voice, image, video, haptic) through the input/output unit 140c.

3.2.4. Example of a Vehicle or Autonomous Vehicles to which Various Embodiments are Applied FIG. 33 exemplifies a vehicle or an autonomous driving vehicle to which various embodiments are applied. The vehicle or autonomous driving vehicle may be implemented as a mobile robot, a vehicle, a train, an aerial vehicle (AV), a ship, and the like.

Figure 33:
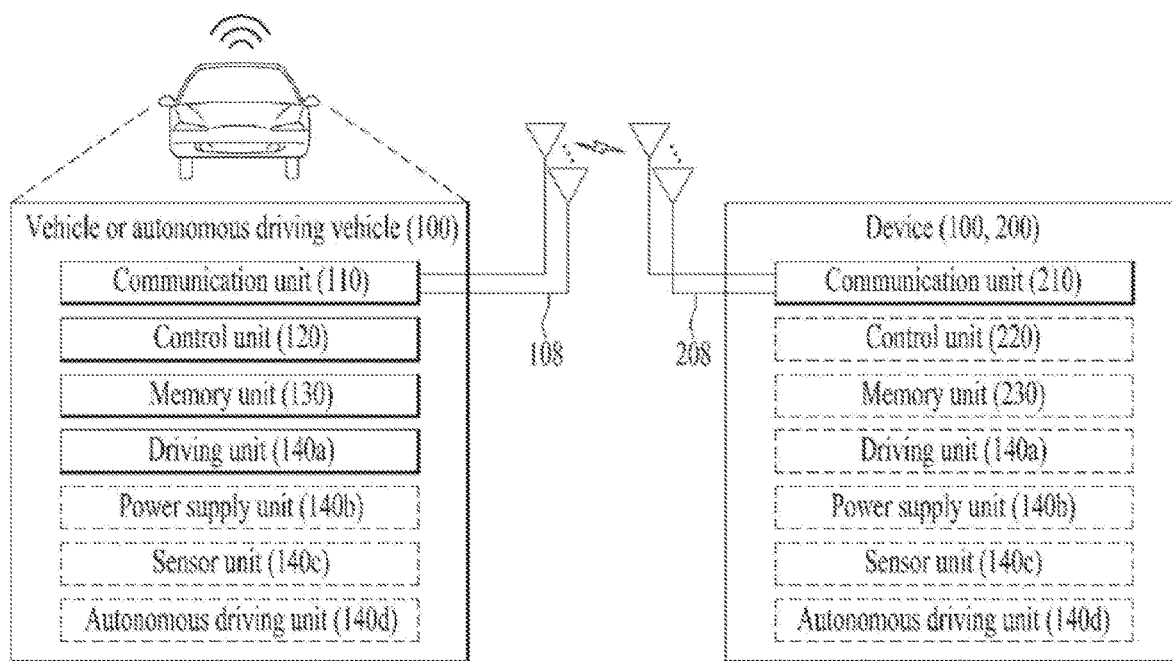
FIG. 33 illustrates a vehicle or an autonomous driving vehicle applied to various embodiments.

Referring to FIG. 33, the vehicle or autonomous vehicle 100 may include an antenna unit 108, a communication unit 110, a control unit 120, a driving unit 140a, a power supply unit 140b, and a sensor unit 140c, and an autonomous driving unit 140d. The antenna unit 108 may be configured as a part of the communication unit 110. Blocks 110/130/140a-140d correspond to blocks 110/130/140 of FIG. 31, respectively.

The communication unit 110 may transmit and receive signals (e.g., data, control signals, etc.) with external devices such as other vehicles, base stations (e.g., base stations, roadside base stations, etc.), servers, and the like. The controller 120 may control elements of the vehicle or the autonomous driving vehicle 100 to perform various operations. The controller 120 may include an Electronic Control Unit (ECU). The driving unit 140a may cause the vehicle or the autonomous driving vehicle 100 to run on the ground. The driving unit 140a may include an engine, a motor, a power train, a wheel, a brake, a steering device, and the like. The power supply unit 140b supplies power to the vehicle or the autonomous driving vehicle 100, and may include a wired/wireless charging circuit, a battery, and the like. The sensor unit 140c may obtain vehicle status, surrounding environment information, user information, and the like. The sensor unit 140c may include an inertial measurement unit (IMU) sensor, a collision sensor, a wheel sensor, a speed sensor, an inclination sensor, a weight sensor, a heading sensor, a position module, and a vehicle forward movement/reverse movement sensor, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed such as adaptive cruise control, a technology for automatically driving along a predetermined route, and a technology for automatically setting a route when a destination is set.

As an example, the communication unit 110 may receive map data, traffic information data, and the like from an external server. The autonomous driving unit 140d may generate an autonomous driving route and a driving Method based on the acquired data. The controller 120 may control the driving unit 140a to move the vehicle or the autonomous driving vehicle 100 along the autonomous driving path (e.g., speed/direction adjustment) according to the driving Method. During autonomous driving, the communication unit 110 may obtain the latest traffic information data from an external server non/periodically, and may acquire surrounding traffic information data from surrounding vehicles. Also, during autonomous driving, the sensor unit 140c may acquire vehicle state and surrounding environment information. The autonomous driving unit 140d may update the autonomous driving route and driving Method based on the newly acquired data/information. The communication unit 110 may transmit information about a vehicle location, an autonomous driving route, a driving Method, and the like to an external server. The external server may predict traffic information data in advance using AI technology or the like based on information collected from the vehicle or autonomous driving vehicles, and may provide the predicted traffic information data to the vehicle or autonomous driving vehicles.

In summary, various embodiments may be implemented through a certain device and/or UE.

For example, the certain device may be a base station, a network node, a transmitting terminal, a receiving terminal, a wireless device, a wireless communication device, a vehicle, a vehicle equipped with an autonomous driving function, an unmanned aerial vehicle (UAV), AI (artificial intelligence) module, a robot, an AR (augmented reality) device, a VR (virtual reality) device, or other devices.

For example, the UE may be a personal digital assistant (PDA), a cellular phone, a personal communication service (PCS) phone, global system for mobile (GSM) phone, WCDMA (Wideband CDMA) phone, a mobile broadband system (MBS) phone, a smart phone, or a multi-mode multi-band (MM-MB) terminal.

Here, the smart phone is a terminal that combines the advantages of a mobile communication terminal and a personal portable terminal, and may refer to a terminal in which data communication functions such as schedule management, fax transmission and reception, and internet access, which are functions of a personal portable terminal, are integrated into a mobile communication terminal. In addition, the multi-mode multi-band terminal refers to a terminal capable of operating in both a portable Internet system and other mobile communication systems (e.g., CDMA (Code Division Multiple Access) 2000 system, WCDMA (Wideband CDMA) system, etc.) by embedding a multi-modem chip.

In addition, the UE may be a notebook PC, hand-held PC, tablet PC, ultrabook, slate PC, digital broadcasting terminal, PMP (portable multimedia player), navigation, wearable device (e.g., a watch-type terminal (smartwatch), a glass-type terminal (smart glass), or a head mounted display (HMD)). For example, the drone may be a flying vehicle that does not have a human and flies by a wireless control signal. For example, the HMID may be a display device worn on the head. For example, an HMD may be used to implement VR or AR.

The wireless communication technology in which various embodiments are implemented may include LTE, NR, and 6G as well as Narrowband Internet of Things (NB-IoT) for low-power communication. At this time, for example, NB-IoT technology may be an example of LPWAN (Low Power Wide Area Network) technology, and may be implemented in standards such as LTE Cat (category) NB1 and/or LTE Cat NB2, but it is not limited to the above-mentioned name. Additionally or alternatively, a wireless communication technology implemented in a wireless device according to various embodiments may perform communication based on LTE-M technology. In this case, as an example, the LTE-M technology may be an example of an LPWAN technology, and may be called various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, a wireless communication technology implemented in a wireless device according to various embodiments may include at least one of ZigBee, Bluetooth, and low power wide area network (LPWAN) in consideration of low power communication, but it is not limited to the above-mentioned names. For example, the ZigBee technology may generate PAN (personal area networks) related to small/low-power digital communication based on various standards such as IEEE 802.15.4, and may be called by various names.

Various embodiments may be implemented through various means. For example, various embodiments may be implemented by hardware, firmware, software, or a combination thereof.

For implementation by hardware, the method according to various embodiments may be implemented by one or more ASICs(application specific integrated circuits), DSPs(digital signal processing devices), DSPDs(digital signal processing devices), PLDs(programmable logic devices), FPGAs(field programmable gate arrays), processors, controllers, microcontrollers, microprocessors, and the like.

In the case of implementation by firmware or software, the method according to various embodiments may be implemented in the form of a module, procedure, or function that performs the functions or operations described above. For example, the software code may be stored in a memory and driven by a processor. The memory may be located inside or outside the processor, and data may be exchanged with the processor by various known means.

Various embodiments may be embodied in other specific forms without departing from the technical idea and essential characteristics thereof. Accordingly, the above detailed description should not be construed as restrictive in all respects but as exemplary. The scope of the various embodiments should be determined by a reasonable interpretation of the appended claims, and all modifications within the equivalent scope of the various embodiments are included in the scope of the various embodiments. In addition, claims that are not explicitly cited in the claims can be combined to form an embodiment or included as a new claim by amendment after filing.

Various embodiments may be applied to various wireless access systems. As an example of various radio access systems, there is a 3rd Generation Partnership Project (3GPP) or a 3GPP2 system. Various embodiments may be applied not only to the various radio access systems, but also to all technical fields to which the various radio access systems are applied. Furthermore, the proposed method may be applied to a mmWave communication system using a very high frequency band.

What is claimed is:

1. A method performed by a user equipment (UE) in a wireless communication system, the method comprising:
   receiving, from a base station, serving cell configuration information including information related to a slot offset between a first cell and a second cell in unaligned frame boundary; and
   determining a time offset of the second cell, based on the information related to the slot offset,
   wherein a granularity of the information related to a slot offset is determined based on a reference subcarrier spacing (SCS) for the slot offset,
   wherein the reference SCS is a maximum of lowest SCSs among at least one SCS configured for each of at least one of the first cell or the second cell, and
   wherein the first cell is a primary cell (PCell) or a primary secondary cell (PSCell), and the second cell is a secondary cell (SCell).

2. The method of claim 1, wherein:
   the serving cell configuration information includes information for configuring the second cell.

3. The method of claim 1, wherein:
   the information related to the slot offset includes information on an integer value related to the slot offset, and
   the integer value related to the slot offset is selected from preconfigured {−A, . . . , A}, and the A is an integer related to the reference SCS.

4. The method of claim 3, wherein:
   based on the reference SCS being increased, A is increased, and based on the reference SCS being decreased, A is decreased.

5. A user equipment (UE) operated in a wireless communication system, the UE comprising:
- a memory; and
- at least one processor connected to the memory;
- wherein the at least one processor is configured to:
- receive, from a base station, serving cell configuration information including information related to a slot offset between a first cell and a second cell in unaligned frame boundary; and
- determine a time offset of the second cell, based on the information related to the slot offset,
- wherein a granularity of information related to a slot offset is determined based on a reference subcarrier spacing (SCS) for the slot offset,
- wherein the reference SCS is a maximum of lowest SCSs among at least one SCS configured for each of at least one of the first cell or the second cell, and
- wherein the first cell is a primary cell (PCell) or a primary secondary cell (PSCell), and the second cell is a secondary cell (SCell).

6. The UE of claim 5, wherein:
the UE is in communication with at least one of a mobile terminal, a network, and an autonomous vehicle other than a vehicle in which the UE is included.

7. The UE of claim 5, wherein:
the serving cell configuration information includes information for configuring the second cell.

8. The UE of claim 5, wherein:
the information related to the slot offset includes information on a integer value related to the slot offset, and
the integer value related to the slot offset is selected from preconfigured {-A, . . . , A}, and the A is an integer related to the reference SCS.

9. The UE of claim 8, wherein:
based on the reference SCS being increased, A is increased, and based on the reference SCS being decreased, A is decreased.

* * * * *